US011941701B2

(12) United States Patent
Diaz

(10) Patent No.: US 11,941,701 B2
(45) Date of Patent: Mar. 26, 2024

(54) COMPUTERIZED SECURITIES TRADING PLATFORM SYSTEM, METHOD, AND ARCHITECTURE

(71) Applicant: PureStream Trading Technologies Inc, New York, NY (US)

(72) Inventor: Armando Diaz, Englewood, NJ (US)

(73) Assignee: PURESTREAM TRADING TECHNOLOGIES INC., New York, NY (US)

( * ) Notice: Subject to any disclaimer, the term of this patent is extended or adjusted under 35 U.S.C. 154(b) by 0 days.

(21) Appl. No.: 18/058,124

(22) Filed: Nov. 22, 2022

(65) Prior Publication Data

US 2023/0116744 A1 Apr. 13, 2023

Related U.S. Application Data

(63) Continuation of application No. 17/387,849, filed on Jul. 28, 2021, now Pat. No. 11,526,945, which is a continuation of application No. PCT/US2020/016079, filed on Jan. 31, 2020.

(60) Provisional application No. 62/799,170, filed on Jan. 31, 2019.

(51) Int. Cl.
    *G06Q 40/06* (2012.01)
(52) U.S. Cl.
    CPC .................................. *G06Q 40/06* (2013.01)
(58) Field of Classification Search
    None
    See application file for complete search history.

(56) References Cited

U.S. PATENT DOCUMENTS

| 7,136,834 B1 | 11/2006 | Merrin et al. |
| 7,444,300 B1 | 10/2008 | Broms et al. |
| 7,496,531 B1 | 2/2009 | Gastineau et al. |
| 7,689,501 B1 | 3/2010 | Gastineau et al. |
| 7,747,515 B1 | 6/2010 | Merrin et al. |
| 8,055,576 B2 | 11/2011 | Merrin et al. |
| 8,131,621 B1 | 3/2012 | Gastineau et al. |
| 8,306,901 B1 | 11/2012 | Gastineau et al. |
| 8,452,682 B1 | 5/2013 | Gastineau et al. |

(Continued)

FOREIGN PATENT DOCUMENTS

| EP | 2166494 A1 | 3/2010 |
| WO | 2018165094 A1 | 11/2018 |

OTHER PUBLICATIONS

International Search Report, U.S. Patent and Trademark Office, Application No. PCT/US2020/016079, dated Jun. 2, 2020.

(Continued)

*Primary Examiner* — Jason M. Borlinghaus
(74) *Attorney, Agent, or Firm* — Gottlieb, Rackman & Reisman, PC

(57) ABSTRACT

A system and method for processing of transaction orders includes a strategy matching venue configured to process strategy orders having respective strategies identifying a reference rate or a range of reference rates. Strategy orders are matched to contra strategy orders having a compatible but possibly different strategy. A single match can generate a stream of executions at maximum rate compatible with the strategies for the matched orders. Additional systems operate to generate strategy orders from conventional algorithmic orders and to coordinate filling of the algorithmic order relative to favor filling of the strategy order by the strategy matching venue.

30 Claims, 31 Drawing Sheets

(56) References Cited

U.S. PATENT DOCUMENTS

| | | |
|---|---|---|
| 8,548,898 B2 | 10/2013 | Merrin et al. |
| 8,577,787 B1 | 11/2013 | Gastineau et al. |
| 8,655,765 B1 | 2/2014 | Gastineau et al. |
| 9,311,673 B2 | 4/2016 | Hughes, Jr. et al. |
| 10,706,470 B2 | 7/2020 | Facini et al. |
| 11,055,781 B2 | 7/2021 | Walden et al. |
| 11,164,248 B2 | 11/2021 | Acuna-Rohter et al. |
| 11,216,875 B2 | 1/2022 | Bonig et al. |
| 11,216,877 B2 | 1/2022 | Kutko et al. |
| 11,216,881 B2 | 1/2022 | Adcock et al. |
| 11,216,882 B2 | 1/2022 | Carroll et al. |
| 2006/0293996 A1 | 12/2006 | Lutnick |
| 2010/0293109 A1 | 11/2010 | Jain et al. |
| 2014/0032389 A1 | 1/2014 | Merrin et al. |
| 2014/0136384 A1 | 5/2014 | Messina et al. |
| 2014/0195407 A1 | 7/2014 | Waelbroeck et al. |
| 2015/0032594 A1 | 1/2015 | Lutnick et al. |
| 2017/0004578 A1 | 1/2017 | Cooper et al. |
| 2018/0158143 A1 | 6/2018 | Schmitt et al. |

OTHER PUBLICATIONS

Written Opinion, U.S. Patent and Trademark Office, Application No. PCT/US2020/016079, dated Jun. 2, 2020.

NASDAQ—Update Midpoint Extended Life Order (M-ELO)—2019—2 pages.

Giuseppe Nuti, Mahnoosh Mirghaemi, Philip Treleaven, and Chaiyakorn Yingsaeree UK Centre in Financial Computing, London—Algorithmic Trading—Nov. 2011—61 pages—UK.

Shobhit Seth—Basics of algorithmic trading: Concepts and examples—Dec. 4, 2018—12 pages: https://www.investopedia.com/articles/active-trading/101014/basics-algorithmic-trading-concepts-and-examples.asp.

European Search Report for EU Patent Application EP20747739 dated Sep. 26, 2022.

NASDAQ—Update Midpoint Extended Life Order (M-ELO)—2017—1 pages.

| Sequence | Strategy Type | Description | Liquid. Seeking | 100%-400% | 100%-200% | MED | LOW |
|---|---|---|---|---|---|---|---|
| 1 | Liq. Seeking | Liquidity seeking | X | | | | |
| 2 | 100%-400% | 400% of traded volume | X | X | X | X | X |
| 3 | 100%-200% | 200% of traded volume | X | X | X | | |
| 4 | MEDIUM | 10-30% volume traded | X | | | X | X |
| 5 | LOW | 5-15% of volume traded | X | | | X | X |

FIG. 19

COMPUTERIZED SECURITIES TRADING PLATFORM SYSTEM, METHOD, AND ARCHITECTURE

CROSS-REFERENCE TO RELATED APPLICATIONS

This application is a continuation of U.S. patent application Ser. No. 17/387,849, filed Jul. 28, 2021, which is a continuation of International Application Number PCT/US2020/016079, filed Jan. 31, 2020, which claims priority to U.S. Provisional Patent Application No. 62/799,170 filed on Jan. 31, 2019, the entire contents of which is expressly incorporated by reference.

FIELD OF THE INVENTION

The present invention relates to processing of transaction orders in an automated trading platform.

BACKGROUND

Institutional Investors often need to place large orders to effect their investment decisions. Placing a single large order into a market can have a significant impact on the market price of the security based simply on the laws of supply and demand.

Large orders are therefore broken up according to an algorithmic ("algo") process into many smaller discrete sub-orders that are easier to fill and, at least individually, have less impact on the market price for the security. The result of this is that the overall price impact of filling the large order can be reduced. The tradeoff in this execution decision is the acceptance of market and implementation risk due to the longer execution horizon resulting from trading in smaller orders that are filled a slower rate.

In conventional trading systems, large orders of this type are processed using computerized trading platforms that employ algorithmic trading systems to automatically slice a large order into many discrete smaller orders in accordance with an explicitly selected algorithmic execution strategy. The smaller orders are sent to trading venues where they are individually matched to a contra order at the respective trading venue and processed. From an execution rate perspective, filling the single large orders requires an execution rate greater than the market liquidity rate at that moment. The algorithmic strategy applied seeks to fill the large order at an execution rate (the ratio of shares filled to market volume) equal to the available liquidity (the ratio of available volume to total market volume) in the market. There are a variety of different types of algorithmic trading strategies that are used. At a high-level, the differences are reflected in the rate of volume in which they participate in the market.

As an example, an order to buy 100,000 shares of XYZ at a specified limit market price may be issued by an institutional trader through an order management system (OMS) or execution management system (EMS). The order is routed to a broker dealer that implements an algorithmic trading system. An algo order manager periodically slices off child orders in an amount and frequency that is dependent on the algorithmic strategy being used and incoming and/or historic market data. In a percentage of volume (POV) strategy, orders are sliced at a specified percentage of market volumes. Thus, a 10% POV process may specify that a child order for 2000 shares be sliced off each time after market data indicates that another 20,000 shares of XYZ have been traded.

Child orders are sent to a smart order router (SOR), within the algo trading platform and that further divides each child order into even smaller discrete grandchild buy orders generally, for only a few hundred shares, which are then sent by the SOR individually to in multiple trading venues. The trading venues then each try to match these small grandchild orders with resting contra orders for execution. A conditional order may be sent to multiple trading venues and subsequently cancelled after one venue is able to fill it.

The algorithmic trading process is a large component of the high frequency trading centric market structure currently in place and is a factor in the fragmentation and diminishing average trade size that characterize conventional equity markets. Using this conventional methodology, filling a single large order requires generating and processing thousands of discrete small orders. Given that the current average trade size is 200 shares in the aggregate US equity market, the institutional algorithm will need to have 500 transactions to complete the 100,000 share order. To achieve the 500 executions, a typical algorithmic strategy will issue 5,000 orders, the vast majority of which are ultimately canceled. This geometric explosion in orders resulting from the algorithmic slicing, and further aggravated by high frequency trading market makers in a market structure rewarding the fastest order increases processing overhead. It also increases risk of upsetting the overall financial data network as a whole, as reflected in the increasing occurrence of flash crashes.

Neither conventional algo trading systems nor the execution venues are able to identify situations where a large order could be matched in full or part with a contra order because orders on both sides have been broken up into many discrete small orders for processing before any buy/sell matching is done. Even if institutional investor A wants to sell and B wants to buy a large quantity of shares of the same security, at the same venue and time, with an identical strategy, the existing trading systems are not capable of matching the parent orders. Institutional investors are thus constrained between a large transaction at one price (typically handled by a broker as a special order and with high fees), or trading small and slow over a range of time, volume, prices, venues and counter-parties.

The performance or quality of execution of an order via an algorithmic trading strategy can be quantifiably measured relative to the benchmark price of the applied algorithmic strategy. For example, the benchmark of a 10,000 share orders with an algorithmic execution strategy of POV 10%, would be the volume-weighted average price (VWAP) of the next 100,000 shares traded in the market (10,000/100,000=10%).

The conventional algo trading systems and methods are inherently flawed in terms of matching or besting the benchmark over time. As a result, while an algo order system is designed to achieve a given benchmark and minimize shortfall, the benchmark cannot be matched perfectly. The available liquidity (orders of different quantities and limit prices resting) at different venues is continually changing and the SOR used in the algorithmic processor to place grandchild orders is continuously reacting to market data from all these venues, which can be delayed. The result is that algo platforms are constantly trying to chase liquidity. On average the algo platforms are always going to perform worse than a benchmark that reflects the best achievable price based on the best available liquidity at all the venues.

In addition, trading venues cannot precisely match orders at the algorithmic strategy level. Even trajectory cross venues rely on the ex-ante volume estimates of the security to size the quantity to be "trajected" which in turn causes slippage via quantity prediction errors. Also, despite typically over representing their liquidity needs in multiple venues (by issuing excess conditional orders, for example), algorithms cannot be everywhere volume may trade, and so volume can be missed. Also, due to the speed and latency disadvantages, a broker's execution algorithm's queue position in trading venues ends up typically lower in priority than high frequency market makers specializing in latency arbitrage across venues. As a result of these and other inefficiencies, in aggregate benchmark slippage may amount to in excess of $100 Billion annually in the US equity market.

SUMMARY

These inefficiencies, constraints, and other drawbacks are addressed by a trading system architecture and method in which orders are issued with a selected strategy that has a rate or range or rates, and are matched in a strategy matching venue to contra orders at the rate implicit in the targeted execution strategy. Unlike conventional venues, where a match between an order and a contra order results in one discrete quantity, price, and trade report, strategy matches are open ended and can contain a stream of an unlimited number of quantities, prices and trades each in accordance with the compatible rate for the strategies of the matched orders. The prices and quantities can be based on the prices and sizes taking place in the continuous market and the stream of executions for a match can continue until either the parties' order volume or price limit is exhausted, violated or cancelled.

For example, a buyer and seller that both have a trade strategy with an execution rate of 10% can be matched at a strategy matching venue and a stream of executions that precisely matches the desired ratio generated even though neither party side knows the other's side or strategy.

A strategy order can specify a security, side, quantity, limit price, and a particular strategy. The strategy is selected from a set of predefined strategies. Each strategy in the set has a specified rate or rate range. Each strategy can be matched to contra orders with the same strategy type and one, several, or all of the strategies can also be matched to at least one other strategy type. Different predefined sets of strategies can be provided and made available to different users.

Strategies can be given different matching priorities, such as a priority based on a liquidity rate implicit in the execution strategy. Advantageously, organizing trading priority around rate, instead of price, better aligns rate based execution strategies with the liquidity of a venue. Market participants compete for liquidity based on the rate demanded and provided instead of competing on price and the speed of order submission as in conventional systems.

The system, method, and architecture can be implemented in three major parts that can interact with each other but also operate independently. A strategy matching venue engine, a rate optimizer system engine that operates in conjunction with an algorithmic trading platform (sometimes referred to herein as the HERO system), and a pre- or post-routing optimizer system engine that operates in coordination with an OMS/EMS system (and which is sometimes referred to herein as the PRO system).

A strategy matching venue receives and stores strategy orders. Each strategy order has at least one assigned primary strategy selected from a predefined set of strategies. Non-strategy orders issued to a strategy matching venue can be assigned a default strategy. A marketability function can be periodically applied to stored strategy orders to identify those that are marketable. Marketable orders that have available rate capacity to exchange tradable units, such as shares, are considered tradable.

The strategy matching venue can select a tradable order and search for contra orders to identify a match. The strategy matching venue identifies matches between orders based on factors that can include the tradability of orders and the compatibility of each order's strategy. Where multiple contra orders are available for matching, the matching can be prioritized based on factors that can include one or more of contra strategy type, order size, order source, order time, and/or other factors. A given tradable order can be matched to multiple contra orders simultaneously Trades are processed for a matched pair of orders with reference to external data (market data) and a stream of executions is generated based on, e.g., market data and the rate overlap of the strategies of matched orders. The execution streaming can continue as long as both members of the pair remain tradable.

The HERO system can be operated in close association with an existing algorithmic (algo) trading system, such as used by a broker/dealer. The HERO system is integrated with the algo trading system and generates strategy orders by translating algorithmic orders placed in the algo trading system into strategy orders for strategies supported by the strategy matching venue(s). Predefined strategy mapping rules can be used to select the particular strategy type applied based on attributes of the algorithmic order to which it corresponds and based on user preferences. Different users may prefer different methodologies for mapping an algorithmic order attributes to a strategy type for a strategy order. More than one set of strategy mapping rules can be provided for the same predefined set of strategies and the mapping rule set used for any given order selected based on an attribute of the order, such as the trading desk from which it has issued. Strategy mapping rules may be a simple direct map from a rate specified for the algorithmic order to a strategy. More complex rules can also be defined wherein the strategy selected for a given algo can vary dynamically based on data outside of the algo order itself, such as but not limited to market conditions and the amount of the algo order that may have already been filled.

The HERO system interfaces with the strategy matching venues and the algo platform, coordinating activities of both in order to get the best trading outcome for the algo order. Messages are exchanged between the algo trading system, the HERO system, and the strategy matching venue to coordinate the processing of a strategy order and the corresponding algo order so that if a strategy order match is available, the strategy match is worked in favor of the corresponding algo order process in the price discovery market.

The PRO system operates at a higher level than the HERO system in the order processing workflow, interfacing with the strategy matching venues and the OMS/EMS, and coordinating activities across both in order to get the best trading outcome for the trading desk. Instead of interacting directly with the algorithmic order platform that works the orders, as done in the HERO system, the PRO system interacts with the OMS or EMS used by a trading desk to place algo orders and issues strategy orders to a strategy matching venue. Strategy orders are generated in correspondence with the algo orders issued by the OMS/EMS and the strategy orders are issued to a strategy matching venue. Messages are exchanged between the OMS/EMS, the PRO system, and the strategy matching venue to coordinate the processing of a strategy order and the corresponding algo order so that if a strategy order match is available, the strategy match is worked in favor of the corresponding algo order.

The system, method, and architecture of the present invention has many advantages over the conventional trading systems, particularly with respect to processing of large orders. The match process does not have to be repeated countless times in the pursuit of an execution strategy. Because the number of matching cycles undertaken is greatly reduced, the subsequent number of child orders sent per parent order is also greatly reduced. Additionally, the need to send multiple sub-orders to multiple venues is eliminated. As a result, potential information leakage is limited to execution centric participants in the strategy matching venues and the number of third parties, such as HFT market makers, that could be aware of a strategy order's existence is greatly reduced relative to conventional trading systems. Further, relative slippage to an execution benchmark is largely or wholly eliminated and absolute slippage to arrival is greatly reduced because of this decrease in information leakage, and elimination of the structural disadvantages of inter and intra market fragmentation existing in conventional systems and methods.

Aspects of the invention also support conditional orders. Cancelation of matched orders is possible even if the order is actively being worked in a strategy matching venue and has only been partially filled.

In an embodiment, an improved securities trading system implementing various aspects of the invention can comprise one or a combination of (i) a strategy matching venue that accepts, matches, and fills strategy orders; (ii) a HERO system that interacts with a broker/dealer's algo trading platform to generate strategy orders related to algo orders being worked in the algo trading platform, issue strategy orders to the strategy matching venue, and to allow strategy orders to be worked in favor of corresponding algo orders; and (iii) a PRO system that interacts with an OMS/EMS that can issue orders to a broker/dealer system using a conventional algo trading platform, and where the PRO system operates to generate strategy orders related to algo orders issued by the OMS/EMS, issue strategy orders to the strategy matching venue, and to allow strategy orders to be worked in favor of corresponding algo orders. Conventional exchange venues can continue servicing orders from, e.g., the algo trading platform.

In an embodiment, a strategy matching venue comprises a computerized system with appropriate hardware, memory, and network access to support the desired level of trading, and wherein the system operates in accordance with computer software stored in the computer memory. In operation the strategy matching venue receives a plurality of strategy orders for a first tradable item and stores information about the strategy orders in a strategy order book maintained in the computer memory. Each strategy order is from a respective source, such as a HERO system enabled system, a PRO system enabled system, or any other suitable source. Each order comprises information specifying a side, a limit price, and a strategy. Each respective strategy is a member of a predefined set of strategies and has a respective rate or range of rates.

A first strategy order that is tradable selected from strategy orders in the strategy order book. Tradability can be determined by applying a tradability function to evaluate attributes of a respective strategy order and first market data. Strategy orders in the strategy order book are searched to find a first match between the first strategy order and a first contra strategy order that has a respective strategy compatible with the strategy of the first strategy order and that is tradable based on the tradability function applied to the first contra strategy order and first market data. A match status of the first match is initially unbroken. The match status is broken if either of the first strategy order or the first contra strategy order becomes untradable.

While the first match is unbroken, fills for the tradable item are intermittently issued between the first strategy order and first contra strategy order at a maximum rate compatible with the respective strategies of the first strategy order and first contra strategy order with a fill quantity being a function of the maximum rate as applied to second market data relevant to the tradable item. Information about the first strategy order and first contra strategy order in the strategy order book is updated to reflect fill quantities. At least one execution message is sent to the respective source for the first strategy order and the first contra strategy order, each execution message indicating an executed fill quantity.

In an embodiment, responsive to finding the first match a match-found condition message is sent to the respective source for the first strategy order and first contra strategy order.

In an embodiment, in response to each executed fill, respective execution messages are sent to the source of the first strategy order and the source of first contra strategy order indicating the respective executed fill quantity.

In an embodiment, in response to the first match being broken, a match-ended condition message is sent to at least one of respective source for the first strategy order and the first contra strategy order.

In an embodiment, the tradable item comprises a first security, the first market data comprises data indicating a best available ask and a best available bid price for at least the first security in a marketplace and the second market data comprises trading data indicating at least one reported trade at a respective traded quantity and price for the first security in the marketplace. The tradability function for a respective order can comprise a determination that the respective order is marketable based on the limit price for the respective order and the first market data, and that the respective order has available capacity, wherein an order is tradable if it is marketable and has available capacity. The quantity of a respective fill can be the maximum rate applied to the traded quantity of a respective reported trade and the price of the respective fill be the price, or a function thereof, of the respective reported trade.

In an embodiment, marketability for strategy orders stored in the strategy order book is determined in response to receipt of a new first market data. In an embodiment, a respective fill is executed in response to receipt of a new second market item data.

In an embodiment, where multiple contra orders with compatible strategies are available for matching to the strategy order, contra orders can be prioritized according to the relative priority of strategy. Where multiple contra orders with the same highest priority strategy is available, the orders can be prioritized based on one or more additional priority factors, which factors may include order size, with orders exceeding a threshold size having a greater priority than smaller orders, order source, and arrival time at the strategy matching venue.

In an embodiment, the maximum rate compatible with the respective strategies of the first strategy order and first contra strategy order is the lowest rate of the largest rate available to the first strategy order and the largest rate available to the first contra strategy order.

In an embodiment, when a pair of orders are matched, information about the match can be stored in one or more activestream records in an activestreams table. Each record in the activestreams table identifies a respective for a first side and each currently matched contra order. A link to appropriate active streams records can also be stored for the order records of the matched orders in the order book.

In an embodiment, strategy orders can be conditional. When at least one of the first order and the first contra order in the first match is conditional, a conditional match can be generated and information about the match is stored. A firm up message is sent to the source of each conditional order. Fills for the tradable item are not executed until each conditional order of the match is firmed-up. A conditional match can be released if firm-up does not occur within a predefined period of time.

Firm up messages can include a MatchID number associated with the particular match that is being firmed up. A firm-up response can be matched to the relevant strategy match based on a MatchID value included in in the response. A firm up response can include an update to the respective conditional strategy order being firmed up or a replacement non-conditional strategy order for the respective conditional strategy order being firmed up.

In an embodiment, order data stored in the order book can include AvailableCapacity of the respective order, wherein AvailableCapacity indicates order capacity available for that order that can be applied to a subsequent match with a contra order. In various embodiment, order capacity can be specified in terms of available volume rate or range of rates for the respective order, in terms of an available quantity, or by other measures. When the first strategy order and first contra strategy order are matched, the available capacity of each order can be reduced by an expected total quantity of shares to exchange between the first order and the first contra order during the first match, by the maximum volume rate compatible with the respective strategies of the first strategy order and first contra strategy order, or by other measures. If the available capacity of the first order remains greater than zero or a minimum threshold value, the first order can be matched to additional contra orders while the first match remains active.

In an embodiment, a strategy order can further specify an alternative strategy and a predefined condition for activating the alternative strategy. The condition for triggering use of the alternative strategy can be specified as a differential between a current price of the relevant security and the limit price of the strategy order.

In an embodiment, strategy order change messages can be received specifying that a quantity or limit price for a respective strategy be changed. A strategy order change message can specify a strategy to be used to replace a current strategy of the respective order.

In an embodiment, a HERO system comprises a computerized system with appropriate hardware, memory, and network access to support the desired level of trading, and wherein the system operates in accordance with computer software stored in the computer memory. The HERO system is configured to communicate with a strategy matching venue and with an automated computerized algorithmic trading platform connected by a network to at least one exchange venue.

The algorithmic trading platform operates to process a transaction order specifying a tradeable item, which could be a security, a quantity, side, and having an associated algorithmic constraint by intermittently generating sub-orders from the transaction order in accordance with the algorithmic constraint. Sub-orders specify a respective sub order quantity and are issued to a point-in-time (PIT) trading venue. PIT execution messages are received, each PIT execution message corresponding to a respective sub order and indicating a fill amount for the respective sub-order, the fill amount being less than or equal to the respective sub-order quantity.

A first strategy order corresponding to the transaction order is generated, the first strategy order specifying the security and side of the transaction order and a respective strategy selected from a predefined set of strategies in accordance with rules in a set of predefined strategy mapping rules and at least one attribute of the transaction order by the HERO system. A plurality of sets of predefined strategy mapping rules can be defined and a particular set of strategy mapping rules selected based on attributes of the particular transaction order, such as the trader or trader group from which the transaction order was issued.

Information about the first strategy order is added to a strategy order table and the first strategy order is issued to the strategy matching venue.

On receipt of a match-found condition message from the strategy matching venue for the first strategy order, the algorithmic trading platform is controlled by the HERO system to halt generation of sub-orders for the transaction order corresponding to the first strategy order.

On receipt from the strategy matching venue of an execution message associated with the first strategy order specifying an execution for the first order of a respective traded quantity and trading price data for the first strategy order in the strategy order table is updated to reflect the execution amount and execution information from the execution message is sent by the HERO system to the algorithmic trading platform.

On receipt of a match-broken condition message from the strategy matching venue, the algorithmic trading platform is controlled to resume issuing sub-orders for the first algorithmic transaction order, wherein generation of sub-orders is resumed if there exists at least one latent share available for the transaction order.

In an embodiment, available quantity information for the transaction order is received from the algorithmic trading platform and quantity data in the strategy order table record for the first strategy order is updated based on the received available quantity information. In response to receiving execution data from the strategy matching venue record data for the first strategy order in the strategy order table is adjusted to reflect the execution data.

In an embodiment, the first strategy order may specify a maximum number of shares available for strategy matching or this can be determined at a later time. The maximum number of shares available for strategy matching can be the number of latent shares (unexecuted shares in the order that have not been routed to a trading venue) for the first strategy order minus a buffer value.

In an embodiment, the first strategy order is a conditional strategy order. In response to receipt of a firm up message from the strategy matching venue for the first strategy order, a firmed-up number of shares available for strategy matching in connection with the first strategy order is determined and a firm-up response sent the strategy matching venue. In an embodiment, the firmed-up number of shares can be a number of latent shares associated with the first algorithmic order, or alternatively can be a number of residual shares associated with the first algorithmic transaction order. In an embodiment, the firmed up response can be an update to the first strategy order specifying a firmed-up number of shares or alternatively a second strategy order having content specifying the firmed-up number of shares and which is associated with first order ID or links to the first order ID and a second message cancelling the first strategy order in favor of the second strategy order can optionally also be sent by the HERO system.

In an embodiment, in response to receipt by the HERO system of the firm up request, the HERO system can send a cancel order instruction to the algorithmic trading platform requesting cancellation of any outstanding child orders associated with the first algorithmic order and perform the firm-up response process with the strategy trading platform after receipt of a cancellation confirmation message from the algorithmic trading platform.

In an embodiment, information about active strategy orders in the strategy order table comprises content indicating a current number of latent shares available for the first algorithmic order, wherein the number of latent shares is updated in response to receipt of order execution information for the transaction order from the algorithmic trading platform. In response to a change in the maximum number of shares available for strategy matching for the first strategy order, a message can be to the strategy matching venue indicating the change.

In an embodiment, a PRO system comprises a computerized system with appropriate hardware, memory, and network access to support the desired level of trading, and wherein the system operates in accordance with computer software stored in the computer memory. The PRO system is configured to communicate with a strategy matching venue and an order or execution management system. The strategy matching venue processes strategy orders for respective securities by matching a strategy order having a specified strategy with a contra strategy order having a compatible strategy and initiating a stream of transaction executions between the matched orders. The management system issues algorithmic orders to an algorithmic trading system.

A first transaction order is received at the PRO system from the management system identifying a tradeable item, such as a security, a side, a limit price, and an algorithmic constraint. A first strategy order corresponding to the transaction order is generated, the first strategy order specifying the security and side of the transaction order and a respective strategy selected from a predefined set of strategies in accordance with rules in a set of predefined strategy mapping rules and at least one attribute of the transaction order. A plurality of sets of predefined strategy mapping rules can be defined and a particular set of strategy mapping rules selected based on attributes of the particular transaction order, such as a trading desk or broker to which the transaction order was issued.

A conditional first strategy order is generated having a first order ID and content specifying the tradeable item, side, and limit price from the transaction order and further specifying first strategy type. Information about the first strategy order is added to a strategy order table and the first strategy order is issued to the strategy matching venue by the PRO system.

In response to receipt of a firm up message from the strategy matching venue for the first strategy order, the PRO system can send an order cancelation message to the management system indicating least a portion of the transaction order issued to an algorithmic trading platform be cancelled. On receipt of a cancellation confirmation from the management system a firmed-up number of shares available to the first strategy order for strategy matching is determined and a firm-up response is sent to the strategy matching venue indicating the firmed-up number of shares. In an embodiment, the firmed up response can be an update to the first strategy order specifying a firmed-up number of shares or alternatively a second strategy order having content specifying the firmed-up number of shares and which is associated with first order ID or links to the first order ID and a second message cancelling the first strategy order in favor of the second strategy order can optionally also be sent.

A match-found condition message from the strategy matching indicates that the firmed-up first strategy order has been matched with contra strategy order. If a match-found condition is not received within a predefined timeout period, a reissue message is sent to the management system indicating that the cancelled portion of the first transaction order can be reissued.

On receipt from the strategy matching venue of an execution message associated with the first strategy order specifying an execution for the first order of a respective traded quantity and trading price, the record for the first strategy order in the strategy order table is updated to reflect the execution amount and execution information from the execution message is sent to the management platform by the PRO system.

A received match-found message can include an indication of a maximum number of traded shares for the strategy order that can result from the match. In response, a message can be sent by the PRO system to the management system with this value, wherein the management system can reissue the algorithmic order with a number of shares available after assuming the maximum number is filled by the strategy matching venue.

On receipt of a match-broken condition message from the strategy matching venue, a message is sent to the management system indicating that it can reissue the unfilled portions of the transaction order to the algorithmic trading platform.

DESCRIPTION OF THE DRAWINGS

Further features and advantages of the invention, as well as structure and operation of various implementations of the invention, are disclosed in detail below with references to the accompanying drawings in which:

FIG. 19 is a table showing a set of order strategies.

DETAILED DESCRIPTION

Figure 1:
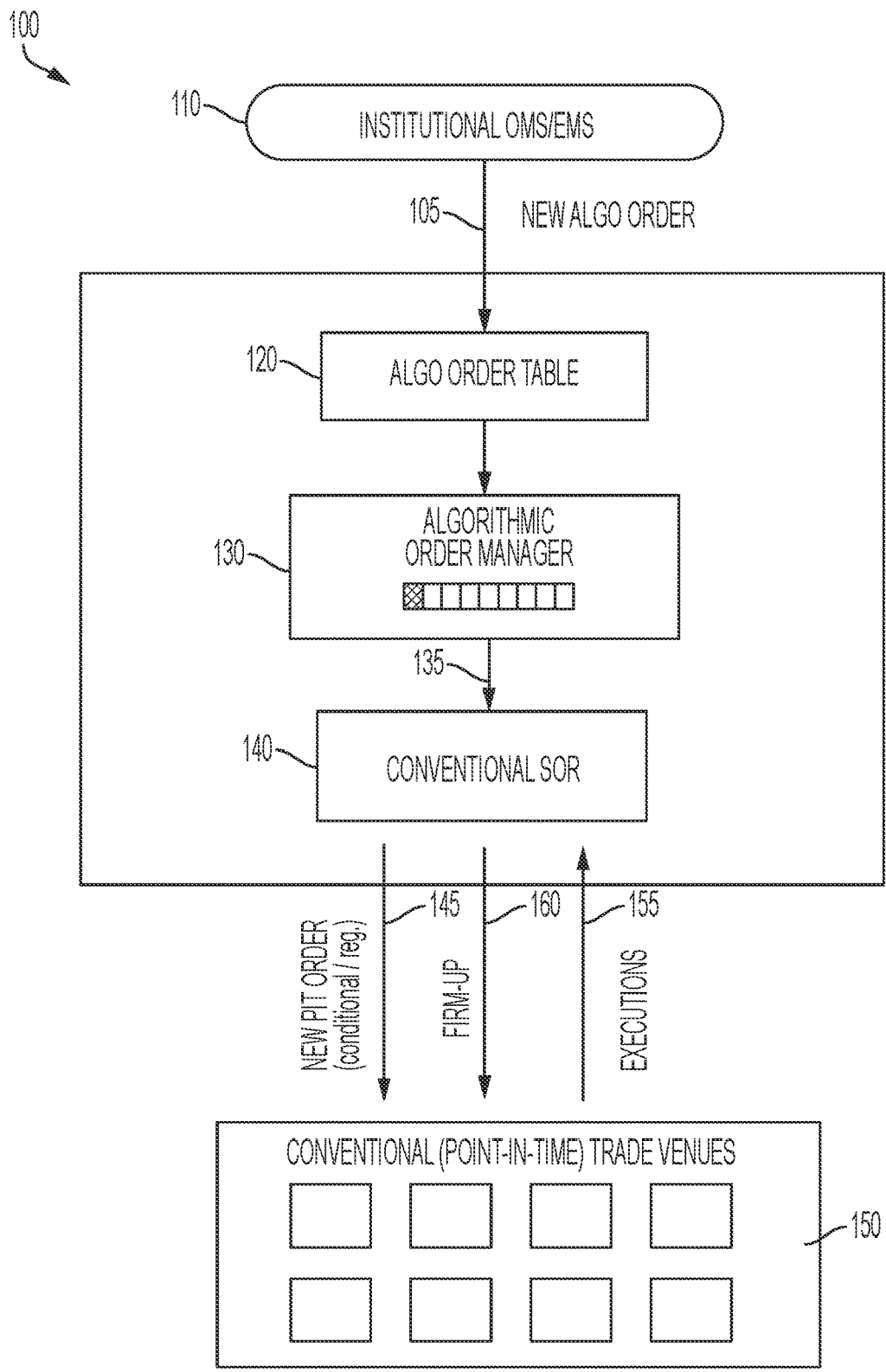
FIG. 1 is a high-level block diagram showing the system architecture for a conventional algorithmic trading platform.

FIG. 1 is a high-level block diagram showing the general system architecture of a conventional algorithmic trading platform (Algo platform) 100 used for processing orders to buy or sell securities. Algorithmic orders (Algo orders) 105 are issued from an institutional order management system (OMS) or an execution management system (EMS) 110 and sent to the Algo platform 100. An algo order 105 will specify a side (buy or sell), a quantity, and a limit price. Incoming algo orders 105 are added to an algo order table 120 used to keep track of information about open algo orders. When an algo order in the algo order table 120 is selected to be processed, an algorithmic order manager 130 operates to divide the algo order into many smaller discrete child orders. Child orders 135 are continually "sliced" from the parent according to a specified execution algorithm. An incoming algo order 105 may also include general instructions that are used by the algo order manager 130 to control the child slicing to spread executions over time and/or over market volume.

The child orders 135 are processed by a smart order router ("SOW") 140 that divides the child orders into even smaller discrete grandchild orders 145. The SOR 140 directs grandchild orders 145 to selected PIT (point-in-time) trading venues 150. Each trading venue 150 performs point-in-time (PIT) transactions, matching a received order with a contra order and performing for each match a single execution of a single discrete quantity of the security being exchanged at a given price and at one point in time. Execution information 155 is returned from the respective PIT trading venues 150 to the Algo trading platform 100 which uses it to update internal data related to the grandchild, child, and initial order 145, 135, 105 as appropriate.

If an order placed with a PIT trading venue 150 is conditional, when the PIT trading venue finds a match for that order with a contra order, it sends an invitation to the order originator, such as SOR 140, inviting it to send a firm-up response order. If a firm-up response order 160 is received, the firm up response order replaces the conditional order, which is canceled, and the firm-up response order is processed instead.

Figure 2A:
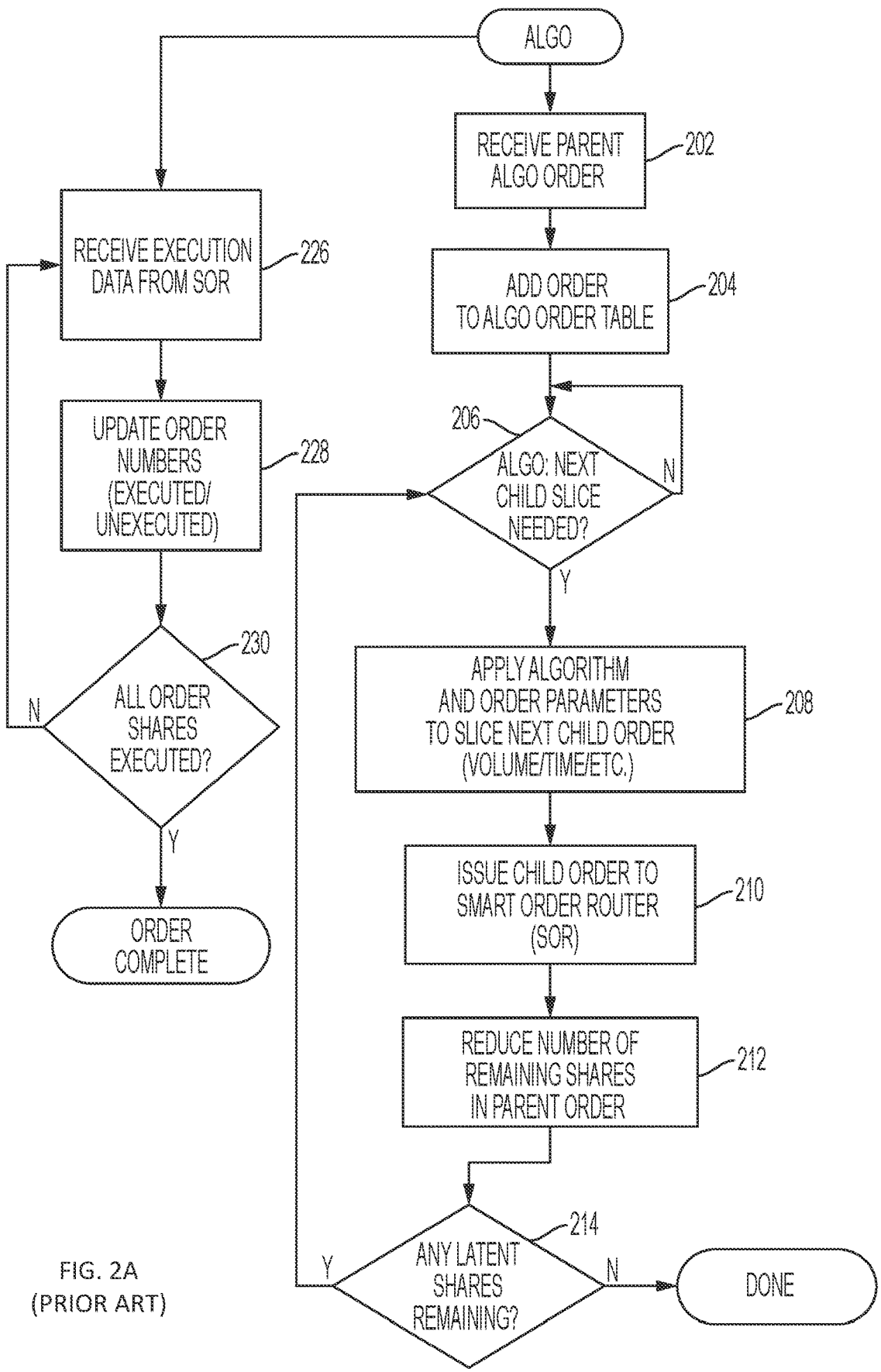
FIGS. 2A and 2B are high-level flow charts of the general operation of a conventional algo order manager and conventional.
Figure 2B:
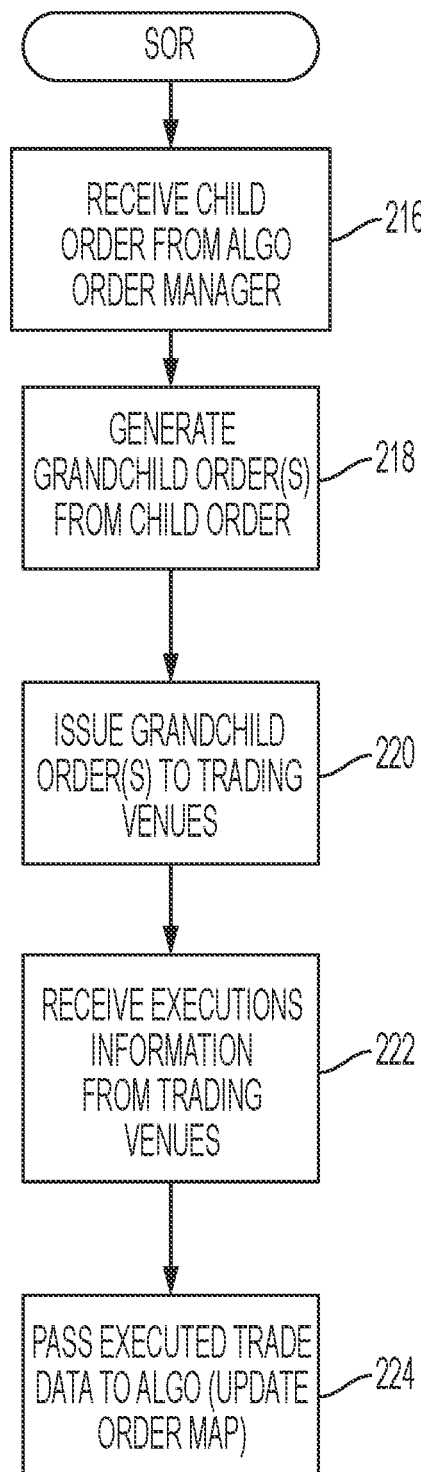

FIG. 2A is a high-level flow chart of the general operation of a conventional algo order manager 130. FIG. 2B is a high-level flow chart of the general operation of a conventional SOR 140. Turning to FIGS. 2A and 2B, when an initial algorithmic order is received, e.g., to buy N shares of security XYZ, (step 202), information about the order, including the initial number of shares, is added to the algo order table (step 204). If an initial or next child slice is needed, the appropriate algorithm and order parameters are applied to slice out a new child order (steps 206, 208), e.g., for n shares, where n may be much less than N. The child order is issued to the SOR for downstream processing (step 210) and the algo order table (or other appropriate data set) is updated to indicate the number of latent shares in the original algo order, e.g., a number of shares which have not been allocated to an issued child order and so are available to be sliced into further child orders and sent out for execution. (Step 212). If any latent shares are remaining in the algo order (step 214), the system continues to slice off and issue child orders according to the applied algorithm (steps 206-212). Once there are no remaining latent shares (step 214), no additional child orders need to be sliced.

Turning to FIG. 2B, when the SOR receives a child order from the algo order manager (step 216), it generates grandchild orders and then issues those to PIT trading venues for execution (steps 218, 210). Execution information from the PIT trading venues is received by the SOR (step 222) and execution data is passed back to the algo order manager (step 224).

Returning to FIG. 2A, when child order execution data is received from the SOR (step 226), the algo order manager updates information about the algo order in the algo order table to reflect the quantity of shares exchanged in the executed transaction (step 228). If the total number of executed shares is less than the total shares of the algo order (e.g., less than N) (step 230), the algo order manager will continue to wait for additional execution data from the SOR. (Step 226). When there are no remaining shares, the entire algo order has been filled (step 330). Additional steps may be taken where issued algo orders, child orders, and/or grand-child orders are conditional orders in order to firm up the respective order as appropriate.

Figure 3:
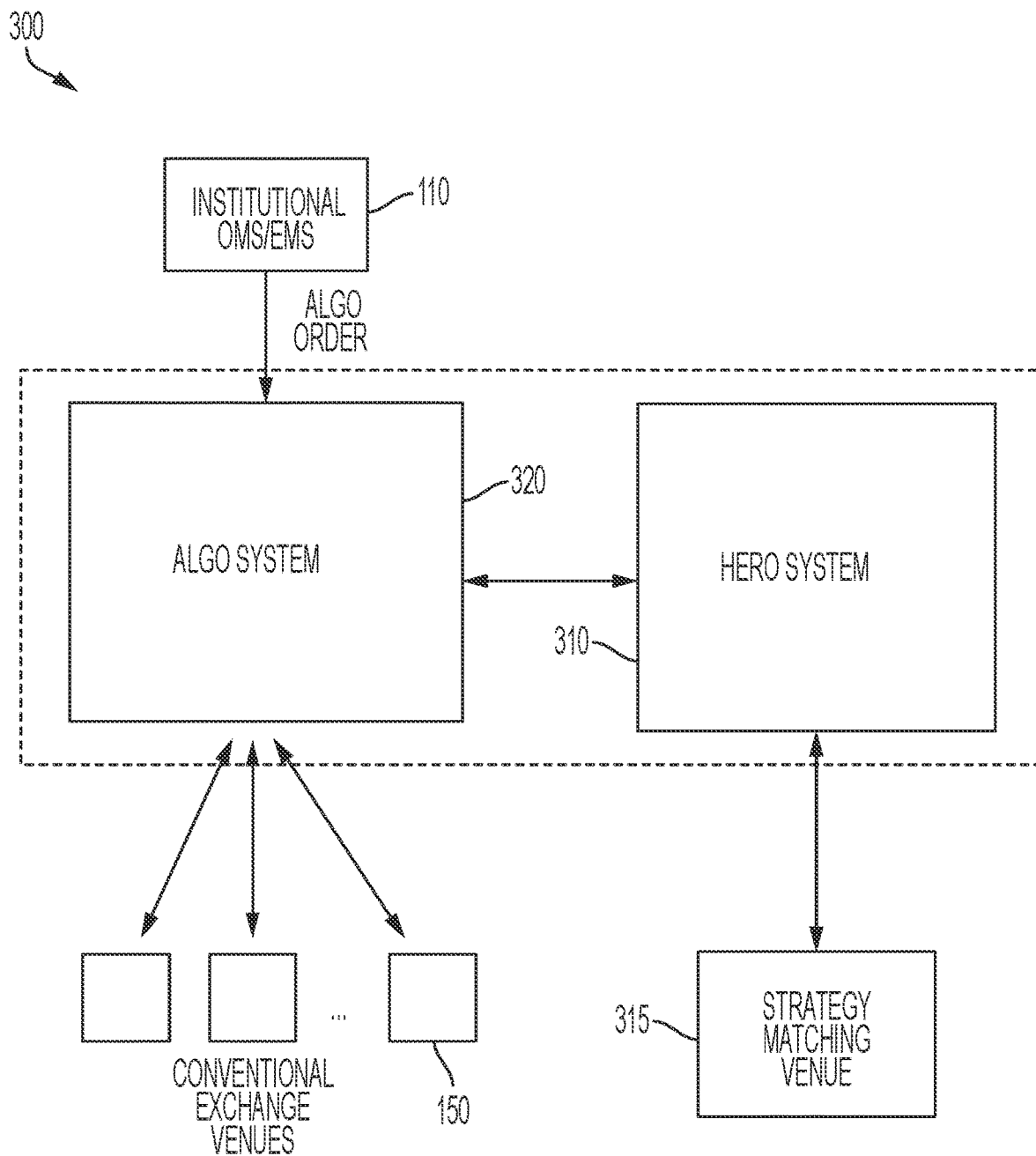
FIG. 3 is a high-level block diagram of an improved trading system architecture according to a first major embodiment of the invention.

FIG. 3 is a high-level block diagram of an improved trading system architecture 300 that can execute strategy orders using a strategy matching platform and that can be implemented and operate in conjunction with a conventional algorithmic trading system.

Analogous to an algorithmic order, a strategy order specifies the order security (or other tradable item), a side (e.g., buy or sell), and a limit price. In addition, and contrary to conventional trading systems, a strategy order also specifies a strategy type that is selected from a predefined set of strategies. Each strategy order type can have a different execution rate or range of rates. Advantageously, the strategy matching system can implement trading strategies that are not supported by conventional algo systems, such as executing in excess of 100% of volume traded in the marketplace in a given period of time.

A wide variety of different strategy types can be defined. Different predefined sets of strategies can be made available for use in different circumstances, for use in trading different types of tradeable items, and by different entities. Each institutional trader or broker dealer may have its own set of customized and proprietary strategy types. Each strategy type has a rate or range of rates, can be matched to itself and may be matchable to one or more other strategy types in the predefined set and possibly in other predefined sets of strategies. Strategy matches can be prioritized. In an embodiment, strategies can be prioritized according to the relative liquidity rate. Where one strategy can be matched by two or more other strategies, matching strategies that provide a greater rate can be given a higher priority.

While a wide variety of different strategies can be defined, in an embodiment, the strategies fall into three basic classes. A first strategy class comprises strategies that have a reference rate or range of reference rates less than or equal to 100%. As addressed further below, the reference rate of a strategy is used in determining the rate of execution of a strategy order, for example, where a quantity of execution is determined from a given rate applied to a particular record of traded volume of the item at issue. A second strategy class comprises strategies that have a reference rate or a range of reference rates greater than 100%. A third strategy class is liquidity seeking and has a non-numeric rate (or infinite) that indicates that the maximum rate permitted during the strategy order processing will be used.

Returning to FIG. 3, a High Efficiency Rate Optimizer ("HERO") system engine 310 is connected one or more strategy matching venues 315. The HERO system operates to issue strategy orders to strategy matching venues 315. The strategy matching venue 315 will attempt to match a received strategy order with a contra strategy order for the same security and that has a compatible strategy.

When a match is found by the strategy matching venue 315, a series of executions is performed for the matched orders in accordance with the compatible aspects of the respective strategy types for the matched orders. Instead of matching discrete and independent sub-orders as performed in a conventional algo trading system 100 working with a PIT trading venue 150, strategy matching venue 135 matches are open-ended and can maximize liquidity to the fullest extent available to the matched strategy orders. A single match can result in a continuous stream of fills based on a reference rate and consolidated traded volume and the strategy matching venue implemented so this can be done without having to access the continuous market. Execution prices can be based on current market price for the security as reflected by market trading data and the volume of the execution determined as a function of the trading strategy of the orders and current reference market data, such as the volume of trading for that security as reflected by the market data. The stream of fills ends when marketable liquidity between the matched strategy orders is exhausted.

As discussed further below, algo orders can have an associated algorithmic constraint, such as a target rate that the algo trading platform tries to match. A strategy order can be generated for an algo order by selecting a strategy from the predefined set of strategies according to predefined strategy mapping rules. Different sets of strategy mapping rules can be defined by different system users and the particular mapping table used can be selected, for example, according to the party that issued the initial order. The predefined strategy mapping rules can be static and map to particular strategies based on the algo order target rate. The strategy mapping rules can also be dynamic, wherein the strategy mapped is dependent on factors such as a percentage of algo order that has completed, market data inputs related to security at issue, and/or other direct or indirect factors.

FIG. 19 is an example of a set of predefined strategy types and a matrix illustrating which strategy types match with which other types and matching priority. In the illustrated embodiment, a rate range strategy of LOW is defined as having a reference rate range between 5% and 15% while a strategy of MEDIUM is defined as having a reference rate range between 10% and 30%. Strategy orders with a LOW strategy will be processed at a strategy matching venue so that when the order is matched, executions will be at a rate between 5% and 15% of relevant traded volume with the actual rate dependent on the strategy of the matched contra order or orders as discussed further below. Similarly, strategy orders with a MEDIUM strategy will execute at the strategy matching venue at a rate between 10% and 30% of relevant traded volume. Rate strategies of 100%-200% and 100%-400% indicate execution rate ranges that exceed 100%. A precise rate strategy specifies a single reference rate, such as 7%, for executions within the strategy matching venue. Strategies can have other ranges as well. The number of predefined strategies in a strategy set can vary and increasing the number of strategies can increase rate granularity between various strategies. Strategies can be defined with a deliberate overlap to allow the overlapping strategies to be crossed-matched to each other.

The LOW and MEDIUM strategies can match to each other since both strategies permit a rate between 10% and 15% and so a trade in connection with the LOW strategy type may be used to fulfill at least part of a contra trades made by a MEDIUM strategy order (which executes at a higher rate) without violating the designated strategy rate range of either order. In practice the rate used for executions in the strategy matching venue is the maximum rate of the overlap, here 15%, although in alternative embodiments lower rates could be used if deemed appropriate for particular trading circumstances. Similarly the 100%-200% and 100%-400% strategy types are compatible in this regard as an order with a 100-400% strategy could at least be partially filled by an order with a 200% strategy. The liquidity seeking strategy matches all rate based strategies and liquidity seeking strategies.

Where a given strategy can be matched to multiple different but still compatible contra strategies, the match having the highest potential liquidity can be given priority. In FIG. 19, the strategy match priority is illustratively indicated by the sequence number 1-5 with 1 indicating the highest priority. By way of example, a buy order with a MEDIUM (10%-30%) strategy would preferentially be matched to a contra order with a liquidity seeking strategy, and if none was available to a MEDIUM strategy, and if none was available to a LOW (5%-15%) strategy order.

Once a strategy order is matched to a contra strategy order, if there is additional capacity available for the strategy order, that strategy order can be matched to another contra strategy order, and where that other contra order may have a strategy that might otherwise not be compatible. For example, a strategy order specifying a 5-15% strategy could be matched against a contra strategy order having a precise strategy rate of 11%. Since the strategy match will execute at an 11% rate, the initial strategy order has a remaining capacity (while the initial strategy match is in force) of 15%-11%=4% and so could simultaneously be matched against a second contra order with a strategy (or remaining strategy capacity) of <=4%.

In a set of strategy matching rules, an algo order with a target trading rate of X would tend to be mapped to a strategy having a reference rate ranging from A to B, where A<=X<=B. However, this is not required any mapping desired by the user could be specified. Moreover, even within this condition, where more than one strategy has a reference rate range encompassing X, different users could define their own strategy matching rules that map the order to different strategies. For example, a first user may specify a rule that resulting in an algo order specifying an algo target rate of 12% mapping to the 5%-15% strategy while a second user specify a rule resulting in an algo order with same target rate of 12% mapping to the 15%-30% strategy. A third user could specify that any algo order with a reference rate between 5% and 12.5% map to 5%-15% strategy while an order with a reference rate greater than 12.5% and less than 35% be mapped to 10%-30% strategy.

Examples executions for strategy orders A and B having strategies selected from those of FIG. 19 is shown below for a traded volume V for the relevant security of 10,000. The examples assume that the strategy orders are marketable and each has the available capacity for the determined quantity to be exchanged. If either order's capacity is below the calculated quantity, the lowest capacity will determine the quantity exchanged.

| Strategy A | Strategy B | Strategy Basis applied | Quantity exchanged |
| --- | --- | --- | --- |
| 5-15% | 5-15% | 15% | 1500 |
| 5-15% | 10-30% | 15% | 1500 |
| 5-15% | 7% | 7% | 700 |
| 10-30% | 10-30% | 30% | 3,000 |
| 10-30% | Liquidity seeking | 30% | 3,000 |
| 100-200% | 100-400% | 200% | 20,000 |
| 100-400% | 100-400% | 400% | 40,000 |
| 100-400% | Liquidity seeking | 400% | 40,000 |
| Liquidity seeking | Liquidity seeking | Block | Full available capacity for matched orders |

In operation, strategy matching venue 315 will continue executing a sequence of trades for a match using a quantity calculated from the applied strategy reference rate and the most recent traded volume (at the corresponding traded price) or the mid of the current bid-offer for a block of liquidity seeking to liquidity seeking match until the capacity of the orders in the matched pair has been exhausted or one of the orders otherwise becomes unmarketable.

The HERO system 310 is also in communication with an algo trading platform engine 320 configured to operate in conjunction with the HERO system (and which may be referred to herein as a HERO-aware algo platform). Algo trading platform 320 and the HERO system 310 can all be implemented as part of an overall sell-side or buy-side broker dealer system and there are various ways to integrate the systems. When an eligible algo order is placed with the algo trading platform 320, the HERO system 310 generates a corresponding strategy order and issues this strategy order to a strategy matching venue 315. While one strategy matching venue 315 is shown, there could be multiple strategy matching venues available and the HERO system 310 can be configured to select an appropriate strategy matching venue as desired. The strategy matching venue(s) used for a given strategy order can be defined in advance or may be dynamically selected based on a variety of factors, such as the type of tradeable item at issue or other details about the order.

Overall processing of the strategy order by the HERO system 310 and the respective strategy matching venue 315 and processing of the corresponding algo order by the algo trading platform 320 and PIT venues occurs broadly in parallel. A strategic match for the strategic order takes priority over the algorithmic processing of the corresponding algo order. Messages are exchanged between the HERO system 310 and the algo trading platform 320 and the HERO system 310 instruct the algo trading platform 320 to start and stop algorithmic processing of the algo order during the streaming of fills from a strategic match by a strategy matching venue. Messages are also exchanged to keep both the HERO system 310 and the algo trading platform 320 up to date as to the status of filling the respective algo order and corresponding strategy order.

The total number of executed shares resulting from a strategic match may be unknown at the time the match is made by a strategy matching venue 315. When the strategy matching venue 315 finds a match it will inform the HERO system 310 of the existence of a match-found condition message, also referred to herein as a "Stream ON" condition, for the relevant strategy order. The HERO system 310 will subsequently inform the Algo trading platform 320 of the Stream ON condition and instruct the Algo trading platform 320 to stop slicing new child orders for the corresponding algo order.

When the stream of fills is ended at the strategy matching venue 315 it sends the HERO system 310 a match-broken condition message, also referred to as a "Stream OFF" condition, for the relevant strategy order. The HERO system 310 is also informed by the strategy matching venue 315 of the total number of fills executed during the strategic match, such as while fills are executed at the strategy matching venue, or in total after the stream ends. The HERO system 310 updates its internal records related to the strategy order. It also informs the Algo trading platform 320 of the Stream OFF condition and of the total number of fills (if that information has not already been provided). The Algo trading platform 320 can then update its own internal records for the corresponding algo order. If the algo order is not completely filled, Algo trading platform 320 can resume algorithmic processing of the remainder and the Hero system 310 and strategy matching venue 315 can continue in parallel to process the corresponding strategy order.

Additional messages can also be sent between strategy matching venue 315, the HERO system 310 and Algo trading platform 320 to firm up conditional orders or as otherwise needed to determine a quantity of shares that can be exchanged for a given order. When a strategy order specifies a total quantity of shares, strategy order updates can be sent by the HERO system 310 to the strategy matching venue 315 to reflect executions that result from activity of the algo system working the corresponding algo order.

In an embodiment, since the HERO system 310 communicates with internal aspects of the algo trading platform 320 the HERO system module 310 can generally be integrated into the same broker dealer system that contains the algo trading platform 320. A broker/dealer could thus install the HERO system into their trading system and modify their Algo order manager to be able to properly communicate with the HERO system and start and stop algorithmic order processing as appropriate. Such an Algo system would then be controllable to pause and resume algorithmic processing of an algo order in favor of processing of a corresponding order placed in parallel with a separate order processing system that may fill the corresponding order, in whole or part, in a more efficient manner.

The algo trading platform system could also be designed or modified to have appropriate APIs or other program hooks, and the internal controls needed to work with a HERO system even if a HERO system is not initially available or is available but run as a separate system. A HERO system module with suitable API interfaces to communicate with the algo platform could then be added separately. There are various ways in which the HERO system 310 can be implemented and integrated with a conventional algo trading platform 320. A particular embodiment is addressed below.

Figure 4:
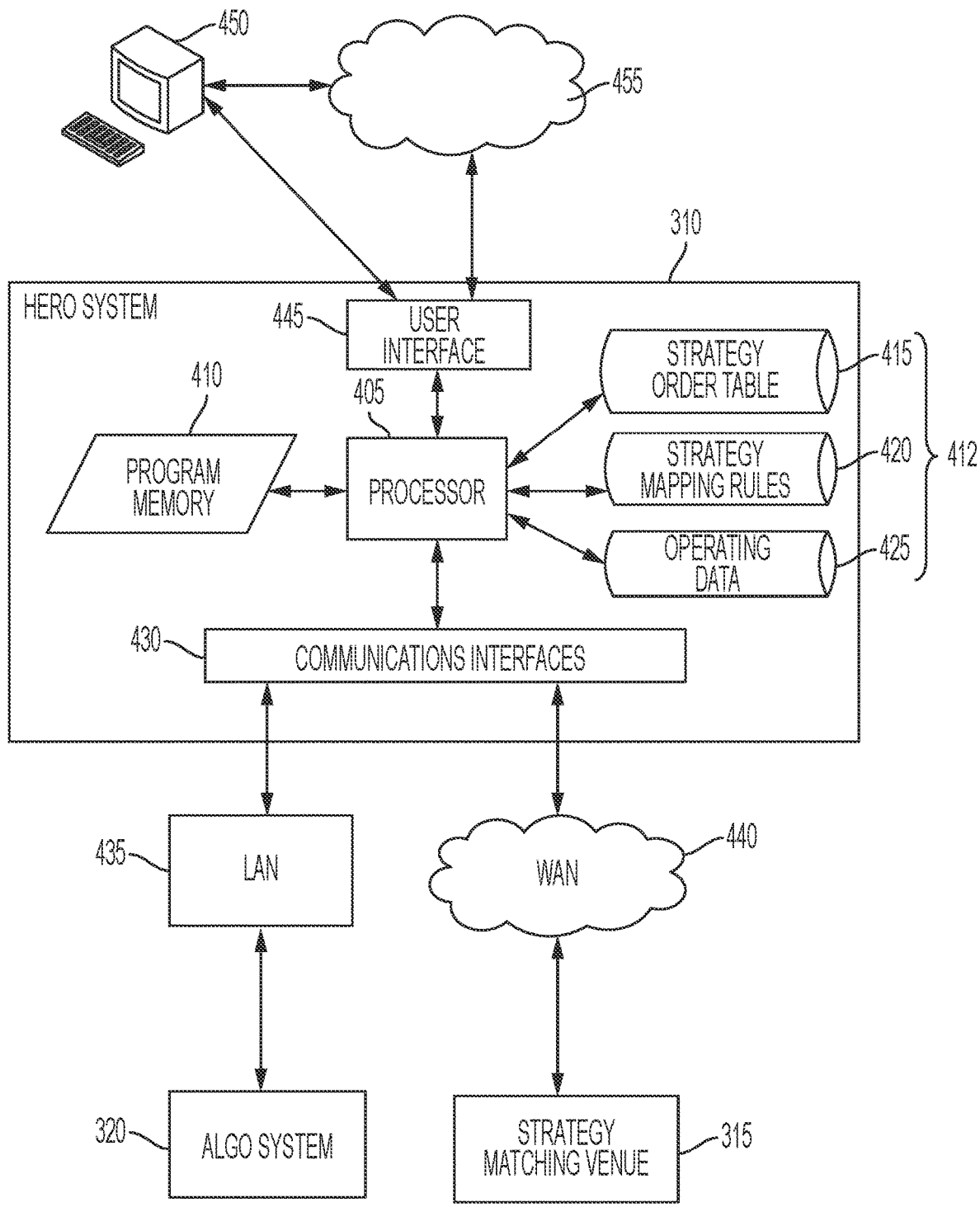
FIG. 4 is a high-level diagram of an embodiment of the HERO system engine of FIG. 3.

FIG. 4 is a high-level diagram of HERO system 315 architecture. One or more computer processors 405 execute computer software stored in a program memory 410. The processor 405 has access to data memory 412 containing one or more data repositories, such as a strategy order table 415, one or more sets of strategy mapping rules, used in generation of a strategy order based on an algorithmic order, and other operating data 425.

Appropriate communication interfaces 430 are used to connect the HERO system 310 to outside systems. In the illustrated embodiment, a LAN 435 provides communication between the HERO system 310 and the algo trading platform 320 while a separate WAN 440 provides communication between the HERO system 310 and one or more strategy matching venues 315. The computer platform used to implement the HERO system can be one or more high speed computers with sufficient data throughput and processing capacity to support the volume of trading expected. LAN and WAN networks 435, 440 can be high-speed optical fiber data networks or other network systems conventionally used in financial trading networks. Suitable computer platforms will be known to those of ordinary skill in the art.

Program memory 410 and data memory 412 may be implemented within the same or different components in full or part. Memory 410, 420 can include one or more of internal RAM and firmware, local electronic data storage, such as solid state or magnetic drives, external data storage provided by a physically coupled memory via a USB or other data cable accessible over a network. Other computer readable medium for storing software and data may also be used. The HERO system 310 can be implemented within one or more computer servers, personal computers, or other computing systems.

A separate user interface 445 can be provided to allow a computing device 450, such as a PC, to access the HERO system 310 to allow an authorized user to perform various administrative functions, such as monitoring HERO system performance metrics, viewing order maps and transaction histories, and adjusting system configuration. Remote device 450 can be locally connected to the HERO system 310 or can be connected through a network 455, such as an Intranet or a secure VPN on the Internet to provide remote monitoring.

The HERO system 310 can be implemented as an internal computer system within the infrastructure for a given broker dealer system, and in an embodiment executes on the same physical computer as the algo trading platform 320 and wherein the processor 405 executes both algo and the HERO system code and the program memory 410 stores the functionality for both systems. In this more tightly coupled embodiment, communication between the HERO system 310 and software modules within the algo trading platform 320 could be implemented a lower level using various internal APIs or other messaging protocols known to those of ordinary skill in the art and a separate LAN connection may not be necessary.

The HERO system 310 could alternatively be implemented as a stand-alone computer system, such as a high-speed server with communication interfaces 430 comprising network ports, such as fiber-optic port, Ethernet, USB ports, or other data communication ports suitable for connection to the LAN 435 and WAN 440 respectively. Various programming techniques to implement such a configuration will be known to those of ordinary skill in the art.

Multiple HERO systems operating in parallel can be used with an algo trading platform 320. Load balancing and other techniques can be used to allocate algo orders to appropriate the HERO systems. Likewise, a broker dealer that has several internal algorithmic order managers could integrate each with a common the HERO system.

Figure 5:
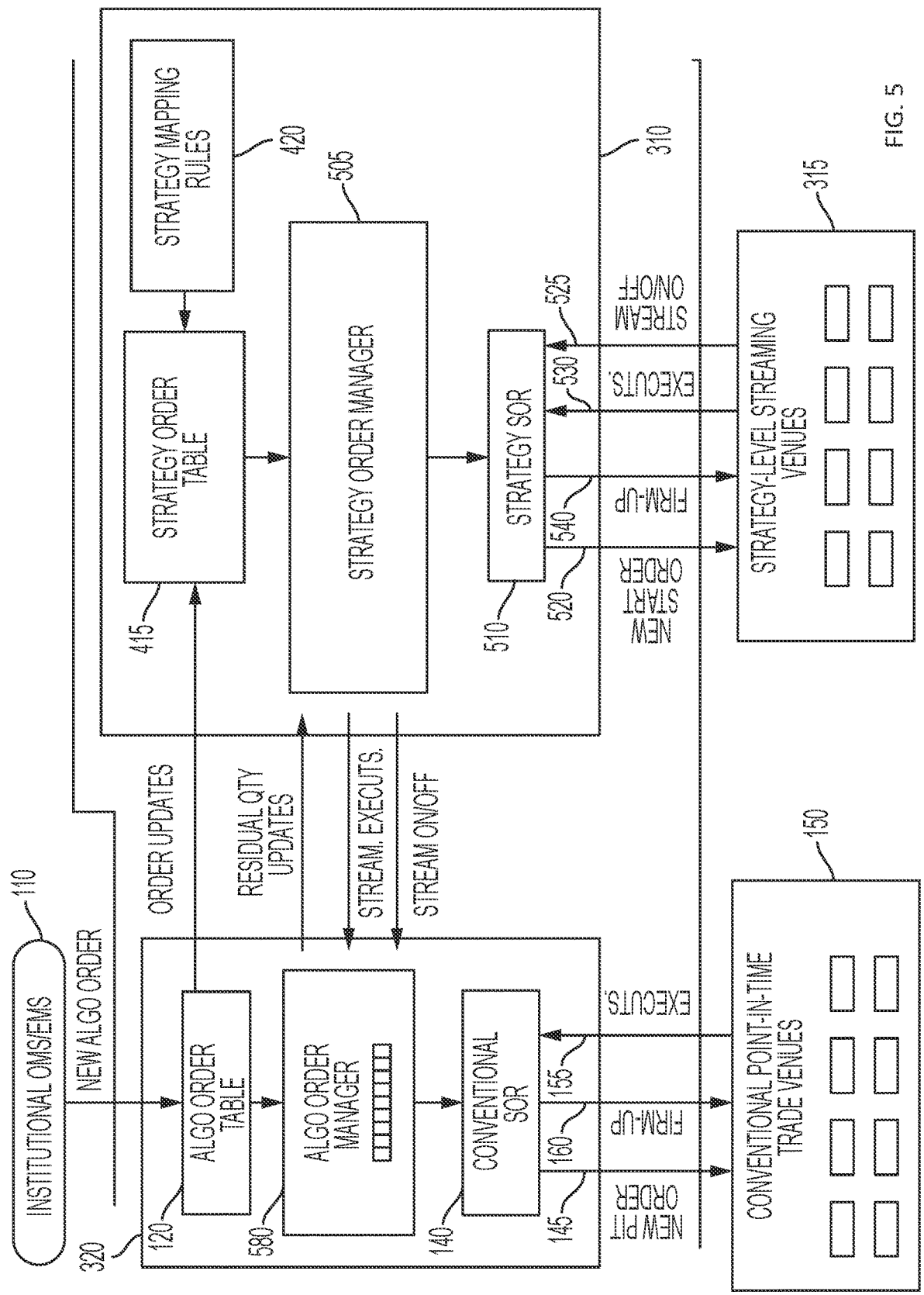
FIG. 5 is a high-level diagram showing functional aspects of an embodiment of the HERO system and communications between the HERO system engine and the HERO system-aware algorithmic trading system.

FIG. 5 is a high-level diagram showing functional aspects of an embodiment of the HERO system 310 and data communications between (i) the HERO system 310 and components within algo trading platform 320 having a HERO system-aware algo order manager 580 and (ii) between the HERO system 310 and one or more respective strategy level strategy matching venues 315. Internal functionality of an embodiment of the HERO system 310 and inter-system communication will be discussed in more detail with respect to the flowcharts of FIGS. 7 and 8.

The HERO system 310 as shown comprises strategy order manager 505 which contains functionality that is primarily responsible for tracking strategy orders, the details of which can be stored in a strategy order table 415, and for exchanging information and messages with the Algo trading platform concerning algo and strategy orders. Order quantities stored in the algo order table 120 and the strategy order table 415 are related to each other but may not be the same. The HERO system may be given access to only a portion of the total quantify specified in the initial order 105 to be made available for use in a strategy order. The difference can serve as a buffer to prevent the risk of over executions.

Communication between the strategy order manager 505 and strategy matching venues 315 can be supported by a strategy SOR 510 that routes communications regarding strategy orders between the strategy order manager 505 and one or more strategy matching venues 315 and can also include functionality to select an appropriate strategy matching venue if more than one is available. While the strategy SOR 510 is shown separate from the strategy order manager 505, the functionality could be combined into an integrated software program. Likewise, functionality within the strategy order manager 505 may be implemented in multiple software components.

Various messages can be passed between the HERO system 310 and respective strategy matching venues 315. These messages comprise strategy orders 520 sent to strategy matching venues 315, Stream ON condition and Stream OFF condition messages 525 received from strategy matching venues 315, and streaming order execution data 530 from strategy matching venues 315 regarding fills. Firm-up orders and other firm-up related messaging 540 is used in the processing of conditional strategy orders. Various messaging protocols can be used, such as the FIX (Financial Information exchange) protocol.

Various messages can also be passed between the HERO system 310 and components of the algo trading platform 320. The messaging protocol used is dependent on the manner in which the HERO system 310 and the algo trading platform 320 are integrated with each other. Various suitable messaging protocols will be known to those of ordinary skill in the art.

When an algo order or algo order update is received by the algo trading platform 320, an order update message 550 can be sent to the HERO system 310. As the algo trading platform 320 works an algo order, information about the order status, such residual order quantity updates 565 can be sent to the HERO system 310 so that the HERO system remains apprised of the number of shares for the corresponding strategy order that are available for strategy matching. When respective strategy matching venues 315 sends stream ON/OFF condition messages 525, corresponding stream ON/OFF condition messages 560 are sent from the HERO system to the algo order manager 580. Likewise execution data 530 received from a strategy matching venue 315 may be passed as an execution message 555 so that the algo trading platform 320 can update its internal records regarding the corresponding algo order.

Figure 6:
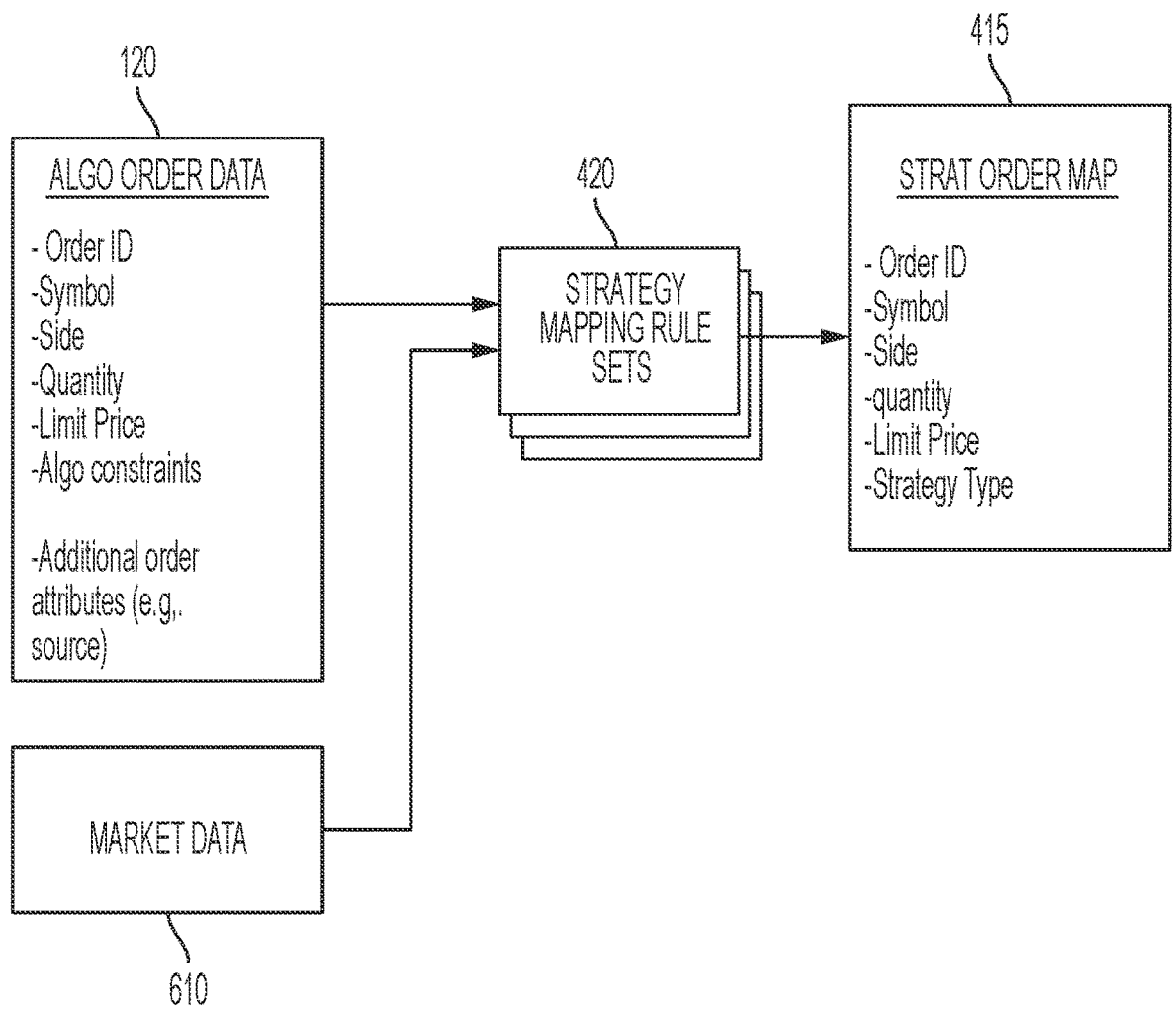
FIG. 6 is an illustration of a strategy order translation map.

When the HERO system 310 detects or is informed of a new algo order, it can generate a corresponding strategy order. One way in which this can be done, and with reference to FIG. 6, is through the use strategy mapping rules 420. The strategy mapping rules 420 can be predefined to reflect the various trading preferences of the participating users. Mapping can be done using any of the algo order details that are available to this process. Additional data may also be referenced. For example, a supplemental order data field in the algo order 105 as sent by the OMS/EMS 110 to the algo trading platform could be used to provide additional information for use by the strategy mapping rules, for example, to directly specify a particular strategy.

Different institutional OMS/EMS 110 or broker dealers may have different preferences as to how to map an algorithmic order with various attributes to strategies in a set of predefined strategies. The provider of the algo trading platform 320 can define or allow its users to define their own mapping rules for use with their orders. When more than one set of rules 420 is available, the HERO system can select the appropriate set of rules or be informed which set to use.

In addition to a static one-to-one mapping as above, a more intelligent dynamic rules can be defined to allow selection of a corresponding strategy based on information external to the specific algo order, such as current or historic market data 610. In the example above of a 12% volume order, a translation mapping could specify matching to the 10-30% strategy if a specified market condition exists, such as an index being above a 30 day average, and matching to 5-15% strategy if the condition does not exist. The HERO system can also operate to monitor relevant market data and responsively adjust strategies for existing strategy orders. Where a strategies selected for existing strategy orders are allowed to be changed over time, the HERO system can periodically reassess the strategies for such strategy orders in the strategy order table, update the strategies as necessary and, send a strategy order change message to the strategy matching venue as appropriate to reflect this change.

The strategy mapping rules do not need to allow mapping to every strategy available. Certain strategies, for example those with reference rates above 100%, may not be suitable for the expected set of algorithmic constraints for algo orders received by the algo trading platform. Such unused strategies might still be specified on strategy orders placed at the strategy matching venue by other sources In one embodiment the HERO system 310 monitors the algo trading platform 320 to detect new algo orders and then generates corresponding strategy orders. In a different embodiment, the algo trading platform 320 may, as part of a process for adding a new algo order to the algo order table 120 also generate a corresponding strategy order at that time and issue the strategy order to the HERO system 310.

Figure 7A:
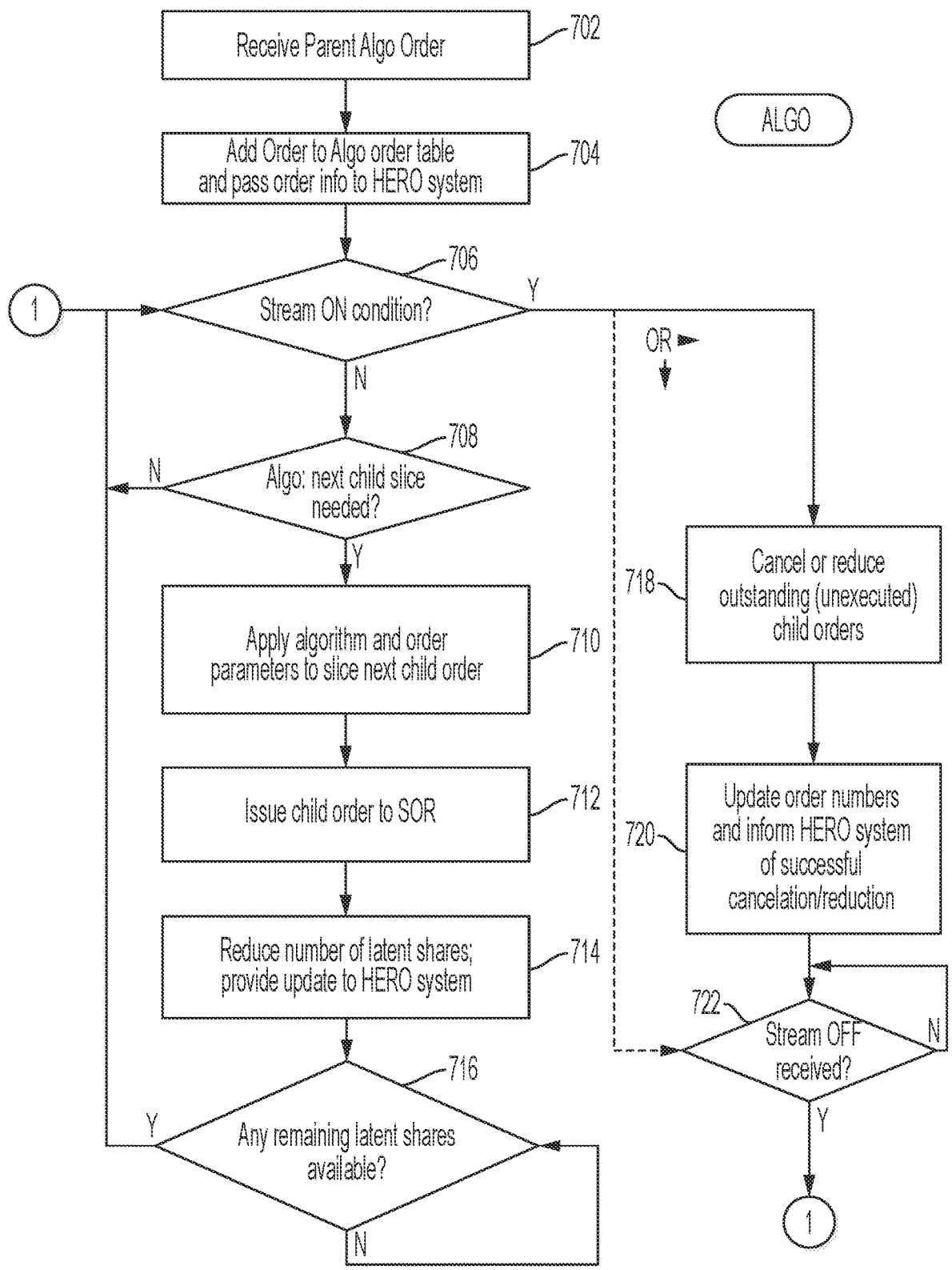
FIGS. 7A and 7B are high-level flowcharts of the operation of the HERO system-aware algo order manager.
Figure 7B:
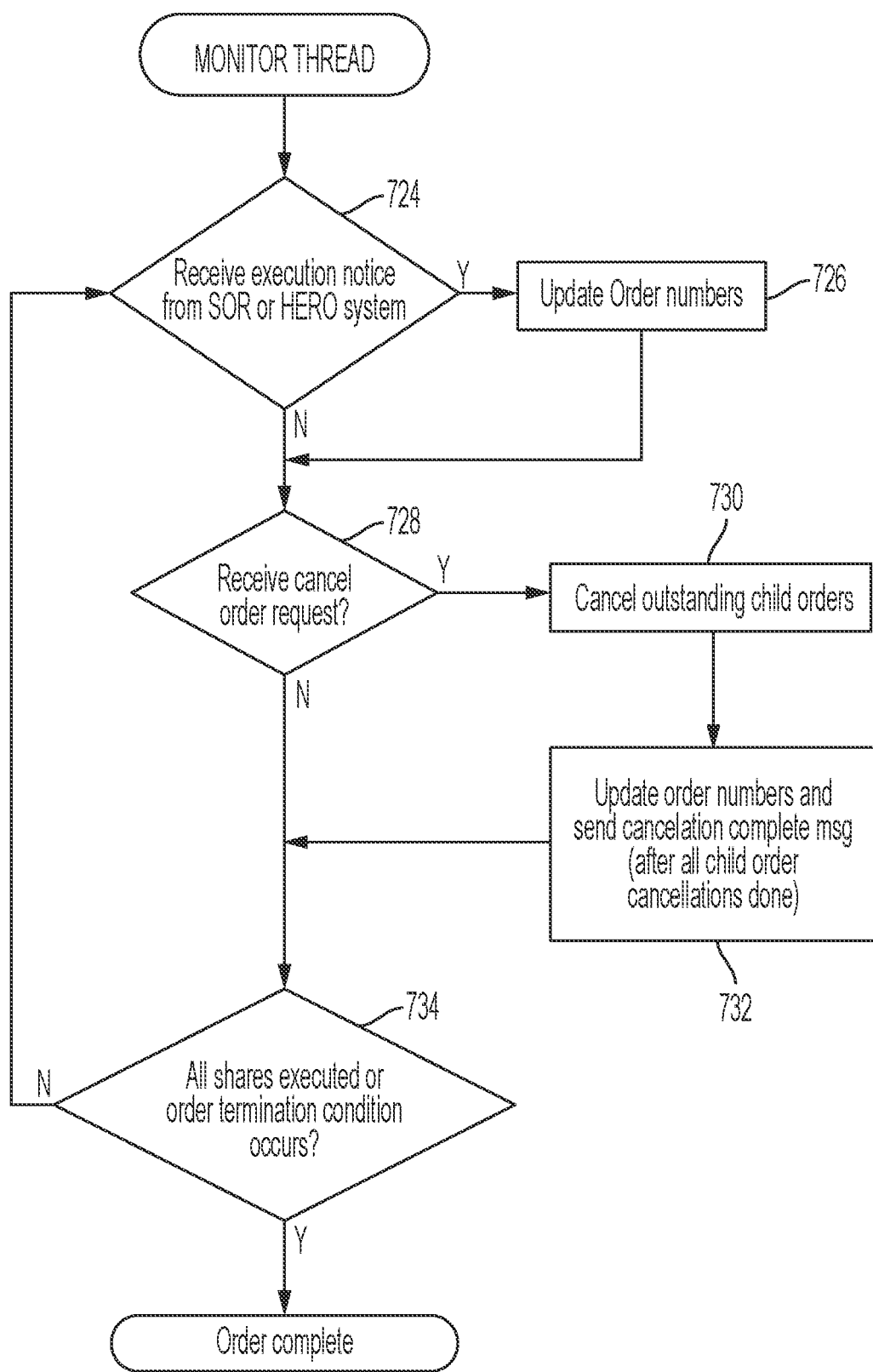

FIGS. 7A and 7B are high-level flowcharts of the operation of a HERO system-aware algo order manager 580 and processing of an algo order through completion. For simplicity the functionality is addressed, in general, to processing of a single parent order. Various techniques to implement the functionality in a system and method for processing multiple independent orders will be known to those of skill in the art.

Turing to FIG. 7A, when a new algo order is received (step 702) the order is added to the algo order table 120 and also passed to the HERO system 310. If a Stream On condition does not exist (step 706), child slices are generated according to the particular algorithm at issue and issued to the SOR 140 (steps 708-712) in a manner analogous to the operation of an algo system 100 without the HERO system. The number of latent shares for the algo order is reduced. Data can also be provided to the HERO system 315 reflecting the change in available latent shares for the algo order, which can impact the quantity available for strategy matching. (Step 714). The slicing process continues until no latent shares remain (step 716).

If a Stream ON condition does exist (step 706), the child slicing process is suspended and the algo order manager 580 waits for a Stream OFF condition to occur (step 722). In an embodiment, already issued but unfilled child orders could remain open, wherein they would eventually be filled. In an alternative embodiment, when a Stream ON message is received, the algo order manager 580 can cancel some or all of any outstanding unexecuted child orders (step 718). Successfully cancelled child orders will decrease the number of latent shares and increase the number of shares available for strategic matching. The HERO system is informed of successful (or unsuccessful) cancelation and associated change in the number of latent shares. (Step 720).

FIG. 7B is high-level functionality of a Monitor process thread that processes execution notices. When an execution notice is received from the ALGO trading platform SOR or from the HERO system 130 (step 724), the appropriate values for the corresponding order in the working algo order table 120 are updated (step 726). If a cancel order request is received from the HERO system 130 (step 728), the outstanding child orders for the relevant algo order are canceled (step 730) and a cancelation complete indication is provided, e.g., to the HERO system 130 (step 732). When all share for the algo order have been filled or an order termination condition occurs and the order is cancelled, (step 734), processing of the order is complete.

Figure 8A:
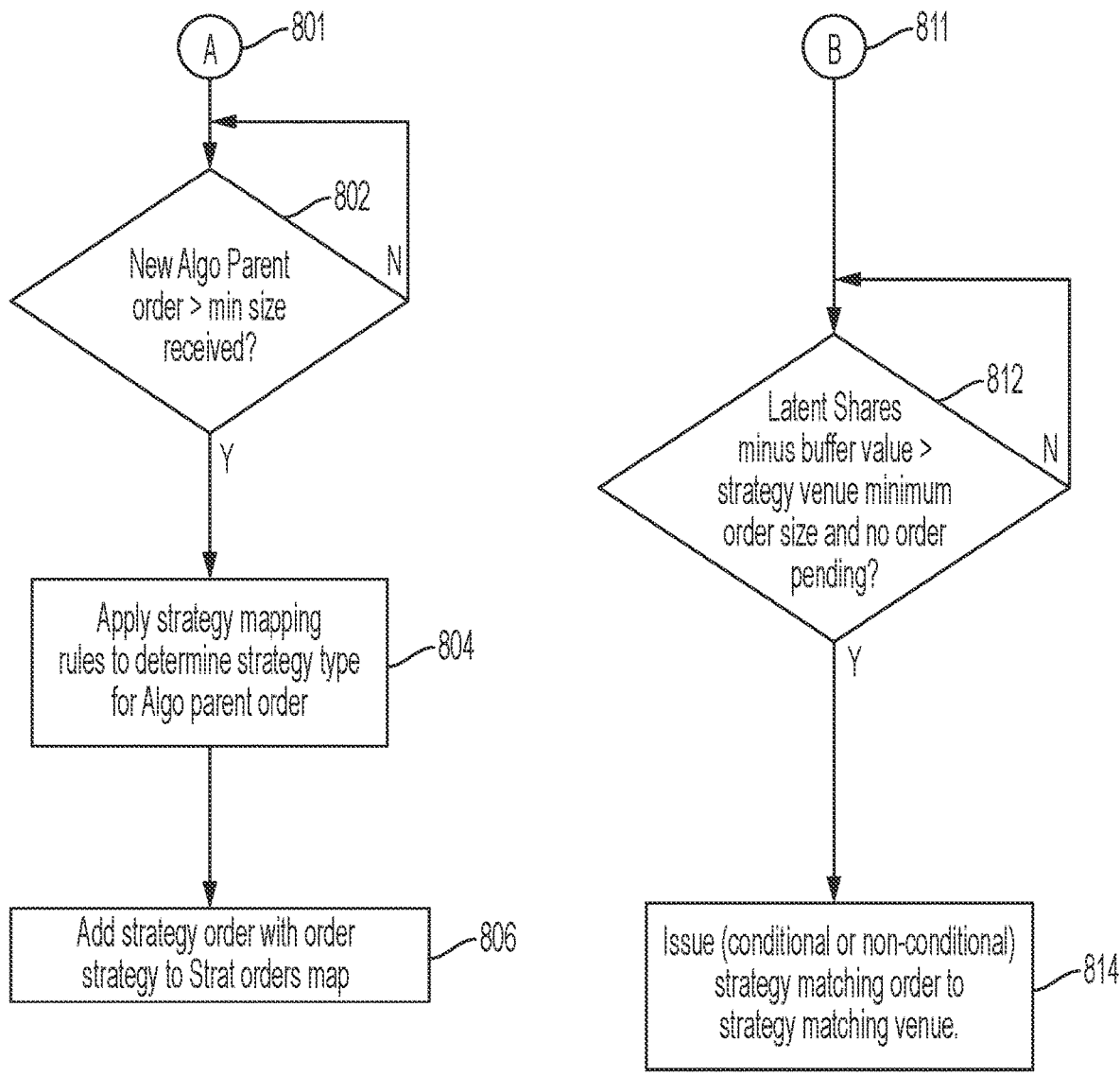
FIGS. 8A-8C are high-level flow chart of the operation of an embodiment of the HERO system in processing orders.
Figure 8B:
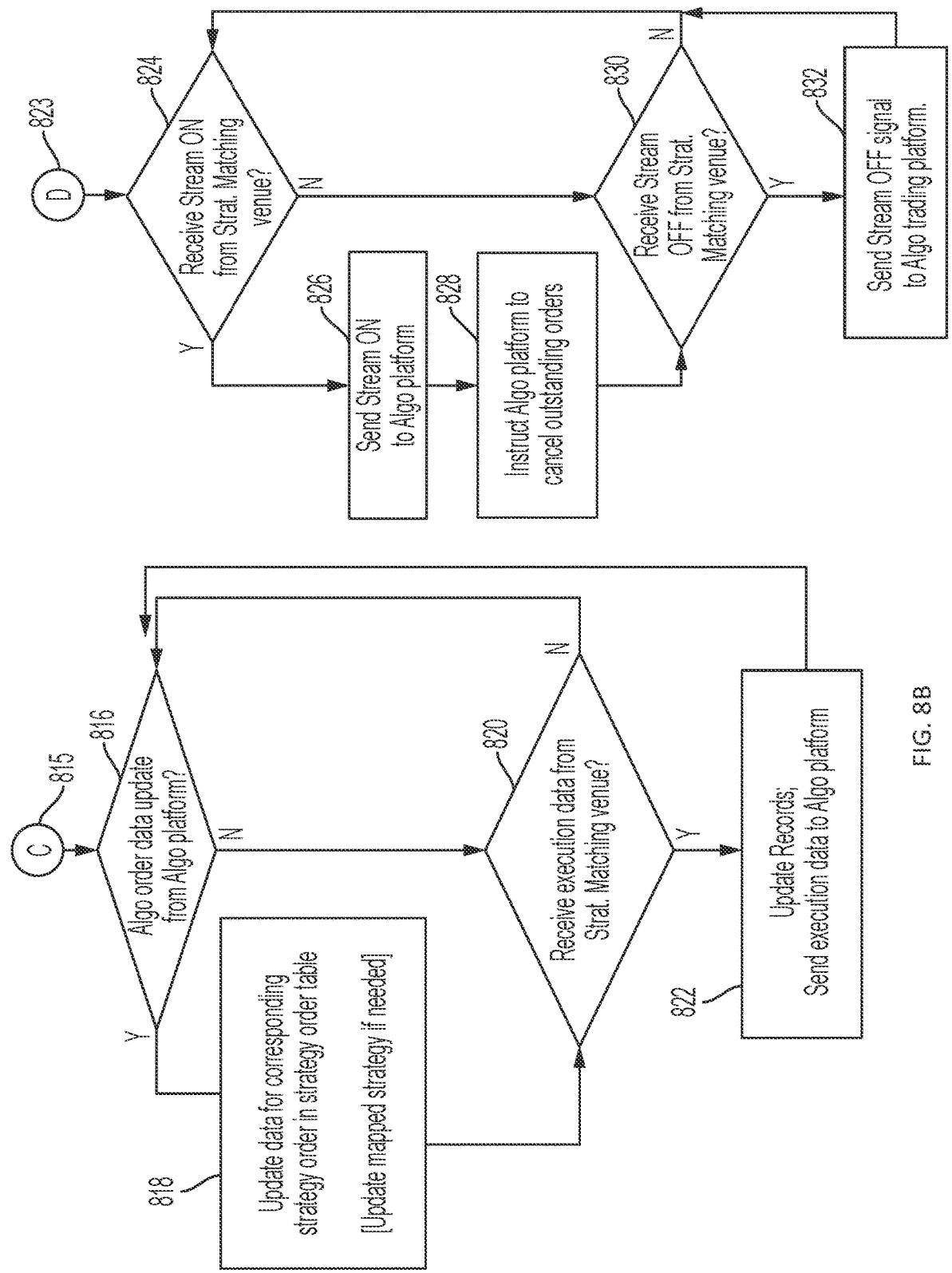
Figure 8C:
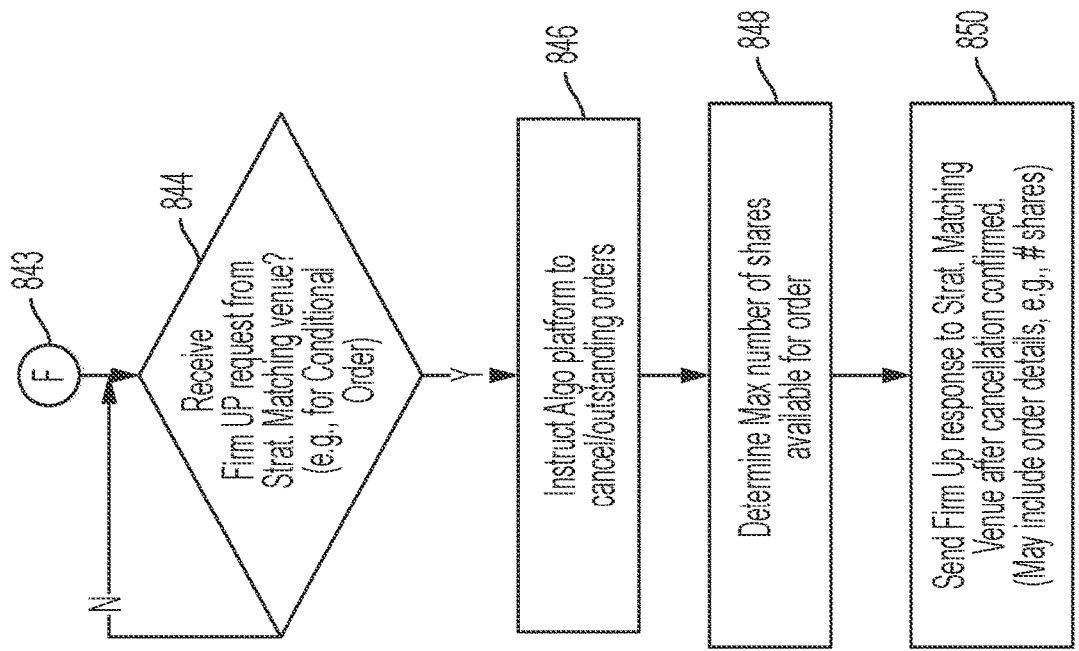
Figure 8C:
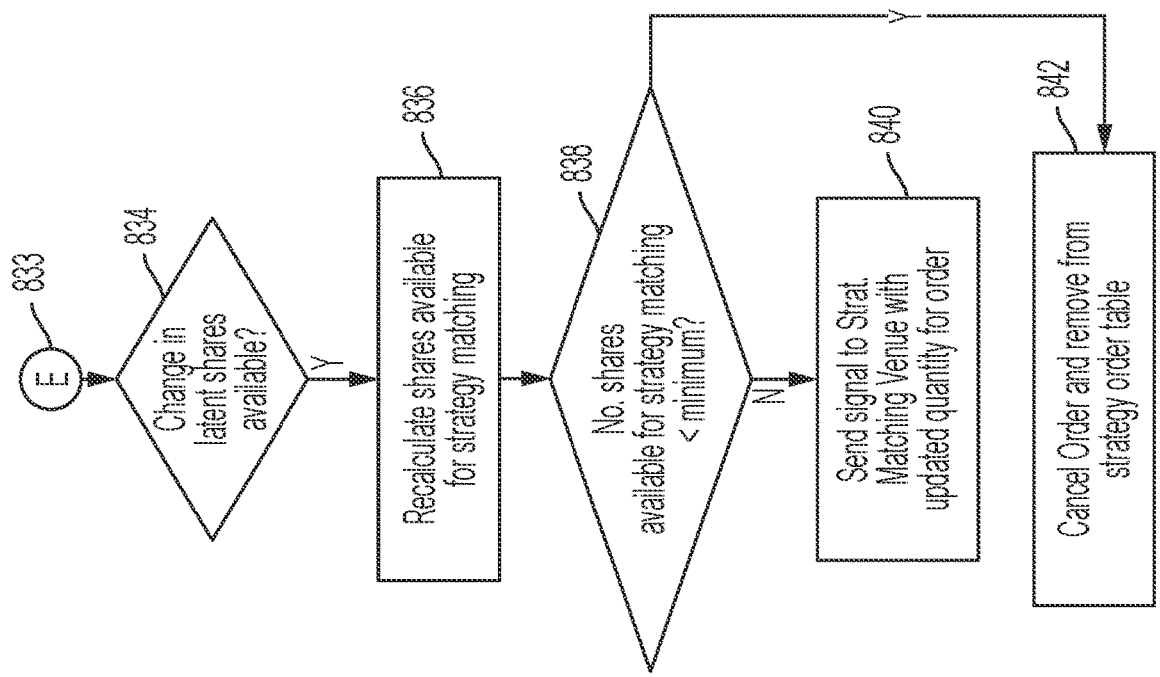

FIGS. 8A-8C are high-level flow chart of the operation of an embodiment of the HERO system in processing orders. For simplicity the functionality is directed, in general, to processing of a single order and functions are illustrated as separate program engine threads A-E. The use of independently executing program threads is not required and the functionality of one or more threads can be combined. Various techniques to implement these functions in a system and method for processing multiple independent orders will be known to those of skill in the art.

Thread A 801 handles new algo orders. A new algo order can be detected, such as via a message sent by algo order manager 580 or via monitoring by the HERO system 310 of the algo order table 120 or other data within the algo trading platform. If a minimum order size for strategy order processing is defined, the new algo order size is checked. (Step

802) If the algo order is greater than the predefined minimum size, a strategy is determined for the algo order using the relevant strategy mapping rules. A new strategy order record with the relevant strategy order data is added to the strategy order table. (Steps 804, 806).

Thread B 811 determines when a strategy order in the strategy order table 415 should be issued to a strategy matching venue. A determination is made if a strategy order is available that is not already pending at a strategy matching venue, and optionally if other conditions, if defined, are met. (Step 812). If a strategy order is available, an appropriate strategy order is issued to a strategy matching venue (step 814), such as via strategy SOR 510. Preferably, the HERO system 315 maintains a minimum buffer size and will only send strategy orders to a strategy matching venue if the number of latent shares for that strategy order exceeds a minimum buffer value. Where a minimum order size is specified, strategy orders that drop below the minimum size would no longer be considered eligible.

Thread C 815 provides order update functionality. If a message from algo order manager 580 (or other aspects of the Algo trading platform 320) concerning an update to an existing algo order is received, such as a message indicating that a certain portion of an algo order that has a corresponding strategy order has been filled, the appropriate records in the strategy order table 415 for the corresponding strategy order are updated. It is possible that the updated information could change the strategy selected for the corresponding strategy order as defined by the relevant strategy mapping rules 420. In such a case, the strategy specified in the strategy order table 415 is updated accordingly. If the strategy order at issue is outstanding at a strategy matching venue 315, a message can also be sent to the strategy matching venue to update the strategy for that order. (Step 818). If data message reflecting a streaming execution is received from a strategy matching venue 315, data in the strategy order table for the relevant strategy order is updated as appropriate. Execution data including at least an order indicator and an amount filled (e.g., number of shares) is also sent to the algo order manager 580 (step 822).

Thread D 823 processes stream ON and Stream OFF signals. If a Stream ON condition message is received from a strategy matching venue 315 (step 824), a Stream On condition for the respective order is sent to algo order manager 580. (Step 826). Depending on implementation details, a signal may also be sent instructing algo order manager 580 to cancel outstanding child orders for the corresponding algo order so that the potential fills from those outstanding child orders can be made available for strategic matching. (Step 828). If a Stream OFF message is received from a strategy matching venue 315 (step 830) a Stream OFF for the respective order is sent to algo order manager 580. (Step 832). Depending on implementation details, a Stream OFF signal may by itself be treated by the algo order manager 580 as an instruction to resume slicing new child orders for the corresponding algo order or an additional signal be sent expressly instructing algo order manager 580 to resume slicing new child orders, thus allowing the HERO system to address trading scenarios where a Stream OFF for a given strategy order has been received but conditions do not warrant resume slicing new child orders at that time.

Thread E 833 monitors the latent shares available for a given strategy order. If a change in available latent shares is detected (step 834), such as resulting from child orders for the corresponding algo order being filled, the number of shares available to the strategy order for strategy matching is determined (step 836). If the number is below a predefined minimum number of shares for strategy matching (step 838), the strategy order is cancelled and can be removed from the strategy order table 415 (step 842). If the relevant strategy order is outstanding at a strategy matching venues 315, a message can be sent to the strategy matching venue 315 with an updated quantity available for the strategy order.

Thread F 843 is for handling aspects of conditional strategy orders. A conditional strategy order issued by the HERO system 310 to a strategy match venue 315 can include or omit the total quantity of shares available for the order. If the strategy matching venue finds a match, it can then issue a request to the HERO system to firm up the conditional strategy order and provide a quantity value. When a firm up request is received for a strategy order (step 844), the algo order manager 580 is instructed to cancel some or all outstanding child orders for the corresponding algo order. (Step 846). In response to the firm up request and after the algo order child order cancellation process is complete, the HERO system can determine the available number of shares available for strategy matching based on the number of latent shares at that time, the buffer size and other factors (Step 848) and send a firm up response message to the strategy matching venue 315 (step 850). The firm up response can be in the form of, for example, a non-conditional strategy order that replaces the conditional strategy order or a message instructing the strategy matching venue 315 to update aspects of the conditional strategy order to be non-conditional and to change other aspects, such as number of shares available, as appropriate. The strategy matching venue 315 can hold the strategy match open until the order is firmed up. If this does not occur within a specified period of time, such as a timeout defined at the strategy match venue, the match is dropped. After the order is firmed up, the strategy matching venue would issue a Stream On condition message.

Figure 9A:
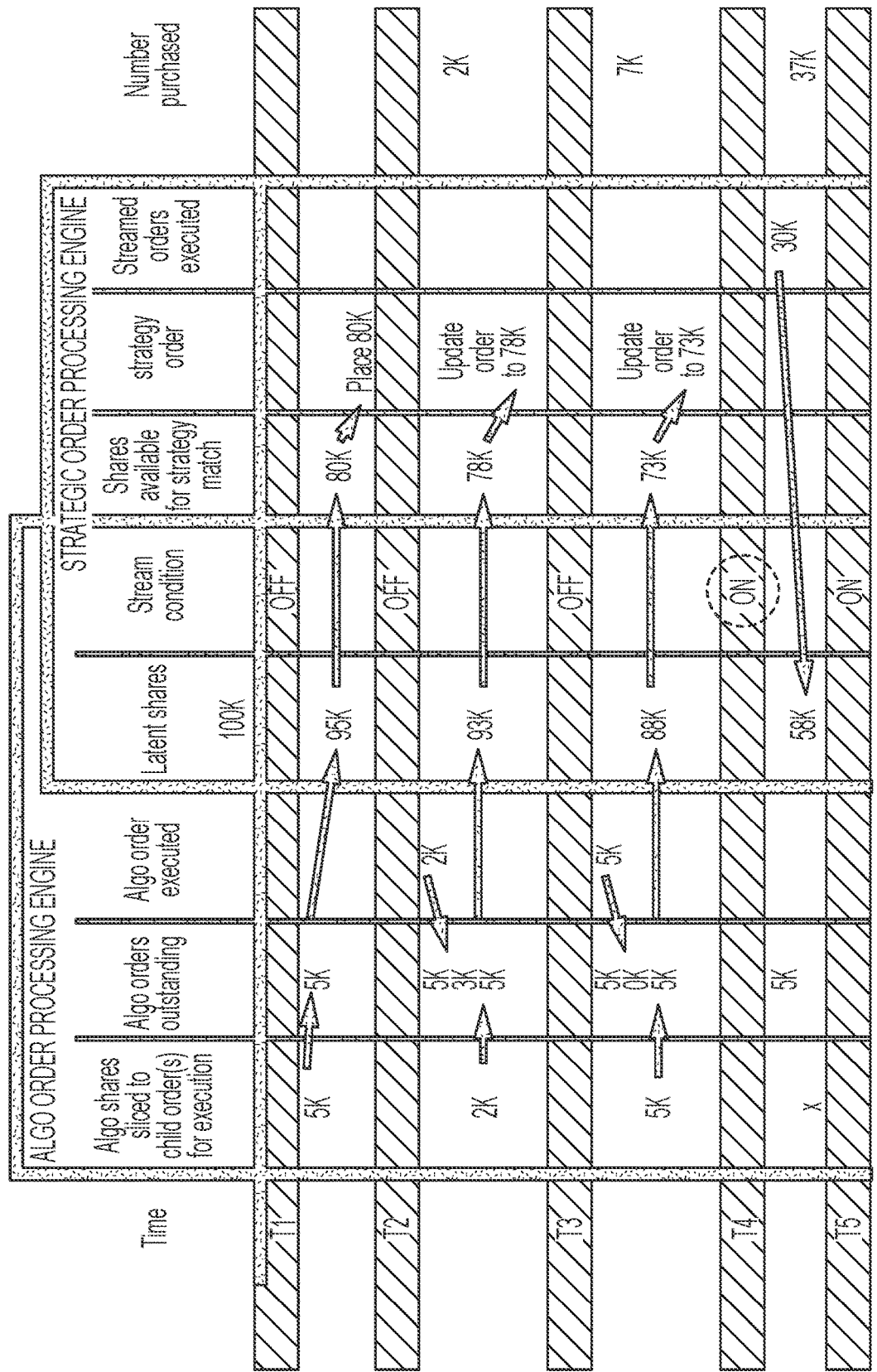
FIGS. 9A and 9B show an example of processing a sample algo order and a corresponding strategic order by the HERO system-aware algorithmic trading system and by the HERO system.
Figure 9B:
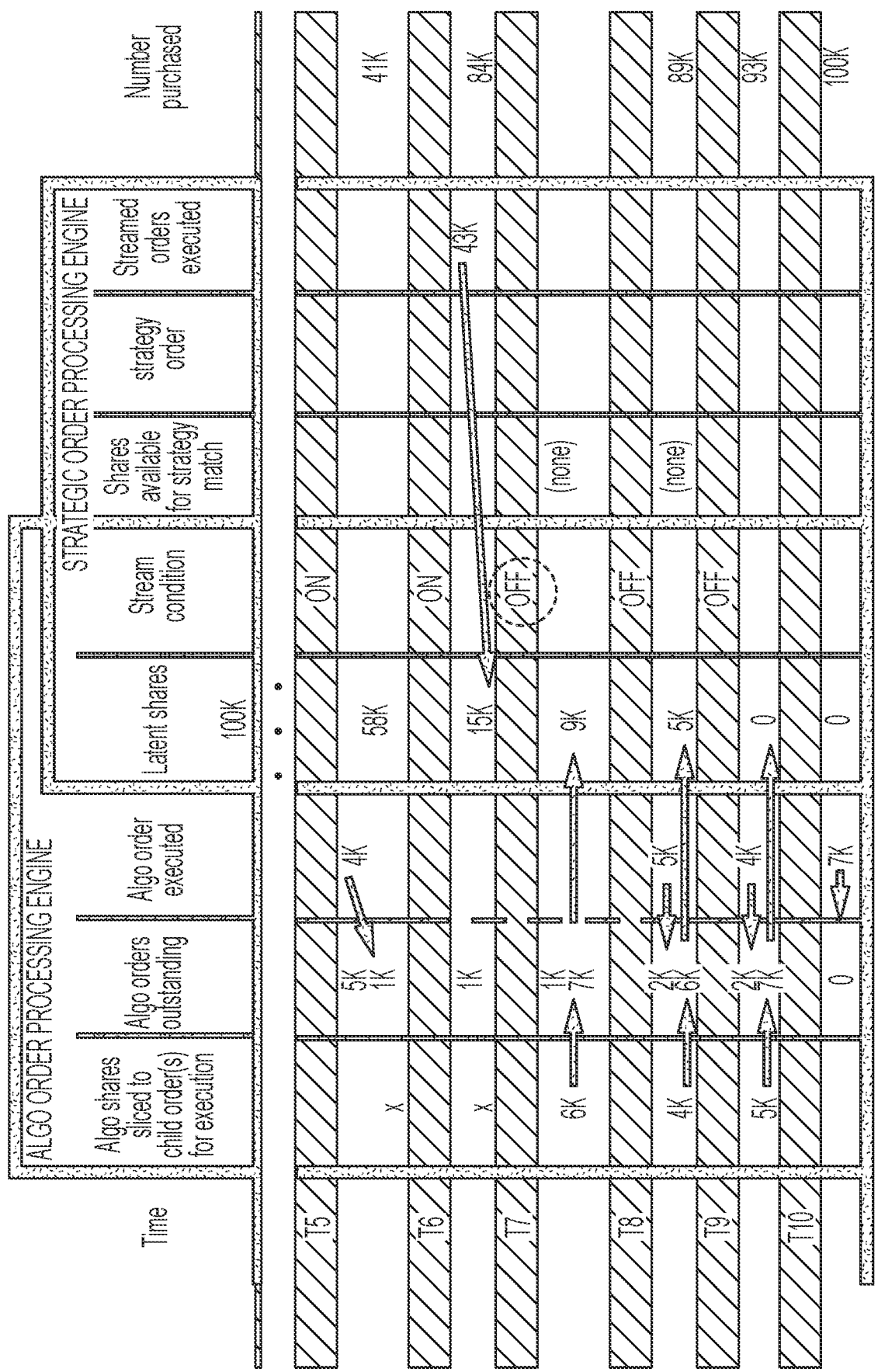

FIGS. 9A and 9B illustrate processing of a sample parent algo order to sell 100,000 shares and a corresponding strategy order by a HERO-aware Algo trading platform 320 and the HERO system 310 operating in parallel and showing the propagation of various order related data values between the systems as processing proceeds. In this example, the HERO system 310 is configured to maintain a buffer of 15K latent shares.

At time T0, before any action is taken, all 100K shares of the parent order are latent. At T1 an initial 5K of child orders are sliced off by the algo order manager and issued to SOR 140, which subdivides it into grandchild orders that are issued to trading venues 150. The number of latent shares is reduced to 95K. The parent order has 80K latent shares available for strategy matching (95K latent shares minus 15 k buffer value). An 80K strategy order is issued to a strategy matching venue.

At time T2, there are 5K shares outstanding for algo child orders. An algo order execution of 2K is received, reducing the outstanding value to 3K. Child orders of 2K are then sliced and issued to the SOR 140 off bringing the total number of outstanding algo child order shares back to 5K and the number of latent shares to 93K. The number of shares available for strategy matching is therefore reduced to 78K and a strategy order update is issued to the strategy matching venue indicating the changed amount. Time T3 shows the results of a 5K algo order fill and subsequent slicing of 5K of child orders, reduction in the number of latent shares, and subsequent update of the strategy order from 78K to 73K.

At time T4, the strategy matching venue has found a match for the strategy order and a Stream ON condition exists. As the strategy matching venue streams fills, information about number of fills is returned. In this example, streaming fills of 30K (which may be reflected in sequence of smaller fills) are indicated. The number of latent shares is reduced by 30K. There is also a 5K child order on the algo side.

A time T5, the algo system receives an execution message indicating that 4K of the outstanding 5K of child orders has been filled. The number of algo child order outstanding shares is now 1K. The number of latent shares does not change because the child orders is already accounted for. Because of the Stream ON condition, issuing of new child orders by the algo trading platform 320 is suspended.

At time T6 an additional streaming fill of 43K of the outstanding order is indicated and the number of latent shares is reduced to 15K. The total number of streamed strategic matching fills has reached 73K which is the current size of the strategy order. The strategy matching venue closes that order and a Stream OFF condition is indicated.

On receiving the Stream OFF condition, the algo trading platform 320 resumes algorithmic processing of the remainder of the order. Child slices are issued and filled from Time T7 through T10 at which time the parent order has been completely filled.

Figure 10A:
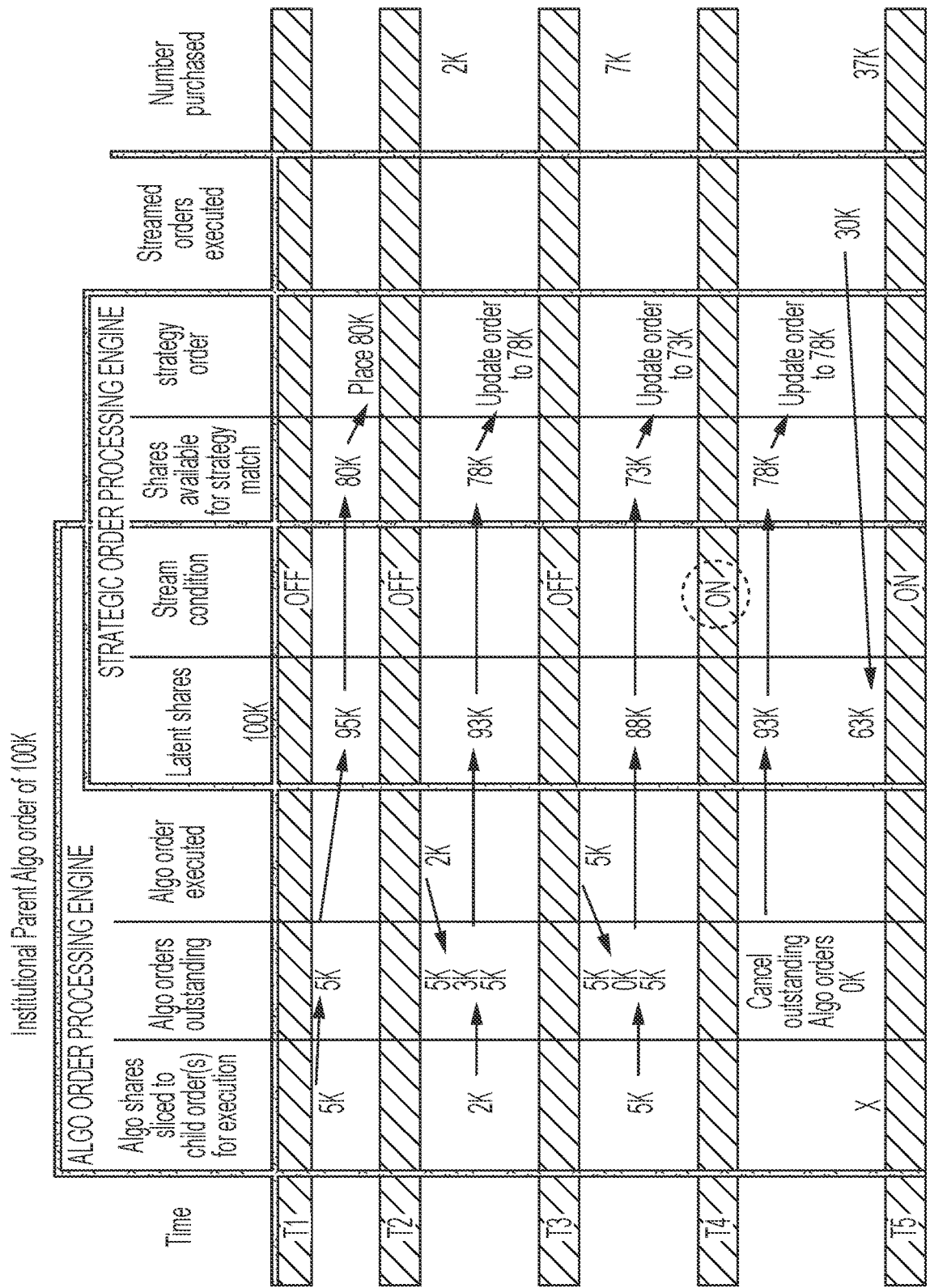
FIGS. 10A and 10B are a variation of the example of FIGS. 9A and 9B.
Figure 10B:
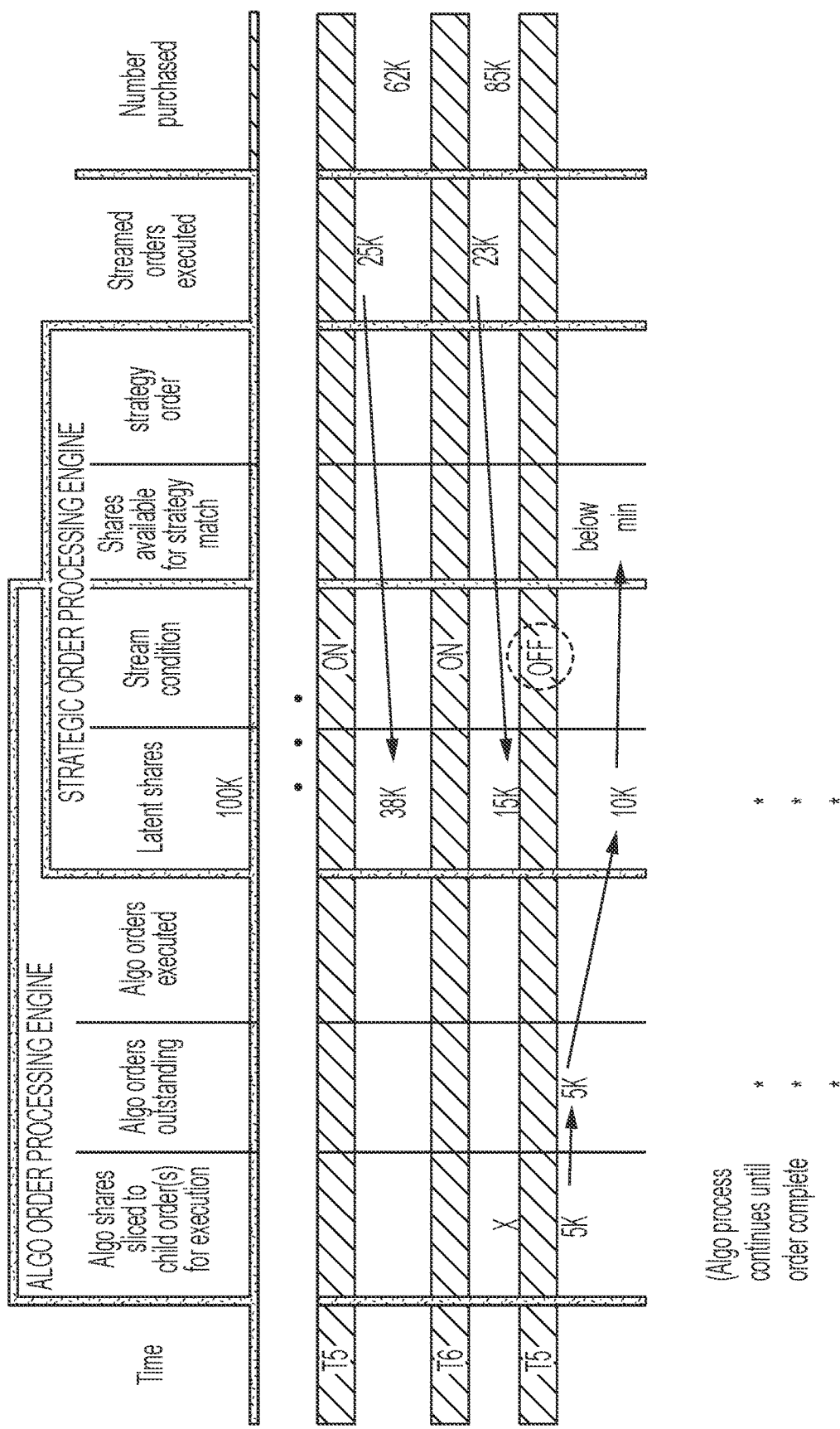

FIGS. 10A and 10B show the processing of a sample parent algo order to sell 100,000 shares and a corresponding strategy order by a HERO-aware Algo trading platform 320 and the HERO system 310 operating in parallel and showing the propagation of various order related data values between the systems as processing proceeds. The example of FIG. 10 is similar to that of FIGS. 9A-B but uses an Algo trading platform 320 that is configured to cancel outstanding child orders in response to receipt of a Stream ON indication from the HERO system instead of letting those orders be filled.

The operation of the system from Time T0 through T3 is the same as in FIGS. 9A and 9B. At time T4, in response to the Stream ON condition, the Algo trading platform 320 cancels the outstanding 5K of child orders. The number of latent shares is increased by 5K. Since more shares are now available for strategic streaming, the strategy order is updated from 73K to 78K. The remainder of the order processing continues in a manner similar to that of FIG. 9A-9B.

In some situations, the advantages provided by strategy orders processing at a strategy match venue may be desired but a HERO system enabled platform is not available at a broker dealer to receive such orders. In a further aspect of the invention, a Pre/Post Routing Optimizer ("PRO") system can be provided for use with an OMS/EMS system that can also send orders to a conventional algo system 100. The PRO system receives an initial order at a level higher than a non-Hero algo platform 100, such as directly from a client OMS/EMS 110. The PRO system then processes the order in a manner similar to the HERO system by generating (if necessary) and sending a corresponding strategy order to a strategy matching venue. The OMS/EMS may also send the original order to a conventional broker/dealer that will process it with their own algo system.

Because the PRO system is not coupled to the broker dealer's algo system 100 it cannot tell the algo system 100 to start or stop algorithmic processing of an algo order when a match for a corresponding strategy order is found as indicated by Stream On condition message. To compensate for this, issued strategy orders are conditional. When the strategy matching venue indicates that a strategy match is available for a strategy order, such as by sending a firm-up request, the PRO system can signal that the order placed with the broker/dealer's algo system should be cancelled and the corresponding strategy order can then be firmed up. After the strategy matching venue indicates that the strategy match has ended, e.g., with a Stream OFF condition message or an indication that the firm-up was not successful, the PRO system can signal that a new order be sent from OMS/EMS 1100 to the broker/dealer's algo system 100 for any remainder of the original order. Information is exchanged between the various platform components as algo and strategy orders are processed so that the progress of the order execution can be followed and so that order executions do not exceed the total order size.

Figure 11:
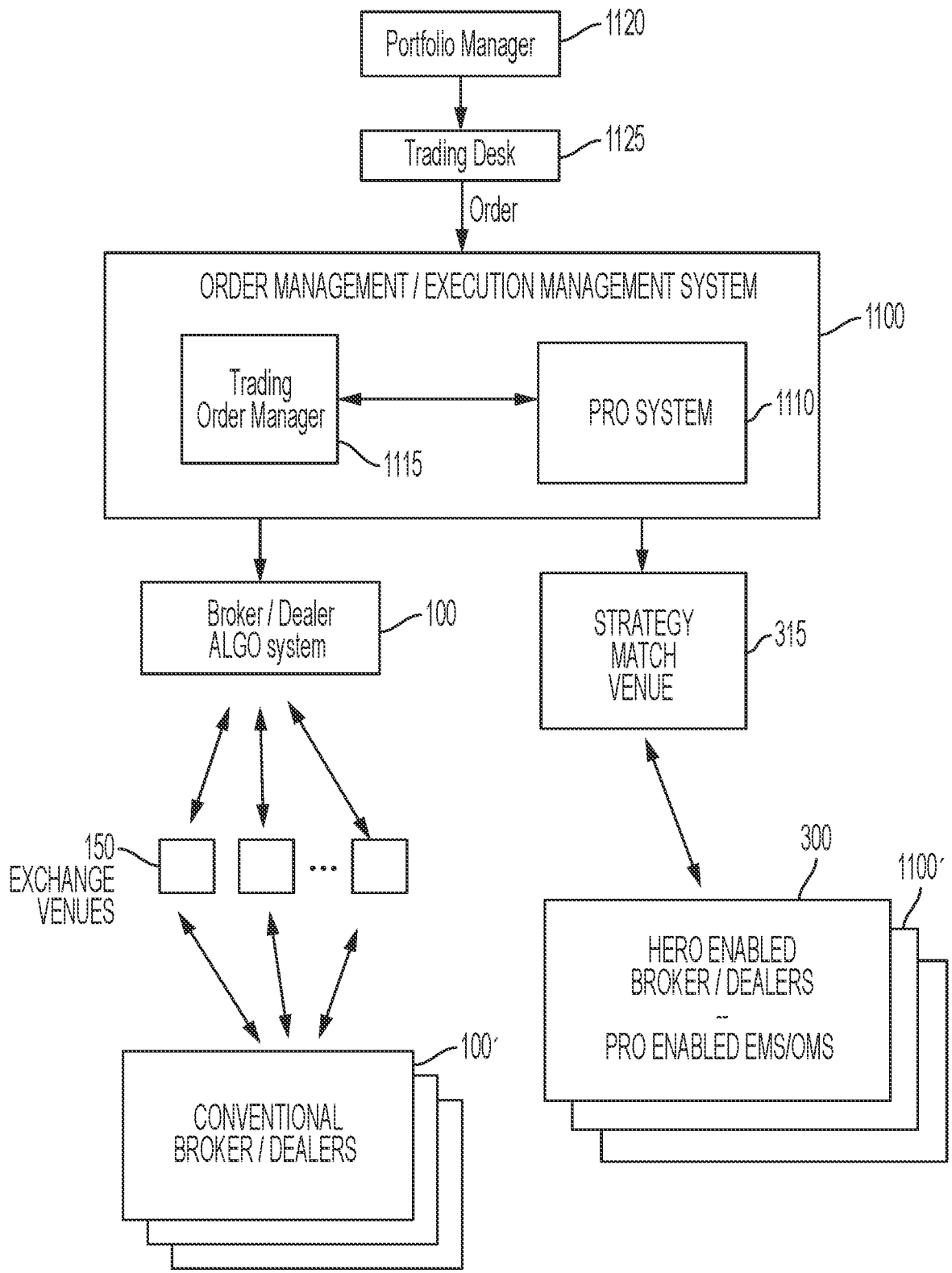
FIG. 11 a high-level block diagram of the system architecture of an embodiment of a trading platform with an order management and execution management system.

FIG. 11 is a high-level block diagram of the system architecture of an embodiment of a trading platform with an order management and execution management system (OMS/EMS) 1100 comprising the PRO system engine 1110 coupled to a trading order manager 1115. OMS/EMS 1100 may receive orders issued by a portfolio manager 1120 through a trading desk 1125. OMS/EMS 1100 is in communication with a broker dealer that uses a conventional algorithmic trading system 100 issuing orders to conventional exchange venues 150 where they are filled against matching contra orders issued by other market participants, such as other conventional broker dealers and HFT firms. OMS/EMS 1100 is also in communication with or more strategy matching venues 315 to which strategy orders from the PRO system can be issued, which strategy order can be generated based on the initial order. Where multiple strategy matching venues 315 are available, the PRO system can be configured to select an appropriate strategy matching venue as desired. The strategy matching venue(s) used can be defined in advance or may be dynamically selected based on a variety of factors, such as the type of security or other details about the order. The strategy match venue 315 can also receive strategy orders from other HERO system enabled broker/dealers 300, other PRO systems operating in conjunction with other OMS/EMS systems 1100', and any other source of appropriate orders.

Figure 12A:
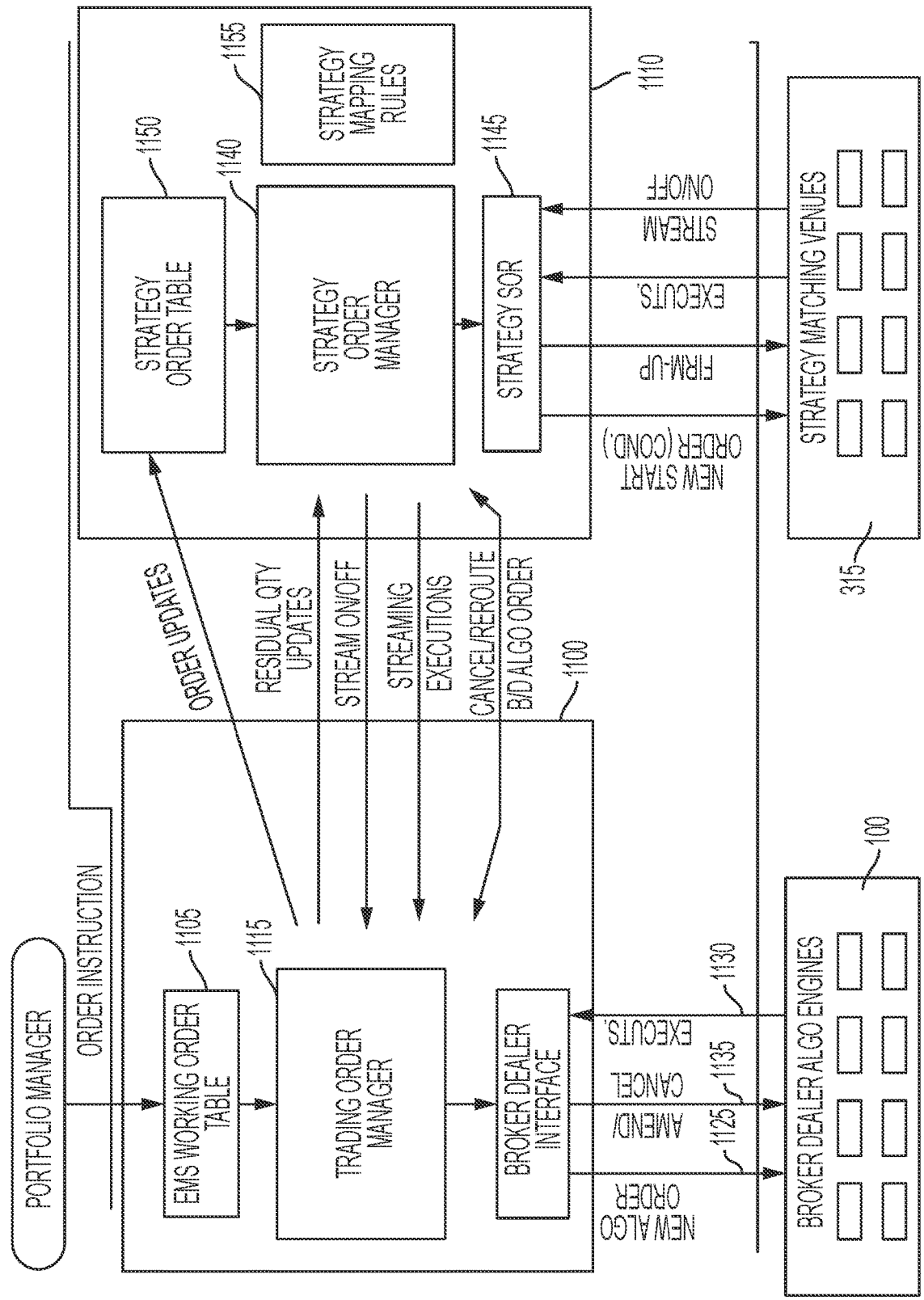
FIGS. 12A and 12B are high-level block diagrams of an improved trading system architecture according to a second major embodiment of the invention.
Figure 12B:
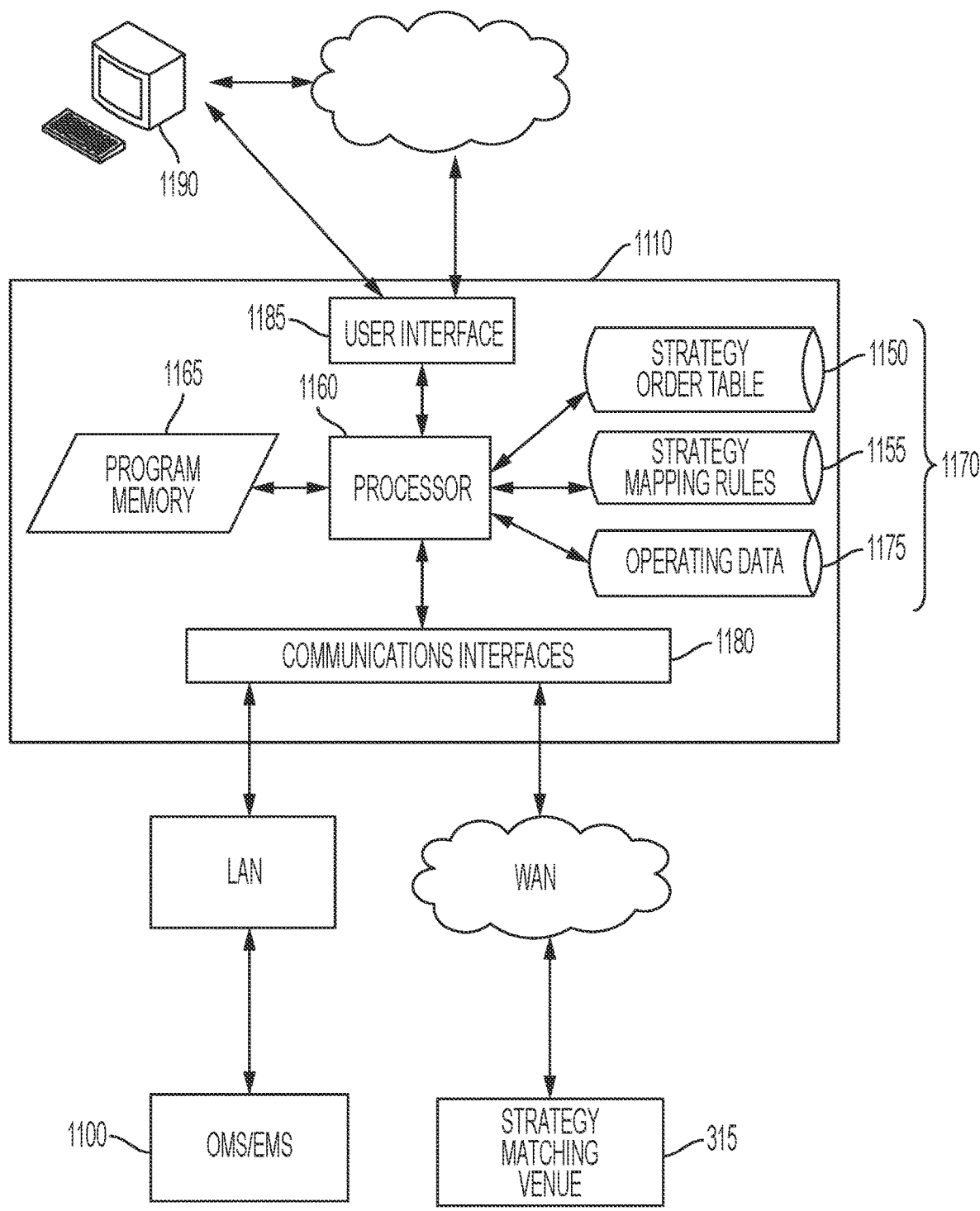

FIGS. 12A and 12B are high-level diagrams showing functional aspects of an embodiment of the PRO system 1110 and communications between (i) the PRO system engine 1100 and strategy match venues 315, and (ii) between the PRO system and a PRO system-aware trading order manager 1115 in an OMS/EMS system 1100. Internal functionality of an embodiment of the PRO system 310 and inter-system communication will be discussed in more detail with respect to the flowcharts of FIGS. 13A and 13B.

Trading order manager 1115 uses a broker dealer interface 1120 to communicate with one or more broker/dealers using conventional as well as HERO system enabled algorithmic trading engines 100. The messages that can be sent and received include issuing a new algorithmic order 1125 to a broker dealer's algo trading platform 100, receiving messages related to executions 1130 for a placed algo order 1125 and issuing requests 1135 for the algo trading platform 100 to cancel an existing order or amend it as appropriate. An OMS/EMS working order table 1105 is used by the OMS/EMS 1100 to track outstanding orders.

PRO 1110 comprises a strategy order manager 1140, a Strategy SOR 1145, and a strategy order table 1150 for maintaining data on current strategy orders. In an embodiment where one or more of the algo trading platforms available to the OMS/EMS 1100 are HERO system enabled, the OMS/EMS can indicate if an order has been sent to such an algo trading platform and the PRO system be configured to act only on algo orders sent to non-HERO aware algo trading platforms.

From the perspective of a strategy matching venue 315, the PRO system 1110 and the HERO system 310 can appear the same and have the same types of message exchanges. As with the HERO system 310, the PRO system 1110 and strategy matching venues 315 exchange messages related to strategy orders including placing a new conditional or non-conditional strategy order, receiving Stream On and Stream OFF condition messages, receiving strategy order execution data and for firming up conditional orders.

Strategy SOR 1145 operates to route communications regarding strategy orders between the strategy order manager 1140 and one or more strategy matching venues 315 and can also include functionality to select an appropriate strategy matching venue if more than one is available. While the strategy SOR 1145 is shown separate from the strategy order manager 1140, the functionality could be combined into an integrated software program. Likewise, functionality within the strategy order manager 1140 may be implemented in multiple software components.

Orders received at OMS/EMS 1100 may be conventional orders intended to be processed by a conventional algorithmic trading system and may or may not specify a trading strategy as well. If no strategy has been specified, corresponding strategy orders can be generated via a set of strategy mapping rules 155 in the same way in as discussed above with respect to the HERO system. This functionality can be implemented within the PRO system.

In operation, messages concerning new strategy orders and strategy order updates, as well as residual quantity updates for existing algo orders can be sent from the OMS/EMS 1100 to the PRO system 1110. Messages related to Stream ON and Stream OFF conditions and strategy order streaming executions can be sent from the PRO system 1110 to the OMS/EMS 1100. In addition, messages related to canceling or rerouting of algo and strategy orders can be exchanged between the PRO system 1110 and OMS/EMS 1100.

An implementation of the PRO system 1110 can be provided in a conventional computing system that operates independently from the computer system(s) used to implement the OMS/EMS 1100. With reference to FIG. 12B, in an embodiment, PRO system hardware can be similar to that for an independently implemented HERO system, but connected to the OMS/EMS 1100 instead of a broker/dealer's algo trading platform 320. One or more computer processors 1160 execute computer software stored in a program memory 1165. The processor 1160 has access to data memory 1170 containing one or more data repositories, such as a strategy order table 1150, one or more sets of strategy mapping rules 1155, used in generation of a strategy order based on an algorithmic order, and other operating data 1175.

Appropriate communication interfaces 1180 are used to connect the PRO system 1110 to outside systems. In the illustrated embodiment, a LAN provides communication between the PRO system 1110 and the OMS/EMS 1100 while a separate WAN provides communication between the HERO system 310 and one or more strategy matching venues 315.

The computer platform used to implement the HERO system can be one or more high speed computers with sufficient data throughput and processing capacity to support the volume of trading expected. LAN and WAN networks can be high-speed optical fiber data networks or other network systems conventionally used in financial trading networks. Suitable computer platforms will be known to those of ordinary skill in the art.

Program memory 1165 and data memory 1170 may be implemented within the same or different components in full or part. Memory 1156, 1170 can include one or more of internal RAM and firmware, local electronic data storage, such as solid state or magnetic drives, external data storage provided by a physically coupled memory via a USB or other data cable accessible over a network. Other computer readable medium for storing software and data may also be used. The PRO system 1110 can be implemented within one or more computer servers, personal computers, or other computing systems.

A separate user interface 1185 can be provided to allow a computing device 1190, such as a PC, to access the PRO system 1110 allow an authorized user to perform various administrative functions, such as monitoring system performance metrics, viewing order maps and transaction histories, and adjusting system configuration. Remote device 1190 can be locally connected to the PRO system or can be connected through a network, such as an Intranet or a secure VPN on the Internet to provide remote monitoring.

The PRO system 1110 can be implemented as an internal computer system within the OMS/EMS broker dealer system 1100, perhaps even running on the same physical computer as the trading order manager 1115, in which case a separate network connection between the PRO system 1110 and other components in OMS/EMS 1100 may not be needed. The OMS/EMS could be designed or modified to have appropriate APIs or other program hooks, and the internal controls needed to work with a PRO system even if a PRO system is not initially available or is available but run as a separate system. A PRO system module with suitable API interfaces to communicate with the EMS/OMS could then be added separately. There are various ways in which the PRO system 1110 can be implemented and integrated with An EMS/OMS system 1100.

Figure 13A:
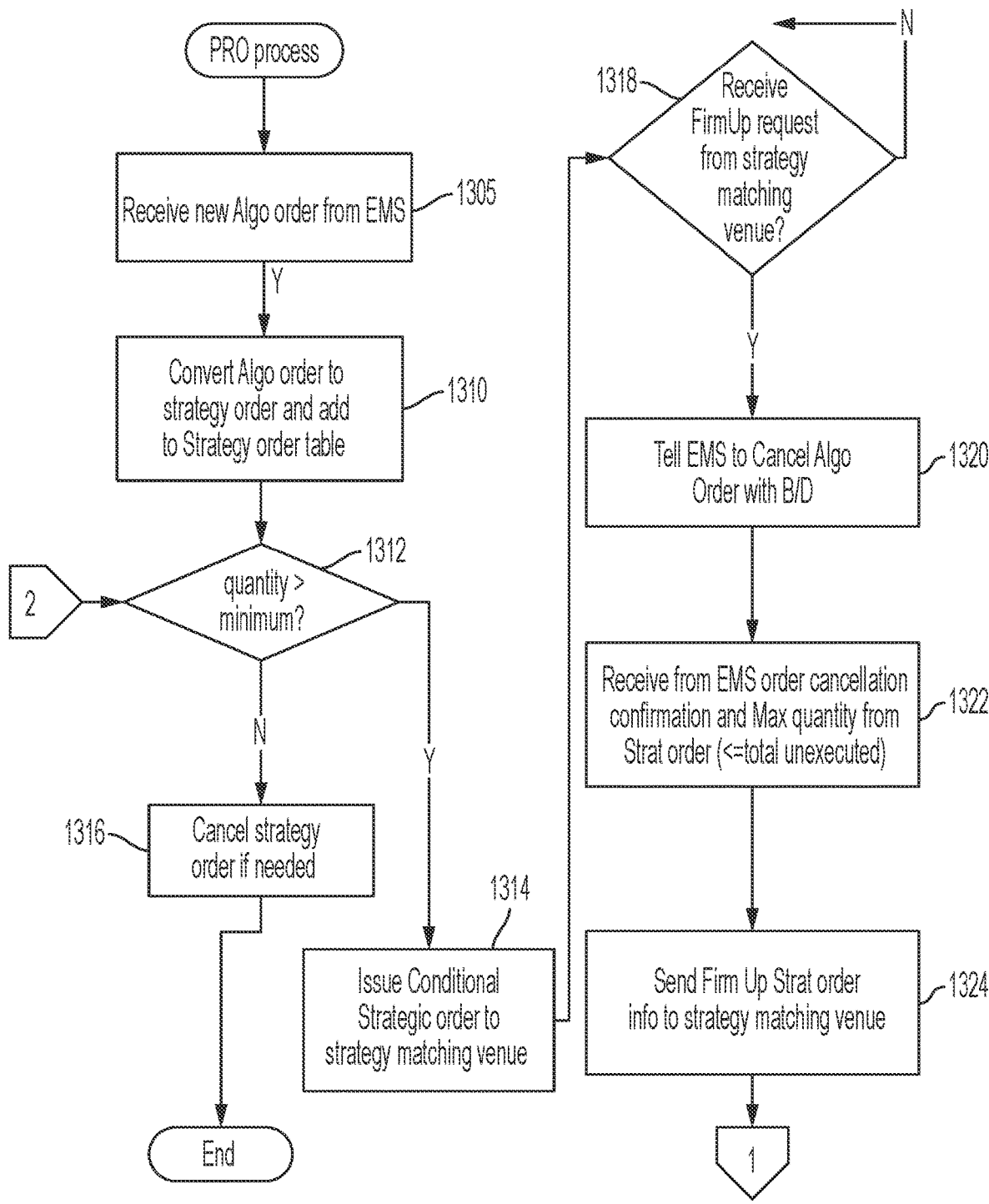
FIGS. 13A and 13B are high-level flow charts illustrating aspects of the operation of an embodiment of the PRO system of FIGS. 12A and 12B.
Figure 13B:
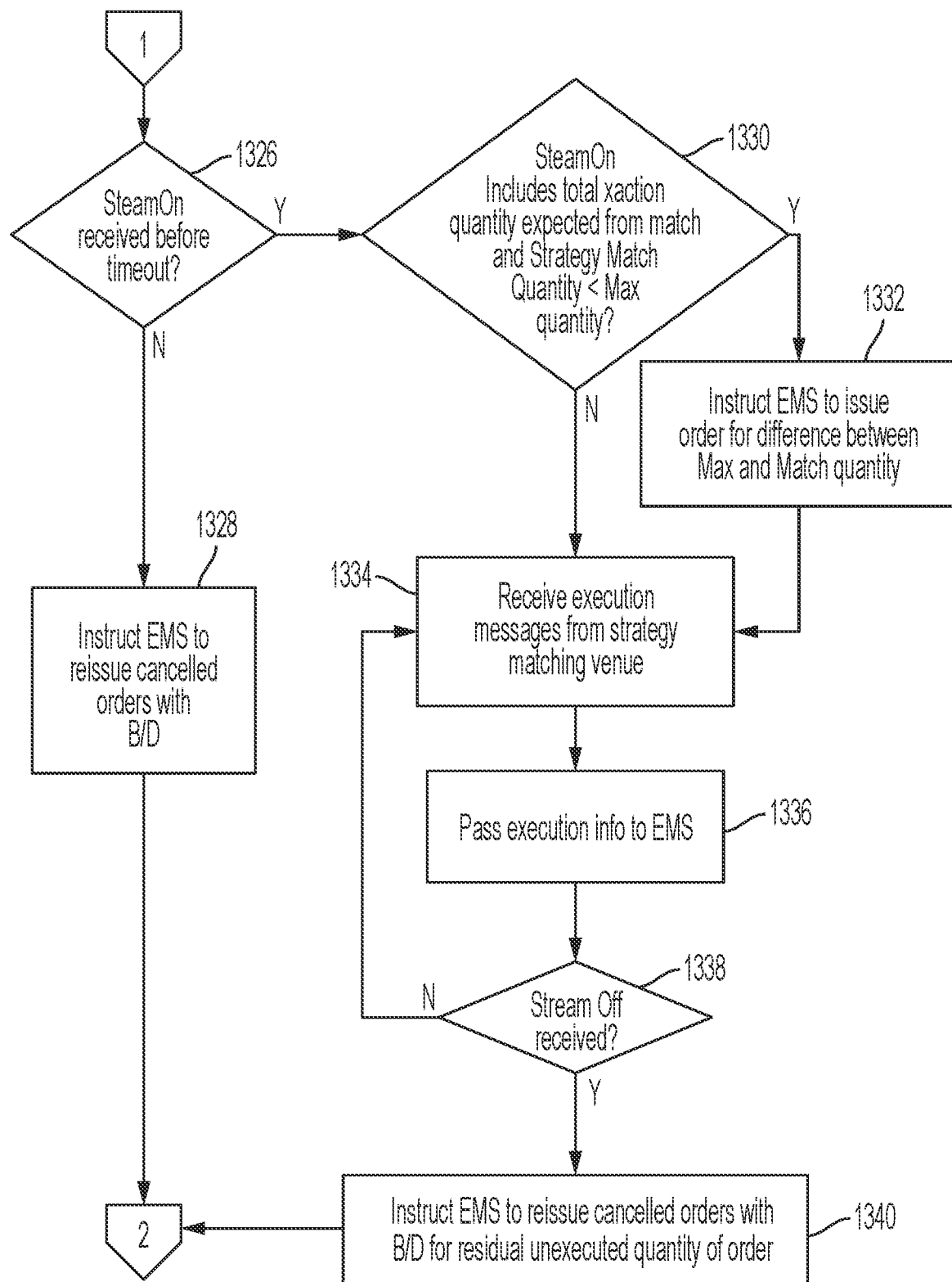

FIGS. 13A and 13B are high-level flow charts illustrating aspects of the operation of an embodiment of the PRO system engine in processing orders. For simplicity the functionality is directed, in general, to processing of a single order. Various techniques to implement these functions in a system and method for processing multiple independent orders will be known to those of skill in the art.

Turning to FIGS. 13A and 13B, on receipt of a new algo order from OMS/EMS 100 (step 1305), a corresponding strategy order is generated (after applying the appropriate strategy mapping rules as may be needed) and added to the strategy order table 1150. Provided that the strategy order quantity exceeds a minimum value, if specified, for strategy matching to be used (step 1312) a corresponding strategy order is issued as a conditional order to a strategy matching venue 315 (step 1314). It is assumed that orders when initially received exceed the minimum but this might not be guaranteed.

As the algo order is processed execution update messages are generated and sent to the PRO system. These executions impact quantity available for the corresponding strategy order. In response to receipt of such a message, the PRO system will update the available quantity reflected for the corresponding strategy order in the strategy order table 1150. Update messages may also be sent to the relevant strategy matching venue(s). If the available quantity for a strategy order falls below the minimum, the PRO system can send an order cancel message to the relevant strategy match venue 315. (Step 1316).

After issuance of a conditional strategy order, so long as that strategy order is still open the PRO system will wait to receive a firm up request from the strategy matching venue. (Step 1318). When the strategy matching venue 315 finds a potential match for the conditional strategy order, it sends a firm-up request to the PRO system. On receipt of a firm-up request, the PRO system sends a message to the trading order manager 1115 instructing it to cancel the corresponding algo order (if any) that has been placed with the broker dealer (step 1320). After the algo order has been successfully canceled, trading order manager 1115 will send a message confirming successful cancelation. The message can also indicate the maximum number of shares which are available for strategy matching, which amount should be less than or equal to the total unexecuted portion of the original order. (PRO may also or alternatively be configured to issue a query to OMS/EMS 1100 requesting information about a particular algo order, such as the number of filled shares.) After the cancellation confirmation and quantity data is received by the PRO system (step 1322), an appropriate firm-up message for the strategy order is sent to the strategy matching venue 315. (Step 1324).

Even though a conditional order is firmed up, it is possible that conditions will change at the strategy matching venue 315 such that the potential match can no longer be solidified. For example, the selected contra strategy order may also be conditional but is not firmed within a timeout period. If the PRO system does not receive a Stream ON indication for the order within the applicable timeout period (step 1326), it is presumed that the firmed up order will not be filled. A strategy match venue 315 may be configured to send a notification to the issuer of a firmed up conditional strategy order indicating that the match has failed. Receipt of such a message by the PRO system can be treated in the same way as a timeout condition while waiting for a Stream On message. (Similar functionality can be implemented in the HERO system.)

After a timeout (step 1326) the OMS/EMS is informed that it can reissue the algo order (cancelled in view of the firm up request from the strategy matching venue 315) to the appropriate broker dealer(s). The PRO system can also send a message to the strategy matching venue 315 expressly canceling the order that was previously firmed up. The strategy order remains pending at the PRO system. If the quantity available for that order exceeds the minimum (step 1312), another conditional order can be issued and the process continued.

When a strategy order match is made at a strategy matching venue, the strategy matching venue may return the rate of the match (which may be only part of the reference rate available for the designated strategy). In addition, or alternatively, if the strategy matching venue can determine the total number of fills that will result from the match or at least a maximum number of fills that may result (based on the rate used for strategy matching and the max available quantity for the matched orders). If this information is available, it can be included as part of the Stream ON message. When the PRO system timely receives Stream ON after firming up a conditional strategy order and the Stream On message indicates the quantity of fills expected from that match, or provides data from which that information could be derived, the PRO system can calculate the quantity for the strategy order that will remain after the strategy match streaming is complete. If the strategy match will not result in filling the maximum quantity available for the strategy order at issue, efforts to fill the remainder of the order on the algo side can proceed without conflict with the strategy order fills. In such a case, the PRO system can inform the OMS/EMS to issue an algo order to for the difference between the maximum quantity available for the strategy order and the actual or maximum amount expected to be filled at the strategy matching venue. (Steps 1330, 1332).

Continuing, after a Stream ON, execution messages for the strategy order are received at the PRO system from the strategy matching venue (step 1334). Execution data is passed by the PRO system to the OMS/EMS (step 1336) which can use that data to update its internal records to reflect the fills that have occurred. This continues until a Stream OFF message for the strategy order is received (step 1338). The OMS/EMS is then instructed to reissue the cancelled algo orders with the broker dealer for the residual unexecuted quantity of order. (Step 1340).

Figure 14A:
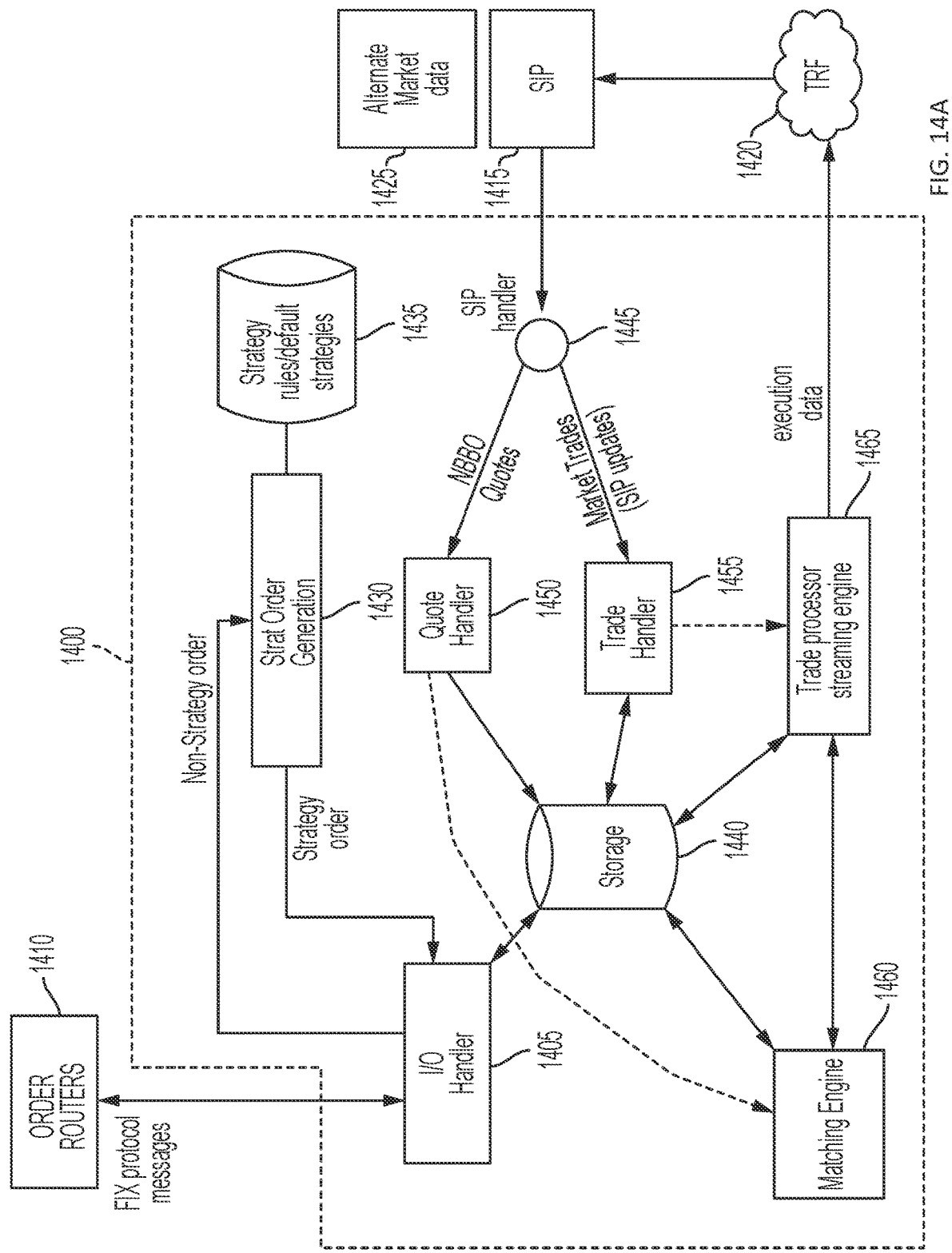
FIGS. 14A and 14B are high-level functional block diagrams of an embodiment of a strategy matching venue.
Figure 14B:
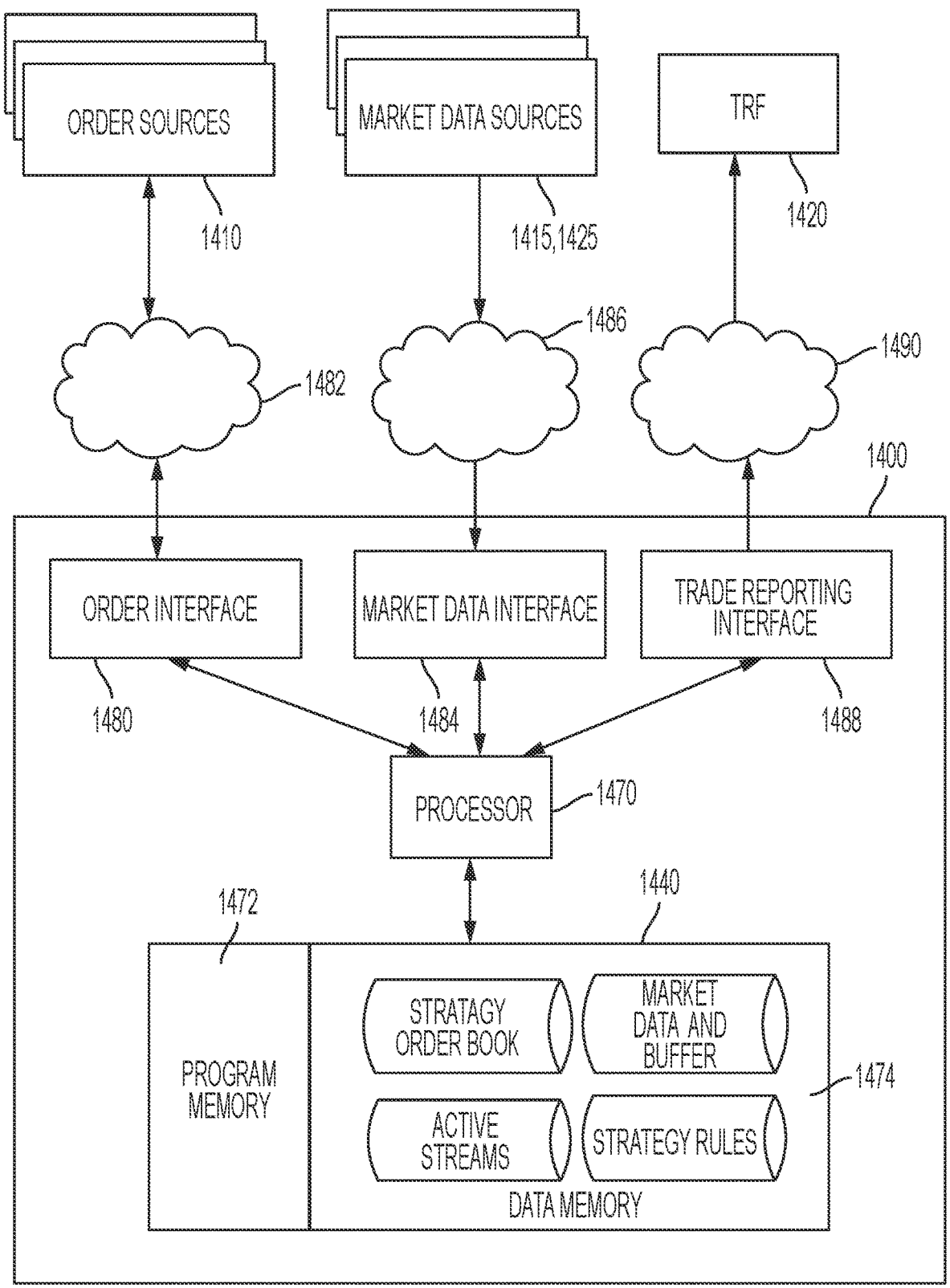

FIGS. 14A and 14B show a high-level functional block diagrams of a particular embodiment of a strategy matching venue 1400 for processing strategy orders for tradeable items, such as securities. Strategy matching venue 1400 is connected to order placement and routing platforms 1410, which can include strategy SORs, such as used in a HERO system or a PRO system, conventional SORs, and any other source of suitable orders, such as directly placed strategy orders originating, e.g., from broker gateways. Communication with order routers 1410 can be supported through appropriate network connections. In an embodiment, messages are exchanged using the FIX protocol. Strategy order related messages, Stream ON and OFF condition messages, firm up commands, and other communication can be carried over this interface. Minor enhancements to the FIX protocol, such as defining new FIX message values, may be needed to support features such as Stream ON/OFF messages and new strategy order types.

Strategy matching venue 1400 includes a software engine intended to process strategy orders. In an embodiment, the Strategy matching venue 1400 is configured to process non-strategy orders as well. Received non-strategy orders can be routed to a strategy order generator engine 1430 that will convert the non-strategy order to a strategy order. A set of one or more default strategies 1435 can be provided and selected according to a predefined set of rules. Strategy selection can be dependent on the contents of the non-strategy order and/or its source or other data. One broker dealer may define liquidity seeking as a default strategy to use for any non-strategy orders it sends while a different broker dealer may request a different strategy. It is also possible to use a more complex system to select a strategy, such as used within the HERO system 315 and discussed above. While strategy order conversion is shown as being part of strategy matching venue 1400, a strategy selection engine using predefined strategy mapping rules may be implemented separately from the strategy matching venue 1400.

Strategy matching venue 1400 receives market data, such as bid/ask quotes and trades, such as from an appropriate Security Information Processor (SIP) 1415. More than one source of data may be available for use within Strategy matching venue 1400 such as from alternative market (or non-market) data sources 1425. Strategy order execution data is output from Strategy matching venue 1400 and can be returned to the SIP 1415 in a conventional manner, such as via a Trade Reporting Facility (TRF) 1420. Execution reports are returned to the appropriate order routers 1410 via the I/O handler 1405. Depending on the tradeable item at issue, different mechanisms for reporting executions to a market may be utilized.

The strategy matching functionality in strategy matching venue 1400 is implemented in software that can be organized as a set of software engines. I/O handler 1405 processes incoming and outgoing messages and updates data records related to incoming orders. SIP handler 1445 receives incoming market and other data and routes relevant data to the appropriate internal engine, such as by sending first market data, which could be NBBO quotes, to quote handler 1450 and second market data, which could be individual market execution notices for the items being traded, to trade handler 1455. In an embodiment, the Quote handler 1450 examines incoming data and determines whether pending strategy orders are marketable and so can be acted on. The trade handler 1455 processes incoming SIP data related to market trading, e.g., volumes of securities traded, so that the information is available for use by the trade processor 1465. Matching engine 1460 identifies eligible matches from among the pending strategy orders. The trade processor 1465 is the streaming engine and generates trades for matched strategy orders.

Turning to FIG. 14B, strategy matching venue 1400 can be implemented in a computer system, such as a suitable connected server with one or more processors 1470 and storage 1440 that can comprise internal RAM and firmware, local electronic data storage, such as solid state or magnetic drives, external data storage provided by a physically coupled memory via a USB or other data cable accessible over a network. Program memory 1472 is used to store the operative computer software executed by the processor. Data memory 1474 is used to store the various operating data books/tables, buffers, rules, and other short and long term stored data used during operation of the system. Suitable interfaces are provided to communicate with external systems. For example, an order interface module 1480 can be used to communicate with various order routers or other order sources 1410 through an order network 1482. A market data interface module 1484 can be used to access various sources of market data 1415, 1425 through a market data network 1486 and retrieve market data used during order processing. A trade reporting interface module 1488 can be used to provide execution information to a trade reporting facility 1420 through an appropriate reporting network 1490.

The physical computer processor(s) and overall computing platform used for the strategy matching venue 1400 can be one or more high speed computers with sufficient processing capacity, data throughput, and network bandwidth to support the volume of trading expected. Suitable computer platforms will be known to those of ordinary skill in the art. While three networks 1482, 1486, and 1490 are shown separately, one or more could be the same network. For example, all three networks 1482, 1486, 1490 could be a common high speed data network supporting data communication between devices using, e.g., the FIX protocol.

Figure 15:
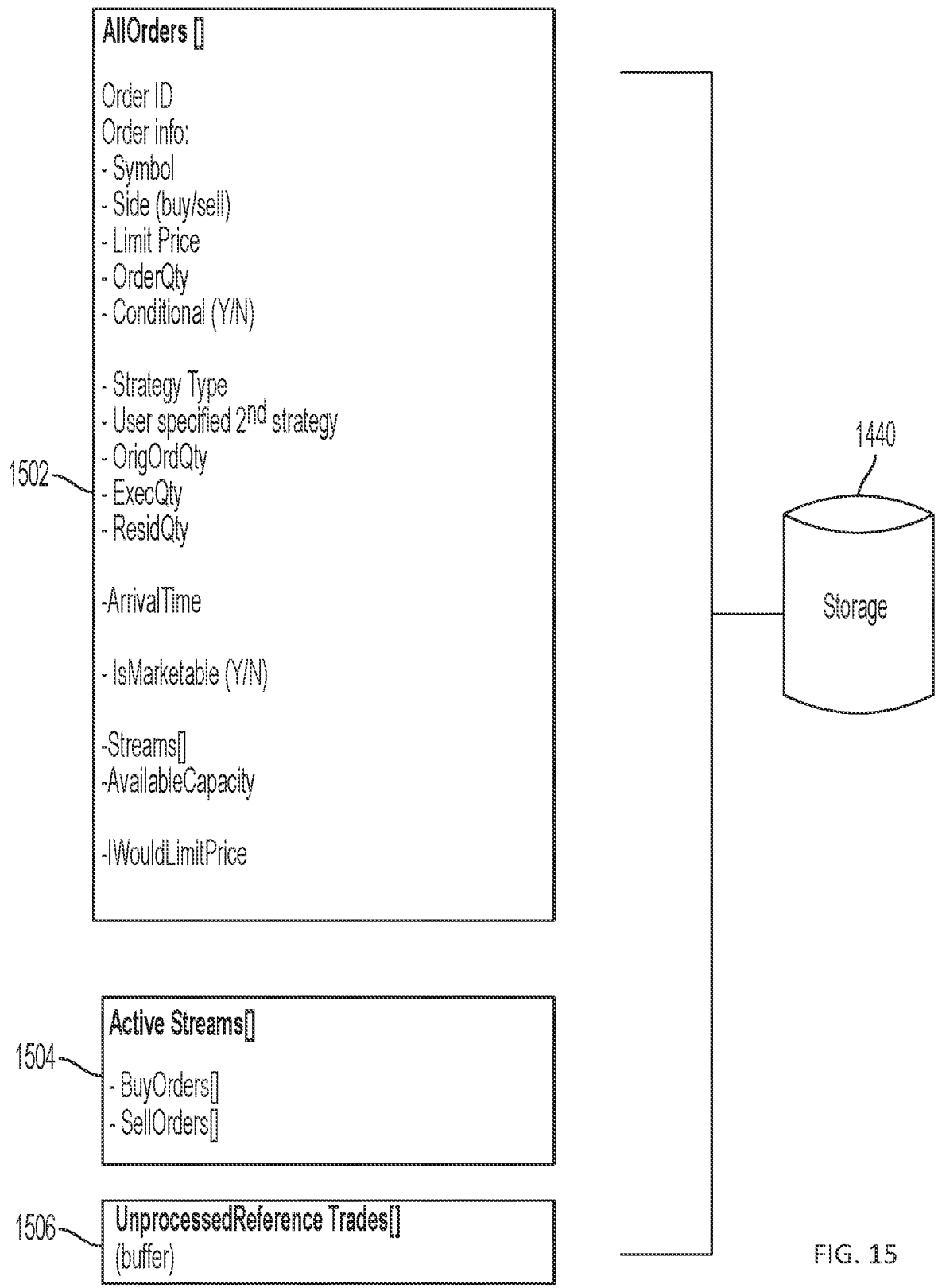
FIG. 15 is an illustration of various types of information that can be stored and used during processing of strategy orders buy the strategy matching venue of FIGS. 14A and 14B.

FIG. 15 illustrates some of the various types of information that is stored within strategy matching venue 1400 and used during processing of strategy orders. One particular arrangement of data structures is illustrated. Not all of the illustrated data fields may be required or used in any particular embodiment and additional data can also be stored. Other methods known to those of ordinary skill in the art can be used to organize the data used by the strategy matching venue and particular names used to reference content can vary. The various data tables and objects can be stored in a memory storage area 1440, which can be comprised of different types of storage, such as local RAM, solid state drives, cloud storage, etc.

In the data arrangement of FIG. 15, three primary data arrays (which may be organized and referenced in storage as data tables, database objects, or in other manners) are provided and are stored as appropriate within the memory 1440 of the strategy matching venue 1400.

AllOrders 1502 is used to store information about active strategy orders that have been placed with the strategy matching venue 1400. Each order record has a unique order ID and stores strategy order information that includes a symbol, a side, and a limit price. A conditional flag indicates whether or not the order is conditional. An order quantity specifies the number of shares (or other tradable item) in the order that are available for strategy matching. A Strategy Type field stores the strategy to be used for that order. Over time, as a strategy order is processed or updated, the quantity of available shares changes.

Additional fields can be provided to store an original order quantity, a quantity that has already been executed, and a residual quantity that is available for subsequent strategy matching. Not all of these quantity fields are required and some data attributes may be easily calculated from separate data about the order. However providing these fields may simplify later processing.

An IsMarketable flag indicates whether or not the market conditions relevant to the order are such that the order is marketable. For example, if an order is to buy a security, the order would not be marketable if the current trading price for that security is greater than the order's limit price. Other marketability factors may also be specified related to the order and be considered. The fact that an order is marketable does not mean that there will be a matching contra order at that time.

Streams[ ] is a data array in the AllOrders table used to indicate which stream or streams, if any, the respective order is involved with. A large order may be matched, for example to two smaller orders which would result in two trading streams.

The AvailableCapacity in a particular order record indicates an available rate of the respective order that can be applied to a subsequent match with a contra order.

Orders can be defined so that the strategy which is applied to them can be dynamically changed in response to changes in market conditions to a contingent alternative strategy. In a particular embodiment, an attribute of the order, such as IWouldLimitPrice, provides a way for an order to specify that its strategy should be changed if the current quote for the security at issue passes a specified limit. For example, a 5-15% strategy buy order could have a regular limit price of $15.75 and an IWouldLimitPrice of $15.65. If the offer price of the security exceeds the limit price, the offer is not marketable. When the current offer is between the two values, the order would be marketable and use the 5-15% strategy. If the offer price dropped below the IWouldLimitPrice, the order strategy could be changed to a different strategy, such as LiquiditySeeking, or a user-specified second strategy for the order. If an IWouldLimitPrice value is provided but no second strategy is specified, a default strategy such as liquidity seeking could be used. Strategy adjustments can be made when an order is examined to determine if it is marketable. A flag can be provided to indicate whether or not this feature is enabled for a given order. Alternatively, IWouldLimitPrice could be set by default to zero wherein a non-zero value indicates that the feature is enabled. This or a similar conditional strategy feature could be implemented in the HERO or PRO system as an alternative to implementation in the strategy matching venue 1400 or a first contingent strategy change process implemented, e.g., in a HERO or PRO system, and a second contingent strategy process implemented within the strategy matching venue 1400.

Criteria for selecting a suitable secondary strategy can be included in contingent strategy mapping rules, which can be the same as or different from strategy mapping rules used to initially select a strategy, such as strategy mapping rules used by the HERO system, the PRO system, or in the strategy matching venue 1400 for processing non-strategy orders that are received. By way of example, an algo buy order could be mapped to a strategy C. If dynamic strategy selection is available and enabled, the second strategy can be selected to be the strategy B that has the next higher priority and the transition threshold set to a limit price lower than the one specified in the order, such as a price that is 0.5% or 1% lower. This information can also or alternatively be specified within an appropriate set of mapping rules.

As an alternative or in addition to including a second strategy in the strategy order itself, the issuer of the strategy order, such as the HERO system or the PRO system, can monitor market conditions and detect when a strategy shift for a particular order may be required. In response, the existing strategy order can be canceled and replaced with a substitute order having the new strategy. Alternatively, an order update message can be sent to the strategy matching venue specifying the new strategy and, in response, the strategy matching venue will update its internal records for that order accordingly, breaking or altering existing matches as may be appropriate.

The AllOrders table 1502 can also store, at least for a limited period of time, information about strategy orders that are no longer active, such as orders that have been completed or cancelled. An Order State attribute can specify the order state, e.g., "Active", "Cancelled", "Completed". All orders over a given period of time, could be retained in the table. At the close of the trading period, all the cancelled or completed orders could be stored in a trading history table and remaining active orders present at the close of a trading session automatically cancelled.

Arrival time can be used to store a time stamp indicating when the respective order was received at the strategy matching venue 1400.

ActiveStreams 1504 is used to store information about order matches that are currently active. Each record in ActiveStreams can contain data associating a first order with one or more contra orders it is currently matched. To allow easy lookups of matches for a buy or sell order, the table or data structure can be indexed twice, once indexed for Buy Orders, and once for Sell orders. Additional data can also be indexed. For example, matched orders can be indexed by security at issue to make it easier to identify active matches for a given security. In a particular embodiment, each entry associates a first order with one matched contra order. Where the first order is matched to multiple contra orders simultaneously, multiple entries for the first order will be present. A state field can also be included to indicate whether a stream is active (unbroken) or has been ended. Information about ended streams can be retained within ActiveStreams[ ] for a period of time and/or archived, e.g., for historic analysis and audit purposes.

The UnprocessedReferenceTrades table 1506 is used to temporarily store market trades from the Trade Handler 1455 that haven't yet been processed by the Trade processor streaming engine 1465. Once the Trade processor processes a market trade from this table, it can be removed from this table and archived.

Figure 16A:
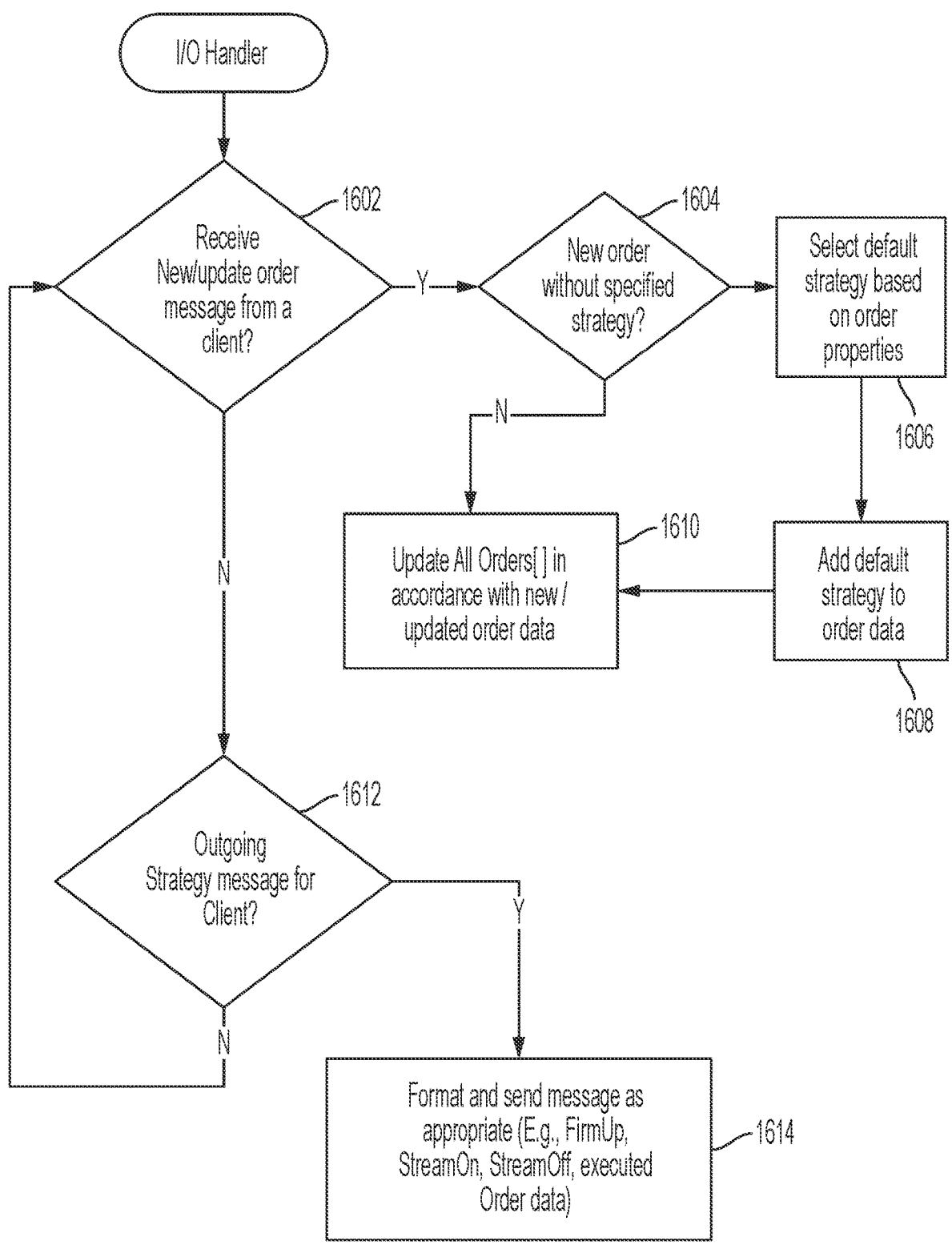
FIGS. 16A-16D are high-level flow charts of the basic functionality provided by embodiments of various internal systems of the strategy matching venue of FIGS. 14A and 14B.
Figure 16B:
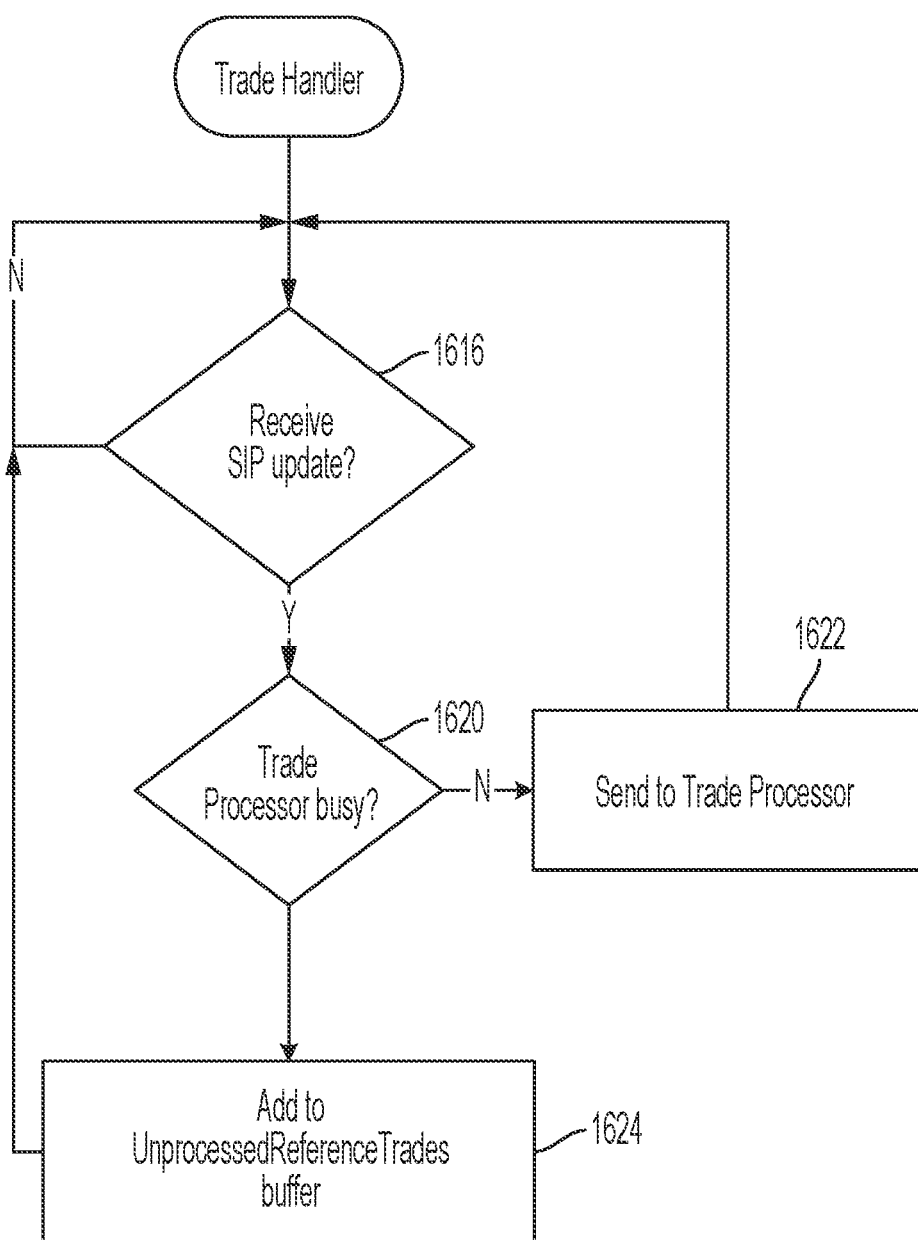
Figure 16C:
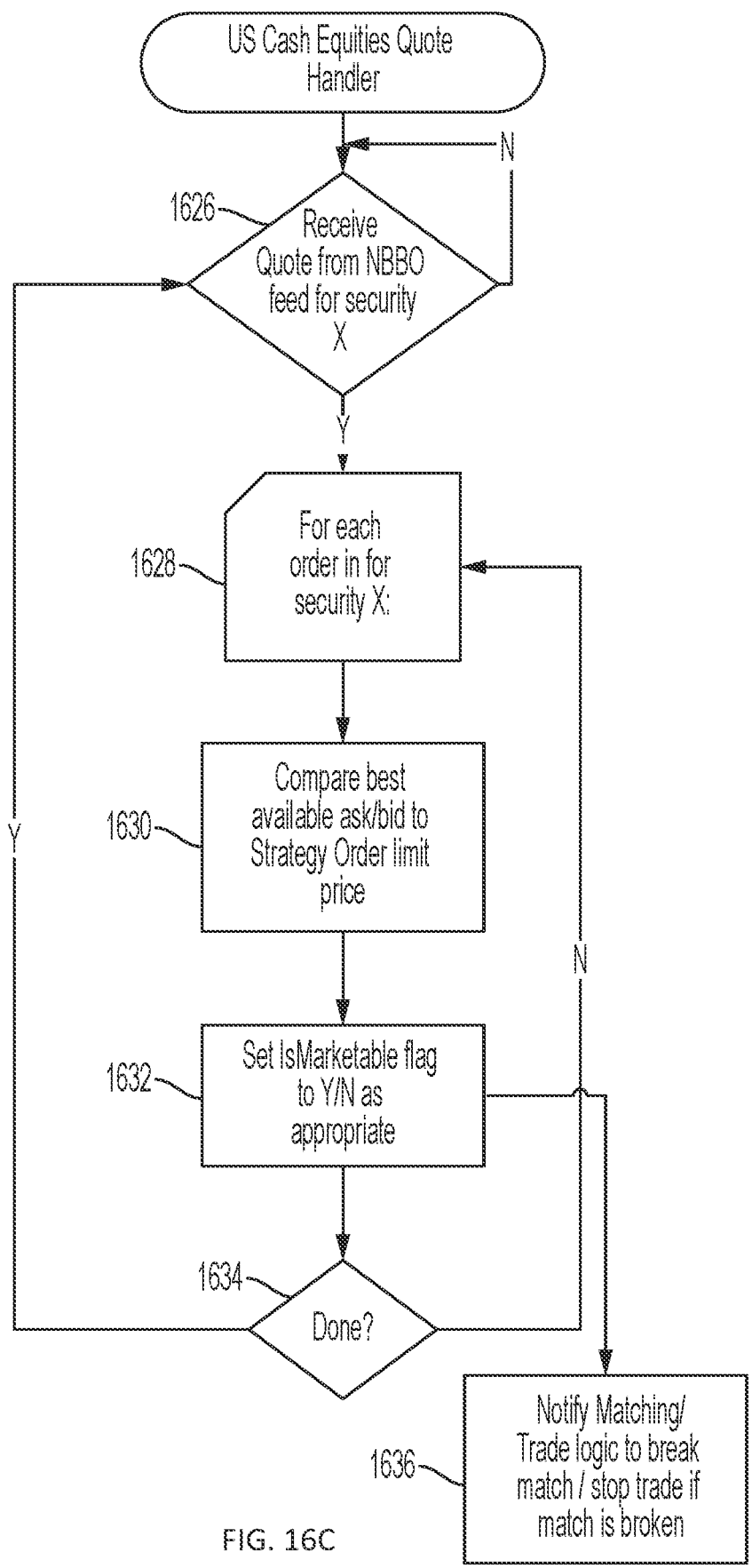

FIGS. 16A-16C are high-level flow charts of the basic functionality provided by an embodiment of the I/O handler 1405, Trade Handler 1455, and Quote Handler 1450, respectively.

Turning to FIG. 16A, when an incoming order message is received by I/O Handler 1405 (step 1602) it is checked to see if a strategy is specified (step 1604). If there is no strategy, one is selected, for example by using the strategy order generation engine 1430. (Steps 1606, 1608). For received messages that contain new orders or updates to existing orders, the AllOrders table 1502 is updated to add the new order or change data stored for an existing order as appropriate (Steps 1602, 1604, 1610). When I/O handler receives an outgoing message for client, such as a StreamON/OFF condition message, execution message, or a firm-up request, (Step 1612), the message is formatted as appropriate and then sent out, e.g., over the FIX interface to a designated recipient.

Turning to FIG. 16B, Trade Handler 1455 is used as an intermediary for trade data used by the trade processor 1465 in determining quantities and/or timing of streaming executions. If other types of market or non-market data is needed by the trade processor 1465, it may serve as an intermediary for that data as well. When SIP updates, such as market trade data, are received at the trade handler 1455 (step 1616), a check is made to determine if the trade processor 1645 is busy. (Step 1620). If it is not, the SIP update is sent to the trade processor (step 1622). If trade processor 1645 is busy, the SIP update is added to the UnprocessedReferenceTrades buffer 1506. (Step 1624) In the embodiment of FIG. 16C, QuoteHandler 1450 processes security market data to determine which orders for securities in the AllOrders book 1502 are marketable. When a new quote is received for a security X, e.g., from the NBBO security feed or other source, orders in the AllOrders book for that security are examined to compare the best available ask/bid values of the received quote to the respective order's limit price. (Steps 1628, 1630). A determination is then made as to whether the order, in view of the current quote, is marketable and the IsMarketable flag for the order set as appropriate (step 1632). The process repeats until all relevant orders have been checked.

If a strategy order that is part of an active stream is switched from being marketable to being non-marketable, the order is no longer eligible to be matched. When a marketable to non-marketable transition is made, QuoteHandler 1450 can check the active streams data for that order. If the order is participating in one or more streams, a notice can be issued to break the match and stop trading of that order. (Step 1636). Because an order may be unmarketable for only a small transient period of time and then rapidly return to marketability, a match could be temporarily preserved (but would not be acted on for execution purposes) and the match broken only if it has been unmarketable for longer than a specified period of time.

Figure 16D:
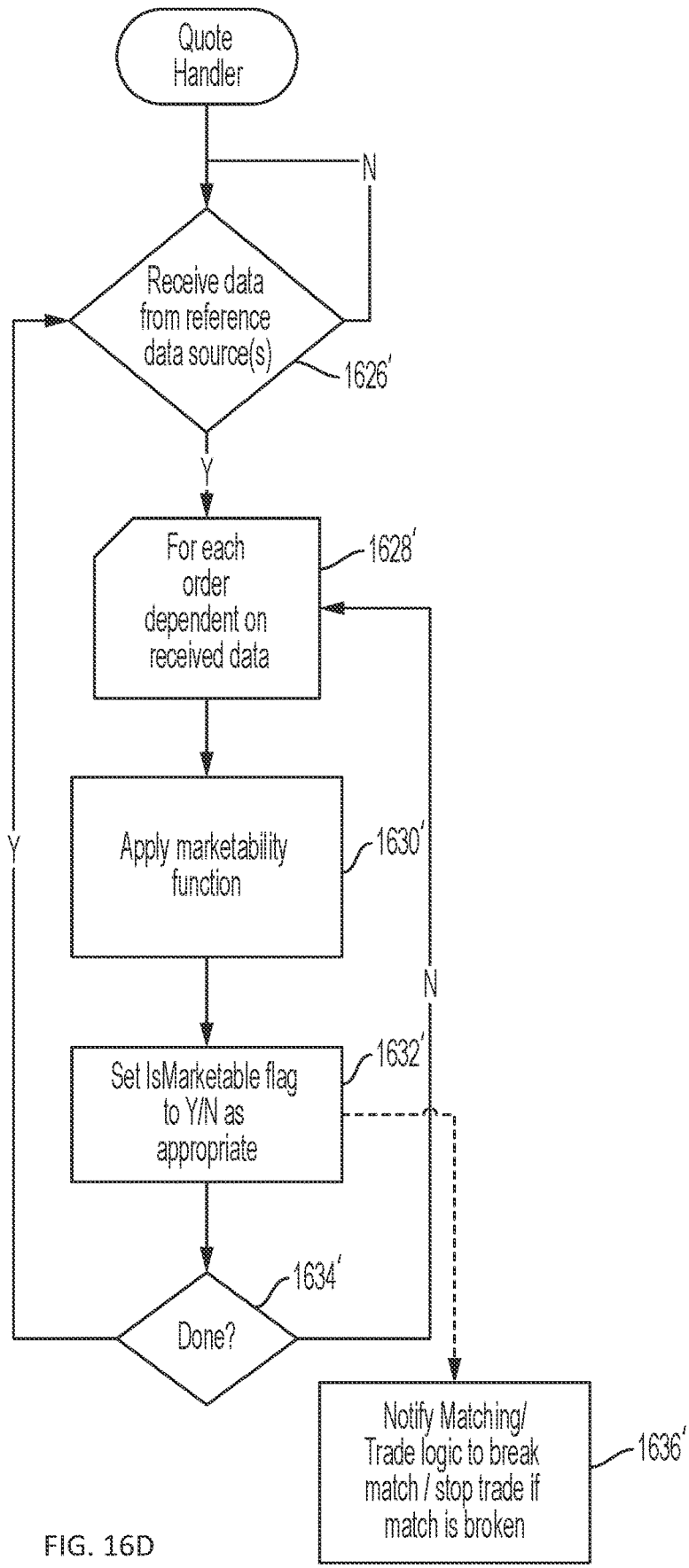

In an alternative embodiment, the marketability of an order for a tradable item may be defined by a specified marketability function based on first market data, which market data may include market bid/ask values or other information. FIG. 16D is a high-level flow chart for such a more general implementation of QuoteHandler 1450. QuoteHandler 1450 receives data relevant to the marketability of one or more orders, which data may be received from one or multiple sources. (Step 1626') For each order in the AllOrders book whose marketability is dependent on the received new data, the marketability function for that order is applied and the IsMarketable flag is set accordingly.

(Steps 1628'-1634'). If an order transitions from marketable to non-marketable, a notice to break existing matches can be sent as well. (Step 1636').

Allowing use of a general marketability function in an automated trading system provides additional flexibility for traders to control when their orders are executed. While marketability functions are likely to rely on bid/ask data for the tradable item at issue, marketability functions based on additional and/or alternative data can alternatively be used instead. This may be suitable for supporting trading of unconventional tradable items and/or as an additional way to conditionally vary a strategy of trading. In a particular embodiment, the function to set the order's marketable flag (and thus prevent new matches) could be different from the marketability function applied in determining to break existing matches. The match-break marketability function could be state based (as opposed to stateless) and be based on prior activities or lack thereof. For example, the system could keep track of how long or how much volume has traded while there can be no executions or how far the price has moved in determining whether to break an existing match.

Additions to the FIX protocol may be needed to allow additional marketability conditions to be specified or an alternative channel used to provide that data (and possibly the order data overall) depending on the overall trading environment within which Strategy matching venue 1400 is operating.

Figure 17:
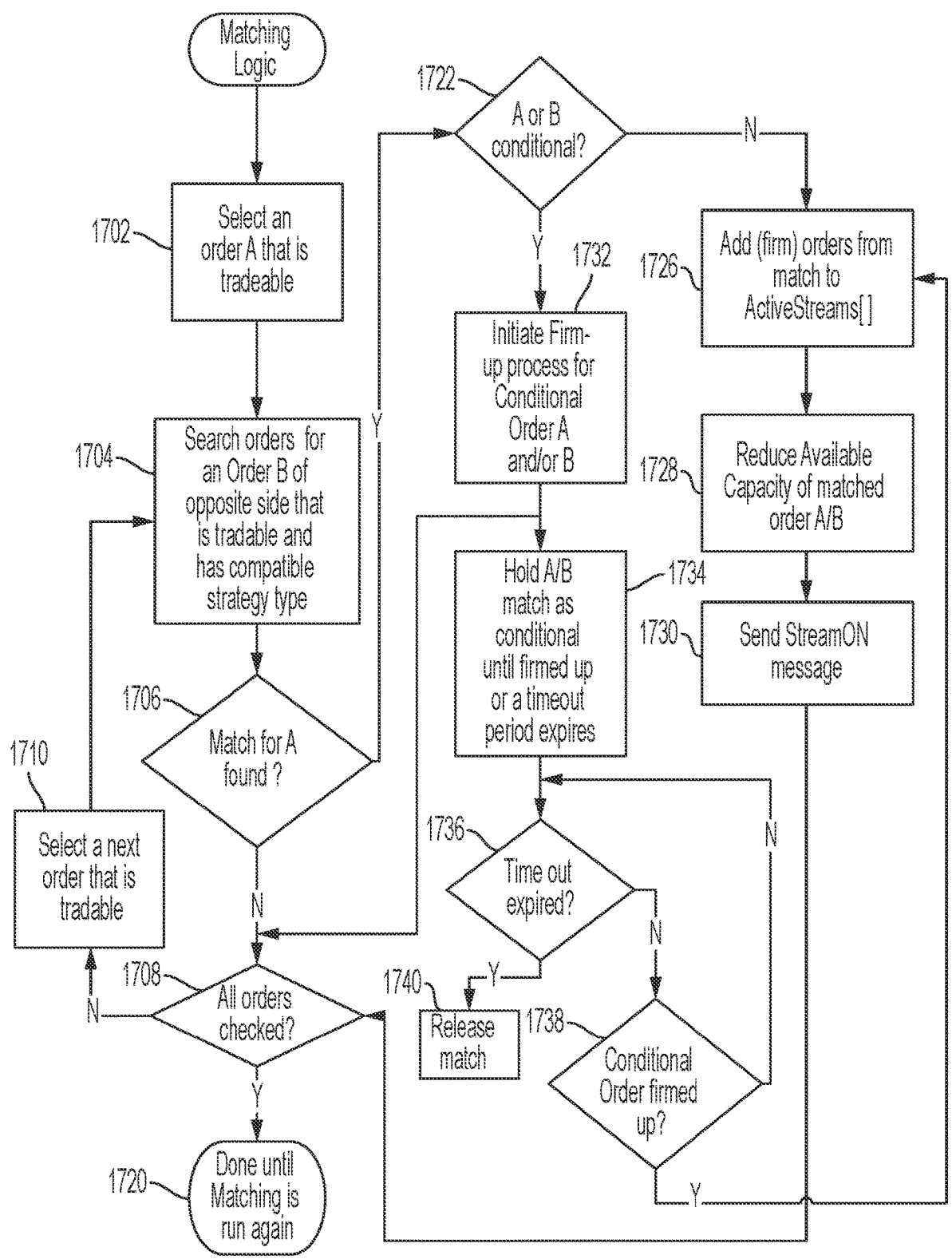
FIG. 17 is a high-level flow chart of an embodiment of a strategy order matching engine.

FIG. 17 is a high-level flow chart of an embodiment of the matching engine 1460 which implements a strategy matching process. The matching process may be run on a continuous, periodic, or intermittent basis.

When the matching process is initiated, a strategy order A to work is selected, e.g., from the AllOrders book. The selected strategy order A must be marketable and have available capacity to support a match (e.g., it is tradeable). (Step 1702). There may be multiple orders for a given security and side that meet these criteria from which a strategy order A can be selected. Various methodologies can be used in prioritizing selection order. Orders can be ranked by order size, marketability, cost, or other factor or in a combination of more than one factor. Different ranking preferences can be provided for use on orders from different sources. A priority field could be provided within orders to allow the order issuer to specify a selection prioritization factor, at least among orders from the same initial trader. Large orders above a threshold size, such as 100,000 shares can be prioritized higher than smaller orders and then orders further prioritized according to, for example, when they were placed. Various other factors may be used as well, such as if the order is new or if it has been previously matched but is not currently in a match and whether it is in an active match.

The matching process may also filter orders to consider using other criteria. In one embodiment, incoming orders may indicate a preference for a specific subset of brokers or other source identifiers or order characteristics. While all orders could be stored in a common AllOrders book, separate instances of the order matching process can be applied, each instance of which considers orders placed only by a specified source. Orders from different sources can be prioritized using different methodologies, which methodologies may be selected from a predefined set of methodologies or a ranking function provided, such as when an account with the strategy matching venue is established. The indexation of available liquidity and the factoring in of other dimensions advantageously will make uniquely customized order priority books, and liquidity search possible.

After a tradable strategy order A is selected to work, the AllOrders book is searched to identify a strategy order B for the same security of A, an opposite side, and that is tradeable and has that a strategy type compatible with the strategy type of strategy order A. (Step 1704). In many cases, there may be multiple potential contra orders B that can be selected. Various priority schemes for choosing a particular order B can be implemented. As discussed above, strategy types can be given different priorities. Where multiple potential contra order matches are available, they can be ranked based on the priority of the strategy type, with higher priority strategies, (such as those which give greater liquidity) coming first. With reference to FIG. 19, an order A with strategy type 10%-30% would be preferentially matched to an available order B with a liquidity seeking strategy, and if none were available to a 10%-30% strategy, and if none were available to a 5%-15% strategy.

One or more additional prioritization schemes can be implemented if there are multiple possible contra orders with the same highest strategy type priority. Orders can be ranked by size and time. The order in which prioritization criteria is applied can vary depending on preference or design choice. For example, orders may be prioritized according to order size first and then by strategy type or vice versa. Other factors, such as discussed above with respect to selection of order A, can also be used. Different prioritization schemes may be available and selected based on other predefined criteria.

In a particular embodiment, where multiple potential contra order matches are available having the same strategy, the matching engine can select orders from that strategy bucket using a sequence of prioritization factors, which can include in a sequence of priority from highest to lowest: Order Target Strategy, Order Attribution Preferences; Resting Order Placing Institution; Original Quantity of the order; Order Arrival time; and Residual Order Quantity (for New and Conditional Orders only).

In a more specific embodiment, the matching engine can select matching orders from among orders within a same strategy bucket according one or more of the preferences listed below from highest to lowest priority:

1. Liquidity Search Preference: If the incoming order specifies one or more search preferences, those preferences will take precedence.
2. Institution/Broker Dealer: priority will be given to orders from the same Institution or broker dealer for a match. The Institution or broker dealer can override this option to avoid a "self-cross
3. Desk: If the incoming order has specified a certain desk or broker, the order will be paired to match with only compatible orders with the same desk and/or broker. For example, an approved broker list, or a specific brokers IOI.
4. Original Order Size Bucket: orders whose original order size is greater than a threshold, such as 25K, are given priority over smaller orders.
5. Arrival Time: Time priority is the final factor in determining the match. If two orders exist in the same bucket (say 500K and 125K or 20K and 15K respectively), the order that arrived earlier amongst the pair is given priority.

Prioritized selection of contra strategy orders can continue so long as the order A has available capacity for additional contra matches.

Returning to FIG. 17, if no matching contra order B is available for a selected order A and there are additional orders in the AllOrders book to check (step 1708), a next tradable order A is selected using the appropriate prioritization scheme (step 1720) and the process continues until all relevant orders have been checked.

If a matching contra order B is identified, the order is checked to see if it is conditional (Step 1722). If the order is not conditional, the match of order A to order B is stored in the ActiveStreams table (1726). Each of order A and B will have a respective rate capacity based on the selected strategy and others matched to it. For that match, the maximum rate that can be filled is the lesser of the available rate capacity of A and of B. The available capacity of orders A and B is reduced by this amount (step 1728). A Stream ON message can then be triggered to be sent to the sources of orders A and B. (Step 1730). For a liquidity seeking order, a match does not impact rate. However, the match can result in a maximum potential number quantity of trades (such as the lesser of the total quantity available for order A and total quantity available for order B). This amount can be used to determine at least a minimum quantity for the liquidity seeking order that will remain available for use in strategy matching against another contra order. If orders A and B both have a liquidity seeking strategy than the match will result in a subsequent block trade that is executed for the lesser of the total quantity available for order A and order B. The match can be executed at a determined price, such as a mid-price based on the current NBBO and without the need to participate in the streaming execution process implemented in the trade processor streaming engine 1465 since neither order in the pair is rate constrained. Alternatively, a LS to LS match can be processed in due course along with other matches by the trade processor streaming engine 1465.

Advantageously, the matching logic maximizes the liquidity flow rate. If an order has capacity to receive a higher rate (or a liquidity seeking order has additional quantity remaining), it is eligible for more matches. A large capacity order A can be simultaneously matched against multiple orders B, B', B", etc. having smaller capacities. The strategies of orders B, B', B" etc. in a multiple match situation do not need to be same.

If a Stream ON message for order A has been sent following matching to order B, it is not necessary to send an additional Stream ON message if order A is matched to second order B' while the match to order B is still active. Similarly, a Stream OFF message for order A does not need to be sent until all active matches with A are ended.

If additional information is included in StreamON messages, such as the expected rate of the match or a maximum quantity that can be filled during that match, a StreamON message can be sent for each match. A StreamOFF message can optionally be sent when a match is broken even if there are other matches. A receiving HERO system or PRO system could independently track the StreamON and StreamOFF messages for a given strategy order, such as with reference to a MatchID included in the StreamON and StreamOFF messages.

When each received Stream ON message for a strategy order can be paired with a subsequent Stream OFF message, there are no active matches for that strategy order. Alternatively, or in addition, the strategy matching venue can have two types of Stream OFF messages differing by, for example, the value of Matches Remaining flag in the message. A set value for the Matches Remaining Flag indicates that there is at least one remaining unbroken match for the respective strategy order. If a StreamOFF message is received but active strategy matches for that strategy order remain, the StreamOFF message can be considered by a receiving HERO system or PRO system as being merely informational and not used to trigger a notice to an algo trading platform to resume algorithmic processing or to an OMS/EMS to reissue the algo order (for any remaining quantity).

Returning to FIG. 17, if one or both of the selected order A and matching contra order B are conditional orders (step 1722), an order firm-up processes is initiated for the conditional order(s). (Step 1732). As discussed above, this entails sending a firm-up request for the conditional orders and may include switching the matched conditional order to a firmed up non-conditional replacement order. While waiting for the order(s) to be firmed up, the process for searching for additional matches can continue (step 1708).

Each match or each conditional match can be assigned a respective MatchID. A firm up request message can include the MatchID value for the conditional match at issue and a returned firm up order response can include the relevant MatchID value. The presence of a MatchID value in an order sent to the strategy matching venue can be used to determine whether the order is a firm-up of an existing conditional order or instead is a firm, non-conditional order.

If the conditional order or orders are not firmed up within a specified time out period (step 1736), the match is released. (Step 1740). If both orders were conditional but only one was firmed up, a notice can be sent to the source of the firmed-up order indicating that the conditional match has failed. If the conditional order match is successfully firmed up (step 1738), the process continues in the same manner as for a non-conditional match (Step 1726).

Figure 18:
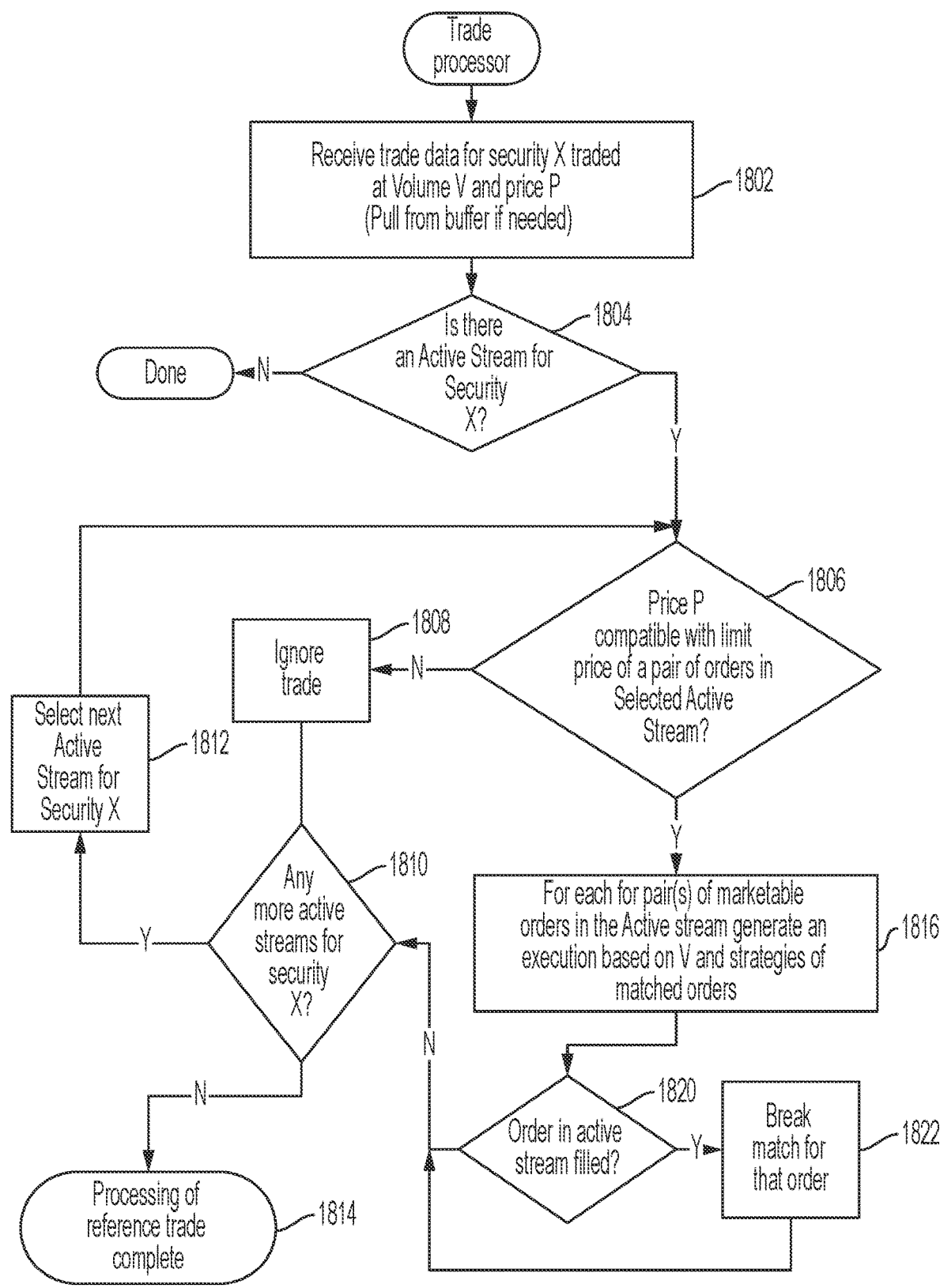
FIG. 18 is a high-level flow chart of an embodiment of strategy trade processor.

Strategy orders can also be provided with a "time-in-force" designator. If the time in force has been exceed and the strategy order is still active, it can be cancelled back. FIG. 18 is a high-level flow chart of an embodiment of trade processor 1465. The trade processor 1465 operates on market trading data that is provided by trade handler 1455 and a trading cycle can be initiated on receipt of new trade data or when trade data is buffered. On receipt of a trading datum for a given security X at a traded volume V (specifying a quantity traded) and price P (step 1802), a check is made to see if there are any active stream orders for security X. (Step 1804). If there are none, no additional action needs to be taken for that data point.

If one or more active streams exist, e.g. there is an active match between an order A and contra order B for security X, those streams are processed. (Step 1804). For a selected stream a check is made to determine if the price P is compatible with the limit prices specified for a matched pair of orders A and B in that stream (step 1806). If the price is not compatible, no additional action is taken for that stream (step 1808). If more streams are available (step 1810) a next active stream for security X is selected and processed (Step 1812).

When the price P is compatible with the limit prices of a pair of matched orders in one or more active streams (in which order A could be matched to Order B and also Orders B', B", etc.), an execution is generated for that pair. (Step 1816). In an embodiment, the execution is based on the volume of the security X and the largest strategy basis that is compatible for the strategies of the matched order. The streaming quantity is the last sale volume V multiplied by the strategy basis percentage of volume and is made at the last sales price. Where a calculated streaming quantity exceeds the available basis for one of the orders in the pair, the quantity exchanged will be the lowest available basis. When one of the orders has a liquidity seeking strategy, the applied is the highest available percentage of volume rate for the strategy of the order other. When both orders in a pair are liquidity seeking, a block exchange can be made of a quantity equal to the lowest available quantity capacity of two orders. (In the case of a match between two liquidity seeking orders, the execution could be performed at the time of the match without waiting for the matched pair to be addressed in the trade processing loop.)

A streaming exchange may be executed in a single trade or broken into several smaller trades. Multiple market trades may also be able to be combined into a single strategy match fill. Fills are executed using conventional techniques and execution data reported to, e.g., an appropriate Trade Reporting Facility 1420.

In a more specific embodiment, for price-referencing streaming matches the system can continuously process the SIP trade feed and for every reference trade for the matched orders and generate fills for each order in the match as follows:

1. Calculate the crossQty based on the strategy of each order in the match and residual quantities. (E.g., if the strategy are both 100%-200%, the crossQty is the smaller of two times the quantity of the reference trade and the minimum of the residual quantities of the two sides of the match).

2. Calculate crossPrice based on the reference trade price and any applicable pricing rules.

3. Generate an execution for the crossQty@crossPrice for each order in the match (which will decrement residual quantities on each order) and send the fix execution report to each order.

4. Generate report to TRF with all the other relevant details— (e.g. the relevant MPIDs, riskless principal and other trade modifiers) as well as the clearing report to DTCC.

5. If this execution completes an order (i.e. residual quantity=0) invoke the completed order function—which will result in sending of the STREAM_OFF message as well as perform other relevant housekeeping. The order with the residuals will continue to be processed by the matching system for subsequent matches and fills.

The structural advantages inherent in executing in a reference market and the universal segmentation applied in the strategy matching venues protect investors, but protections such as anti-gaming features can be added to further protect execution information leakage. One way to do this is to introduce random factors into the trading. These can include, for example, randomizing the match rate when a stream is bi-lateral, changing the stream rate intra stream, rounding the stream quantity up and down randomly when referencing an odd lot, periodic bunching of reports, and randomizing trade reporting.

Returning to FIG. 18, after an exchange is completed, a determination is made as to whether one or both of the orders in the active stream pair have filled the available capacity (step 1820). If so, no further trades for that pair are available and the match is broken (step 1822). Order completion housekeeping tasks can also be carried out, which might result in terminating other streams for that order. If additional capacity remains, the match persists and further exchanges can be made after additional relevant trade data for the security at issue is received.

If additional active streams of paired orders are available for that security X (step 1810) the next stream selected and processed in the same manner (step 1812). After all of the active streams for security X have been processed, no further action as to those trades by the trade processor is required until another item of trading data for security X is received.

In sum, once a match is established, a stream of executions flow from the seller to the buyer based on the strategy type of the match. The match formation and breaking conditions are designed to minimize disruptions to established matches. In an embodiment, the match/stream is terminated only if one or both orders become non-marketable based on the applied marketability tests, one or both orders complete—e.g., residual quantity goes to zero, or one or both orders is cancelled. In an embodiment that provides preference to block trades over streaming fills, a match may also be broken if one of the orders in the match is liquidity seeking and a new larger liquidity seeking contra-side matching order arrives.

As noted above, a match can be broken if one of the orders becomes unmarketable. It is possible for an order to be unmarketable and then quickly return to marketability. Instead of immediately breaking the match, it could instead be suspended and some buffer period given before the match is broken to preserve the pairing. If the orders return to marketability during the buffer period, the match is reactivated. Various conditions can be set to determine when a suspended match should be broken.

In a particular embodiment, one or more of the following conditions are implemented. The match is broken if (a) the order remains unmarketable for longer than a specified timeout period, (b) more than a specified market volume, such as 50K, is traded in the instrument of the matched orders before the matched orders are both marketable again, and (c) the market price (e.g., as specified in NBBO market data) moves past the limit price by more than a particular amount, such as a specified price delta in basis points.

The strategy matching and streaming execution methodology is flexible and can be applied to implement an asymmetric trading strategy. As shown in FIG. 16D, a marketability function for an order can be defined based on any desired data available to the strategy matching venue. This can provide more control over when orders are actually matched. Likewise, special strategies can be defined which have an execution quantity function based on factors in addition to or instead of the current volume of the security being exchanged. This allows the strategy matching venue to support trading of an instrument or other tradable item A, such as a synthetic security, based on a reference that is not simply the current price and volume of instrument A.

As noted above various enhancements to the FIX protocol can be made to support features of the present invention. Similar features can be implemented in other protocols that may be used for communication between various components of the present invention. For example, a series of additional FIX partitions can be defined to support strategic trading and related functionality and management.

FIGS. 7A, 7B, 8A-C, 13A and 13B are high-level flowchart of the operation of an embodiment a HERO-aware algo trading platform 320, a HERO system 315, and a PRO system 1110 focusing for clarity on functionality used to process a single parent order. Various ways to implement this functionality to support processing of multiple orders simultaneously will be known to those of skill in the art. Functions illustrated herein can be executed continuously, periodically, or in response to software events or other signaling. As is conventional, the various orders will have unique order IDs and appropriate order ID(s) are included in messages sent between systems and software elements to associate those messages with the respective order(s). Various other conventional bookkeeping and function management features may also be used.

Various functions disclosed in the flowcharts are illustrated as separate program threads. While multi-threaded programs can be used it is not required and software implementing such functionality can organized in various ways as will be known to those of ordinary skill in the art. Likewise, certain functionality disclosed as occurring sequentially may instead be implemented in separate threads operating in parallel. For example, the trade processor 1465 may cycle through active relevant streams when new trading data is received. Sequential functionality of this type can also be implemented in parallel threads, each processing one or more active streams and/or each processing streams for a different security responsive to receipt of trade data for that security.

While the system has been described as applied to a system and method for trading securities, such as stocks, index shares, etc., the strategic matching system can also be applied to the processing or orders for other tradeable items with reference to relevant market data for those tradeable items. First market data can be used to determine whether a given strategy order is marketable and second market data used to determine the timing and volume of streaming trades.

In a further implementation, a strategy matching can support matches with on only a partial rate match. In such a case, even accounting for the stream of matches provided by the strategy matching venue there could still be additional rate capacity available for the order. In such a case, the algo processing system could be further controlled to slice orders using an algorithmic constraint modified in view of the strategy order rate match so that the algorithmic processing would try to match the differential rate that is not being covered by the strategy matching venue.

Various aspects, embodiments, and examples of the invention have been disclosed and described herein. Modifications, additions and alterations may be made by one skilled in the art without departing from the spirit and scope of the invention as defined in the appended claims.

The invention claimed is:

1. A computer implemented method for filling a customer order by coordinated automated processing of an associated first algo order and counterpart first strategy order pair, the customer order having a security, side, limit price, and quantity of shares, the first algo order and first strategy order each specifying the security, side and limit price of the customer order, the first strategy order further having a respective strategy, the method implemented by a computerized algo system and a computerized strategy matching venue, the algo system and strategy matching venue in communication with a network, the method comprising the steps of:

in the strategy matching venue:
receiving a message with the first strategy order;
matching the first strategy order to a first contra strategy order stored in a computer memory of the strategy matching venue, the first contra strategy order having a respective strategy compatible with the strategy of the first strategy order, the match having an initial status of unbroken;
sending a STREAM ON message to the algo system indicating that the first strategy order is in a match;
generating a plurality of discrete fills between the first strategy order and the first contra strategy order while the match remains unbroken;
breaking the match in response to a determination that either of the first strategy order or the first contra strategy order has been one of filled and become unmarketable; and in response to breaking the match sending a STREAM OFF message to the algo system indicating the match for the first strategy order has been broken;

in the algo system:
intermittently generating sub-orders from the first algo order in accordance with a target rate, each sub-order having a respective sub-order quantity;
sending the generated sub-orders to an electronic point-in-time (PIT) trading venue;
receiving PIT execution messages from the PIT trading venue, each PIT execution message corresponding to a respective sub-order and indicating a fill amount for the respective sub-order;
in response to receipt of the STREAM ON message, altering in a first manner the intermittent generation of the sub-orders; and
in response to receipt of the STREAM OFF message, altering in a second manner the intermittent generation of the sub-orders;

wherein the customer order is filled when a total amount of completed fills for the first algo order and a total amount of completed fill for the first strategy order equals the quantity of the customer order.

2. The method of claim 1, wherein the step of altering in a first manner comprises pausing generation of the sub-orders and the step of altering in a second matter comprises resuming generation of the sub-orders.

3. The method of claim 1, wherein the step of altering in a first manner comprises reducing the target rate and the step of altering in a second matter comprises increasing the target rate.

4. The method of claim 1, the strategy of the first strategy order specifying a strategy rate or rate range, the method further comprising the step in the algo system of adjusting the target rate in response to the first strategy order being in a partial rate match.

5. The method of claim 1, further comprising the step in the algo system of in response to receipt of the STREAM ON message, canceling one or more issued sub-orders that are outstanding.

6. The method of claim 1, further comprising the steps of:
receiving in the algo system the first algo order;
generating the first strategy order corresponding to the first algo order; and
issuing the first strategy order to the strategy matching venue.

7. The method of claim 6, the first algo order indicating an initial quantity of shares for which sub-orders of the first algo order can be generated by the algo system, the first strategy order indicating an initial quantity of shares available to the strategy matching venue, the initial quantity of shares for the first strategy order being less than the initial total quantity shares of the algo order by at least a minimum predefined buffer value.

8. The method of claim 1, further comprising the steps of:
the strategy matching venue sending to the algo system fill messages indicating an executed fill quantity for each discrete fill;
the algo system updating a quantity of shares available for allocation to generated sub-orders in response to receipt of the fill messages.

9. The method of claim 1, the first strategy order indicating a quantity of shares available to the strategy matching venue, the method further comprising in the algo system the steps of:
updating the quantity of shares available to the first strategy order in response to changes in the number of shares available to the order manager engine for allocation to generated sub-orders for the first algo order.

10. The method of claim 9, wherein the step of updating the quantity of shares available to the first strategy order comprises sending an order update message for the first strategy order to the strategy matching venue.

11. The method of claim 9, wherein the step of updating the quantity of shares available to the first strategy order comprises selecting an updated quantity of shares for the first strategy order to maintain a difference of least a minimum predefined buffer value between the quantity of shares available to the order manager engine for allocation to generated sub-orders and the quantity of shares available to the first strategy order.

12. The method of claim 1, further comprising the steps of in the strategy matching venue:
   matching while the match between the first strategy order and first contra order is unbroken, the first strategy order to a second contra strategy order stored in a computer memory of the strategy matching venue and having a respective strategy compatible with the strategy of the first strategy order as adjusted based on a strategy applied to fills for the match between the first strategy order and first contra order;
   generating, using the trade processor streaming engine, a plurality of discrete fills between the first strategy order and the second contra strategy order while the match between the first strategy order and the second contra strategy order remains unbroken;
   breaking the match between the first strategy order and the second contra strategy order in response to a determination that either of the first strategy order or the second contra strategy order has been filled.

13. The method of claim 1, wherein the first strategy order is a conditional strategy order, the method further comprising the steps of
   in the strategy matching venue:
      in response to matching of the first strategy order to the first contra strategy order, sending a firm-up request for the first strategy order to the algo system;
      receiving from the algo system a firm-up response for the first strategy order, the firm-up response indicating a firmed-up quantity of shares available for the first strategy order;
      wherein the step of generating the plurality of discrete fills performed is after receipt of the firm-up response;
   in the algo system:
      receiving the firm-up request for the first strategy order;
      determining a quantity of shares that are available for strategy matching; and
      sending the firm-up response to the strategy matching venue specifying the determined quantity as the firmed-up quantity of fills for the first strategy order.

14. The method of claim 13, wherein the quantity of shares that are available for strategy matching is determined as a function of a number of shares available to the order manager engine for allocation to generated sub-orders for the first algo order.

15. The method of claim 13, further comprising in the algo system the step of cancelling outstanding sub-orders in response to receipt of the firm-up request.

16. The method of claim 13, wherein the firm-up response causes the matched conditional first strategy order to be replaced with a non-conditional replacement strategy order.

17. A computer implemented system filling a customer orders by coordinated automated processing of algo order and counterpart strategy order pairs each associated with a respective customer order, respective customer orders order having a security, side, limit price, and quantity of shares, the respective associated algo order and strategy order each specifying the security, side and limit price of the customer order, the strategy order further having a respective strategy, the system comprising:
   a strategy matching venue; and
   an algo trading platform in electronic communication with an electronic point-in-time (PIT) trading venue and the strategy matching venue;
   the strategy matching venue comprising a memory with first computer instructions stored therein which on execution by one or more processors of the strategy matching venue cause the strategy matching venue to:
      receive strategy orders over a network and store records for received strategy orders in an order book;
      match a first strategy order to a first contra strategy order in the order book, the first contra strategy order having a respective strategy compatible with the strategy of the first strategy order, and wherein the first strategy order is a counterpart to a first algo order being processed by the algo trading platform, the match having an initial status of unbroken;
      send in response to forming a match for the first strategy order a STREAM ON message to the algo trading platform indicating that the first strategy order is in a match,
      generate a plurality of discrete fills between a first strategy order and first contra strategy order while the match between the first strategy order and first contra strategy remains unbroken;
      break the match between the first strategy order and first contra strategy in response to a determination that either of the first strategy order or the first contra strategy order has been one of filled and become unmarketable; and
      send in response to breaking the match for the first strategy order a STREAM OFF message to the algo trading platform indicating the match for the first strategy order is not in a match;
   the algo trading platform comprising a memory with second computer instructions stored therein which, on execution by one or more processors of the algo trading platform cause the algo trading platform to:
      intermittently generate sub-orders from the first algo order in accordance with a target rate, each sub-order having a respective sub-order quantity;
      send the generated sub-orders to an electronic point-in-time (PIT) trading venue;
      receive PIT execution messages from the PIT trading venue, each PIT execution message corresponding to a respective sub-order and indicating a fill amount for the respective sub-order;
      in response to a STREAM ON condition indicating that a STREAM ON message for the first strategy order has been sent, altering in a first manner the intermittent generation of the sub-orders for the first algo order; and
      in response to a STREAM OFF condition indicating that a STREAM OFF message for the first strategy order has been sent, altering in a second manner the intermittent generation of the sub-orders for the first algo order;
   wherein the customer order is filled when a total amount of completed fills for the first algo order and the first strategy order equals the quantity of the customer order.

18. The system of claim 17, the second computer instructions on execution further causing the algo trading platform to alter the intermittent generation of sub-orders in the first manner by pausing generation of the sub-orders and alter generation of sub-orders in the second manner by resuming generation of the sub-orders.

19. The system of claim 17, the second computer instructions on execution further causing the algo trading platform to alter the intermittent generation of sub-orders in the first manner by reducing the target rate and to alter generation of sub-orders in the second manner by increasing the target rate.

20. The system of claim 17, further comprising an interface system in communication with the strategy matching venue and the algo trading platform, the interface engine having a memory with third computer instructions stored therein which when executed by one or more processors cause the interface system to:
receive a STREAM ON message from the strategy matching venue for a respective strategy order and in response signal the algo trading platform with a STREAM ON condition for the respective strategy order;
receive a STREAM OFF message from the strategy matching venue for the respective strategy order and in response signal the algo trading platform with a STREAM OFF condition for the respective strategy order.

21. The system of claim 20, wherein the interface system is integrated with the algo trading platform.

22. The system of claim 20, the third computer instructions on execution further causing the interface system to:
determine when the first algo order is placed with the algo trading platform;
generate the counterpart first strategy order to the first algo order; and
issue the first strategy order to the strategy matching venue.

23. The system of claim 22, the third computer instructions on execution further causing the interface system to select a strategy for the first strategy order.

24. The system of claim 22, the first algo order having a quantity indicating a number of shares available for allocation to sub-orders generated by the algo trading platform for the new algo order;
the third computer instructions on execution further causing the interface system to set a quantity of shares for the first strategy order that is less than the quantity of shares of the algo order by at least a predefined buffer value.

25. The system of claim 20, the third computer instructions on execution further causing the interface system to maintain at a time when the first strategy order is not in a match a difference of at least a predefined buffer value between (i) a quantity of shares available for the first algo order and which can be allocated to sub-orders; and (ii) a quantity of shares specified in the counterpart first strategy order.

26. The system of claim 25, the third computer instructions on execution further causing the interface system to cancel the first strategy order if a quantity of shares available for the first strategy order is below a predefined minimum value when the first strategy order is not in a match.

27. The system of claim 20, the third computer instructions on execution further causing the interface system to:
identify a new strategy for a respective strategy order based on received market data; and
if the new strategy differs from the current strategy of the respective strategy order, send an order change message to the strategy matching venue to change the strategy of the respective strategy order to the new strategy.

28. The system of claim 20,
the first computer instructions on execution further causing the strategy matching venue to:
send a firm-up request for the first strategy order to the algo system if the first strategy order is a conditional order; and
receive from the algo system a firm-up response for the first strategy order, the firm-up response indicating a firmed-up quantity of shares available for the first strategy order;
wherein generation of the plurality of discrete fills between the first strategy order and the first contra strategy order is not performed until after the firm-up response is received;
the third computer instructions on execution further causing the interface system to:
receive the firm-up request for the first strategy order;
determine a quantity of shares that are available for strategy matching via the first strategy order; and
send the firm-up response to the strategy matching venue specifying the determined quantity as the firmed-up quantity for the first strategy order.

29. The system of claim 28, wherein the quantity of shares that are available for strategy matching is determined as a function of a number of shares available for allocation to generated sub-orders for the first algo order.

30. The system of claim 28, wherein the firm-up response comprises a replacement non-conditional strategy order, the first computer instructions on execution further causing the strategy matching venue to substitute the replacement non-conditional strategy order for the replace conditional first strategy order.

* * * * *